United States Patent
Joo

(10) Patent No.: US 10,955,919 B2
(45) Date of Patent: Mar. 23, 2021

(54) WEARABLE DEVICE AND METHOD OF OPERATING THE SAME

(71) Applicant: SAMSUNG ELECTRONICS CO., LTD., Suwon-si (KR)

(72) Inventor: Ga-hyun Joo, Suwon-Si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/733,870

(22) Filed: Jan. 3, 2020

(65) Prior Publication Data

US 2020/0142482 A1    May 7, 2020

Related U.S. Application Data

(63) Continuation of application No. 14/665,274, filed on Mar. 23, 2015, now Pat. No. 10,551,920.

(30) Foreign Application Priority Data

| Mar. 21, 2014 | (KR) | ......................... 10-2014-0033704 |
| Jul. 18, 2014 | (KR) | ......................... 10-2014-0091319 |
| Jan. 12, 2015 | (KR) | ......................... 10-2015-0004456 |

(51) Int. Cl.
    *G06F 3/01*    (2006.01)
    *G09G 5/00*    (2006.01)
    (Continued)

(52) U.S. Cl.
    CPC .......... *G06F 3/015* (2013.01); *G02B 27/0093* (2013.01); *G02B 27/017* (2013.01);
    (Continued)

(58) Field of Classification Search
    CPC ...... G02B 2027/014; G02B 2027/0178; G02B 2027/0187; G02B 27/0093; G02B 27/017;
    (Continued)

(56) References Cited

U.S. PATENT DOCUMENTS

| 9,144,405 B2 | 9/2015 | Kim et al. |
| 9,268,145 B2 | 2/2016 | Kato et al. |
| (Continued) | | |

FOREIGN PATENT DOCUMENTS

| CN | 102984535 A | 3/2013 |
| CN | 103283243 A | 9/2013 |
| (Continued) | | |

OTHER PUBLICATIONS

Communication dated Feb. 13, 2020, issued by the European Patent Office in counterpart European Application No. 18 171 699.4.

(Continued)

*Primary Examiner* — Kenneth Bukowski
(74) *Attorney, Agent, or Firm* — Sughrue Mion, PLLC

(57) ABSTRACT

Provided are a wearable device and a method of operating the same. The wearable device includes: a display configured to display content; a user input unit configured to receive a command of a wearer; and a controller configured to: when the content is reproduced in a state in which the wearable device is worn, output, through the display and based on content reproduction related information of the wearable device, information informing the wearer that stopping reproduction of the content is requestable, and control to stop the reproduction of the content in response to a reproduction stop request for the content, received through the user input unit in response to the output information, wherein the content reproduction related information corresponds to information influential on a health of the wearer when the content is reproduced in the state in which the wearable device is worn.

17 Claims, 67 Drawing Sheets

(51) Int. Cl.
*G02B 27/01* (2006.01)
*G02B 27/00* (2006.01)
*G06K 9/00* (2006.01)

(52) U.S. Cl.
CPC ......... *G06F 3/013* (2013.01); *G06K 9/00671* (2013.01); *G09G 5/003* (2013.01); *G02B 2027/014* (2013.01); *G02B 2027/0178* (2013.01); *G02B 2027/0187* (2013.01); *G09G 2354/00* (2013.01)

(58) Field of Classification Search
CPC ..... G06F 3/013; G06F 3/015; G06K 9/00671; G09G 2354/00; G09G 5/003
See application file for complete search history.

(56) References Cited

U.S. PATENT DOCUMENTS

| | | |
|---|---|---|
| 2004/0233060 A1 | 11/2004 | Mohri |
| 2006/0121956 A1 | 6/2006 | Lee |
| 2009/0243967 A1 | 10/2009 | Kato |
| 2012/0027375 A1 | 2/2012 | Yasui |
| 2012/0327116 A1 | 12/2012 | Liu et al. |
| 2013/0044130 A1 | 2/2013 | Geisner et al. |
| 2013/0057660 A1 | 3/2013 | Kim et al. |
| 2013/0083009 A1 | 4/2013 | Geisner et al. |
| 2013/0093789 A1 | 4/2013 | Liu et al. |
| 2013/0113900 A1 | 5/2013 | Ortlieb |
| 2013/0127980 A1 | 5/2013 | Haddick et al. |
| 2013/0174205 A1 | 7/2013 | Jacobsen et al. |
| 2013/0201094 A1 | 8/2013 | Travis et al. |
| 2013/0214998 A1 | 8/2013 | Andes et al. |
| 2013/0234935 A1 | 9/2013 | Griffith |
| 2013/0249787 A1 | 9/2013 | Morimoto |
| 2013/0286168 A1 | 10/2013 | Park et al. |
| 2015/0002373 A1 | 1/2015 | Kobayashi |
| 2015/0084862 A1 | 3/2015 | Sugihara et al. |
| 2015/0235632 A1 | 8/2015 | Liu et al. |
| 2016/0182799 A1 | 6/2016 | Laaksonen |

FOREIGN PATENT DOCUMENTS

| | | |
|---|---|---|
| KR | 10-2002-0071692 A | 9/2002 |
| KR | 10-0894221 A | 4/2009 |
| KR | 10-2010-0035742 A | 4/2010 |
| TW | 201303640 A1 | 1/2013 |
| TW | 201400868 A | 1/2014 |
| WO | 2013/183506 A1 | 12/2013 |

OTHER PUBLICATIONS

Office Action dated Apr. 17, 2019 by the European Patent Office in counterpart European Patent Application No. 18171699.4.

Office Action dated Aug. 31, 2018 by the Taiwan Intellectual Property Office in counterpart Taiwanese Patent Application No. 104108877.

Office Action dated Sep. 3, 2018 by the State Intellectual Property Office of P.R. China in counterpart Chinese Patent Application No. 201510129044.9.

Search Report dated Sep. 3, 2018 by the European Patent Office in counterpart European Patent Application No. 18171699.4.

Communication dated Sep. 29, 2015, issued by the European Patent Office in European Application No. 15159907.3.

Search Report and Written Opinion dated Jun. 26, 2015 issued by the International Searching Authority in counterpart International Patent Application No. PCT/KR2015/002665 (PCT/ISA/210 and PCT/ISA/237).

Lee Jae-Gu, "Patent Application of SmartGlass, Microsoft's Newest Weapon", Aug. 19, 2013, 7 pages total, Korea.

"MS filed a Patent Application for Augmented Reality SmartGlass that recognizes Items", Jul. 21, 2014, 4 pages total.

"MS, Patents for Multi-Touch supporting Smart Glass in the form of Eyeglasses", Jun. 18, 2014, 4 pages total.

Sejak Na, "Galaxy Gear VR's price and functions?", Sep. 5, 2014, 30 pages total, Korea.

FIG. 1B

| CONTENT REPRODUCTION RELATED INFORMATION OF WEARABLE DEVICE | OBTAINING METHOD | REPRODUCTION STOP REQUEST REFERENCE |
|---|---|---|
| REPRODUCTION TIME OF CONTENT | AFTER SENSING WEARING OF WEARABLE DEVICE, TIME COUNTED BY STARTING REPRODUCTION OF CONTENT IS OBTAINED AS REPRODUCTION TIME (Pt) OF CONTENT | $Pt \geq 2H$ |
| BATTERY CONSUMPTION AMOUNT | AFTER SENSING WEARING OF WEARABLE DEVICE, BATTERY REMAINS (Brq1) DETECTED BY STARTING REPRODUCTION OF CONTENT IS OBTAINED AS REFERENCE BATTERY REMAINS (Brq1) DIFFERENCE (D) BETWEEN THE DETECTED BATTERY REMAIN (Brq2) AND THE REFERENCE BATTERY REMAINS DETECTED DURING REPRODUCTION OF CONTENT IS OBTAINED AS BATTERY CONSUMPTION AMOUNT | $D \geq 50\%$ |
| HEATING TEMPERATURE | AFTER SENSING WEARING OF WEARABLE DEVICE, TEMPERATURE (T) DETECTED BY USING TEMPERATURE SENSOR BY STARTING REPRODUCTION OF CONTENT IS OBTAINED AS HEATING TEMPERATURE | 1. $T \geq 49°C$ & MAINTAINING 1 HOUR<br>2. $T \geq 49°C$ |

FIG. 1C-1

| BIO INFORMATION OF WEARER | | OBTAINING METHOD | REPRODUCTION STOP REQUEST REFERENCE |
|---|---|---|---|
| BIO INFORMATION BASED ON EYE | WHETHER EYE IS BLOODSHOT | USING COLOR DISTRIBUTION OF EYE IMAGE OBTAINED BY CAMERA | INCREASE RATE OF NUMBER OF PIXELS HAVING R VALUE APPROXIMATE 255 ≥ 40% |
| | WHETHER EYE IS DRY | 1. USING VALUE SENSED BY HUMIDITY SENSOR 2. USING SOUND AND EYE IMAGE OBTAINED BY MICROPHONE INCLUDED IN ELECTRONIC PATCH | 1. HUMIDITY ≤ 30% & MAINTAINING 1 HOUR 2. DETECTING SOUND GENERATED DUE TO DRY EYE FOR MORE THAN CERTAIN PERIOD OF TIME |
| | NUMBER OF EYE BLINK | USING EYE IMAGE OBTAINED DURING CERTAIN PERIOD OF TIME BY CAMERA | NUMBER OF EYE BLINK ≤ 9/PER MINUTE VARIANCE OF NUMBER OF EYE BLINK≥15% |
| | CYCLE OF EYE BLINK | USING EYE IMAGE OBTAINED DURING CERTAIN PERIOD OF TIME BY CAMERA | CYCLE OF EYE BLINK SECONDS ≥ 15초 VARIANCE OF CYCLE OF EYE BLINK≥15% |
| | WHETHER POSITION OF PUPIL IS CHANGED | USING EYE IMAGE OBTAINED DURING CERTAIN PERIOD OF TIME OR EYE IMAGE OBTAINED BY CERTAIN PERIOD OF TIME UNIT BY CAMERA | VARIANCE OF POSITION ≤ 0.4mm |
| | WHETHER PUPIL IS CHANGED | USING PUPIL IMAGE OBTAINED DURING CERTAIN PERIOD OF TIME OR PUPIL IMAGE OBTAINED BY CERTAIN PERIOD OF TIME UNIT BY CAMERA | CONTINUING MORE THAN 1 HOUR IN STATUS WHERE WIDTH OF PUPIL IS REDUCED |

FIG. 1C-2

| BIO INFORMATION OF WEARER | | OBTAINING METHOD | REPRODUCTION STOP REQUEST REFERENCE |
|---|---|---|---|
| HEALTH INFORMATION | BODY TEMPERATURE | USING SENSING VALUE GENERATED BY BODY TEMPERATURE SENSOR OR VARIANCE OF SENSING VALUE OF BODY TEMPERATURE SENSOR | BODY TEMPERATURE > AVERAGE BODY TEMPERATURE, BODY TEMPERATURE < AVERAGE BODY TEMPERATURE, VARIANCE OF BODY TEMPERATURE > 1℃ |
| | SWEATING AMOUNT | USING SWEATING AMOUNT GENERATED BY SWEATING SENSOR OR VARIANCE OF SWEATING AMOUNT | SWEATING AMOUNT > AVERAGE SWEATING AMOUNT, VARIANCE OF SWEATING AMOUNT > 10% |
| | BLOOD PRESSURE | USING BLOOD PRESSURE GENERATED BY BLOOD PRESSURE SENSOR OR VARIANCE OF BLOOD PRESSURE | BLOOD PRESSURE > NORMAL BLOOD PRESSURE, BLOOD PRESSURE < NORMAL BLOOD PRESSURE, VARIANCE OF BLOOD PRESSURE > 20% |
| | PULSE | USING PULSE GENERATED BY PULSE SENSOR OR VARIANCE OF PULSE | PULSE > NORMAL PULSE, PULSE < NORMAL PULSE, VARIANCE OF PULSE > 10% |
| | ACTIVITY | USING ACTIVITY OBTAINED BY HEALTH APPLICATION, LOCATION TRACKING APPLICATION, AND EXTERNAL ACTIVITY MEASUREMENT DEVICE OR VARIANCE OF ACTIVITY | ACTIVITY > NORMAL ACTIVITY |
| | BLOOD SUGAR | USING BLOOD SUGAR GENERATED BY BLOOD SUGAR SENSOR OR VARIANCE OF BLOOD SUGAR | BLOOD SUGAR > NORMAL BLOOD SUGAR, VARIANCE OF BLOOD SUGAR > 10% |
| | MEDICAL INFORMATION | USING MEDICAL INFORMATION RECEIVED FROM SERVER | CHANGE REPRODUCTION STOP REQUEST REFERENCE OF DIFFERENT INFORMATION ACCORDING TO DESCRIPTION OF INFORMATION |

FIG. 1F

| PERIPHERAL ENVIRONMENT INFORMATION | OBTAINING METHOD | REPRODUCTION STOP REQUEST REFERENCE |
|---|---|---|
| COLOR TEMPERATURE | USING SENSING VALUE OF WEARABLE DEVICE OR EXTERNAL DEVICE | COLOR TEMPERATURE AND MAINTENANCE TIME |
| LIGHT (OR INFRARED RAYS) | | BRIGHTNESS LEVEL AND EXPOSURE TIME INFRARED RAY INDEX AND EXPOSURE TIME |
| TEMPERATURE | | TEMPERATURE > REFERENCE TEMPERATURE VARIANCE OF TEMPERATURE > 3°C |
| HUMIDITY | | HUMIDITY < 30%, HUMIDITY > 70% |
| WIND | | INTENSITY OF WIND > INTENSITY OF REFERENCE WIND VARIANCE OF INTENSITY OF WIND > 10% |
| ALTITUDE | | ALTITUDE > REFERENCE ALTITUDE VARIANCE OF ALTITUDE > 10% |
| AIR PRESSURE | | AIR PRESSURE > REFERENCE AIR PRESSURE VARIANCE OF AIR PRESSURE > 10% |
| FINE DUST | | DENSITY OF FINE DUST > DENSITY OF REFERENCE FINE DUST VARIANCE OF DENSITY OF FINE DUST > 10% |

FIG. 1G

| PERSONAL INFORMATION | OBTAINING METHOD | REPRODUCTION STOP REQUEST REFERENCE |
|---|---|---|
| AGE | USING AT LEAST ONE OF INPUT INFORMATION OF WEARER, INFORMATION STORED IN WEARABLE DEVICE, AND INFORMATION STORED IN EXTERNAL DEVICE | CHANGE REPRODUCTION STOP REQUEST REFERENCE OF DIFFERENT INFORMATION ACCORDING TO AGE |
| SCHEDULE INFORMATION | | CHANGE REPRODUCTION STOP REQUEST REFERENCE OF DIFFERENT INFORMATION ACCORDING TO SCHEDULE DESCRIPTION |

FIG. 8A
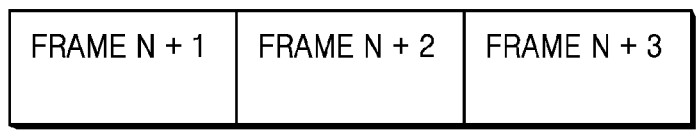
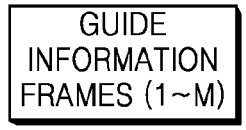
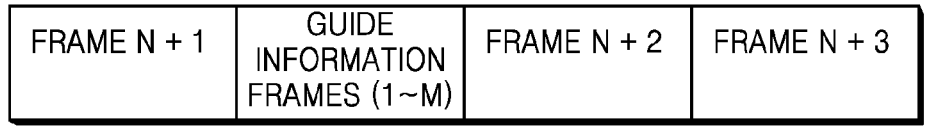

FIG. 11

| REFERENCE INFORMATION | NUMBER OF GUIDES |
|---|---|
| 1 HOUR | 1 |
| 2 HOURS | 2 |
| 3 HOURS | 3 |
| 4 HOURS | 4 |
| MORE THAN 5 HOURS | 5 |

FIG. 12

| REFERENCE INFORMATION | NUMBER OF GUIDES |
|---|---|
| 50% | 1 |
| 60% | 2 |
| MORE THAN 70% | 3 |

FIG. 13A

| REFERENCE INFORMATION | NUMBER OF GUIDES |
|---|---|
| MAINTAIN AT 35 FOR 3 HOURS | 1 |
| MAINTAIN AT 44 FOR 2 HOURS | 2 |
| MAINTAIN AT 49 FOR 1 HOUR | 3 |

FIG. 13B

| REFERENCE INFORMATION | NUMBER OF GUIDES |
|---|---|
| 49℃ | 1 |
| 49℃ | 2 |
| 49℃ | 3 |

FIG. 14

| REFERENCE INFORMATION | NUMBER OF GUIDES |
|---|---|
| INCREASE RATE OF NUMBER OF PIXELS HAVING R VALUE APPROXIMATE 255 ≥ 20% | 1 |
| INCREASE RATE OF NUMBER OF PIXELS HAVING R VALUE APPROXIMATE 255 ≥ 30% | 2 |
| INCREASE RATE OF NUMBER OF PIXELS HAVING R VALUE APPROXIMATE 255 ≥ 40% | 3 |

FIG. 15

| REFERENCE INFORMATION | NUMBER OF GUIDES |
|---|---|
| HUMIDITY ≤ 30%<br>MAINTAIN & 1 HOUR | 1 |
| HUMIDITY ≤ 30%<br>MAINTAIN & 1 HOUR 30 MINUTES | 2 |
| HUMIDITY ≤ 30%<br>MAINTAIN & 2 HOURS | 3 |

FIG. 18

| TYPE OF CONTENT | REFERENCE INFORMATION |
|---|---|
| GAME | 1 HOUR |
| MOVIE | 2 HOURS |
| E-BOOK | 3 HOURS |
| MUSIC | 4 HOURS |

2201

WEARABLE DEVICE AND METHOD OF OPERATING THE SAME

CROSS-REFERENCE TO RELATED APPLICATIONS

This application is a continuation application of U.S. patent application Ser. No. 14/665,274, filed Mar. 23, 2015, which claims priority from Korean Patent Application No. 10-2014-0033704, filed on Mar. 21, 2014 in the Korean Intellectual Property Office (KIPO), Korean Patent Application No. 10-2014-0091319, filed on Jul. 18, 2014 in the KIPO, and Korean Patent Application No. 10-2015-0004456, filed on Jan. 12, 2015 in the KIPO, the disclosures of which are incorporated herein in their entireties by reference.

BACKGROUND

1. Field

Apparatuses and methods consistent with exemplary embodiments relate to a wearable device and a method of operating the wearable device, and more particularly, to a wearable device capable of protecting a user's health and a method of operating the wearable device.

2. Description of the Related Art

As research into wearable devices has been actively conducted, various wearable devices have been released or their release is imminent. Examples of wearable devices include smart watches, smart glasses, and smart bands.

Wearable devices such as smart glasses may be configured to display content or allow a wearer to view content displayed on another device.

However, when the user putting on the wearable devices such as smart glasses views the content for a long time, the user may suffer from amblyopia, etc.

SUMMARY

Aspects of one or more exemplary embodiments provide a wearable device capable of protecting a user's health such as by reducing a wearer's fatigue or protecting a wearer's eyesight and a method of operating the wearable device.

Additional aspects will be set forth in part in the description which follows and, in part, will be apparent from the description, or may be learned by practice of exemplary embodiments.

According to an aspect of an exemplary embodiment, there is provided a wearable device including: a display configured to display content; a user input unit configured to receive a command of a wearer; and a controller configured to: when the content is reproduced in a state in which the wearable device is worn, output, through the display and based on content reproduction related information of the wearable device, information informing the wearer that stopping reproduction of the content is requestable, and control to stop the reproduction of the content in response to a reproduction stop request for the content, received through the user input unit in response to the output information, wherein the content reproduction related information corresponds to information influential on a health of the wearer when the content is reproduced in the state in which the wearable device is worn.

The content reproduction related information of the wearable device may include at least one of: a reproduction time of the content in the state in which the wearable device is worn; a battery consumption amount of at least one of the wearable device and a device reproducing the content after starting the reproduction of the content in the state in which the wearable device is worn; and a heating temperature of the wearable device after starting the reproduction of the content in the state in which the wearable device is worn.

The wearable device may further include: a first information obtainer configured to obtain the content reproduction related information of the wearable device in connection with the reproduction of the content; and a second information obtainer configured to obtain bio information of the wearer in connection with the reproduction of the content, wherein the controller may be configured to output, through the display and based on the obtained content reproduction related information of the wearable device and the obtained bio information of the wearer, the information informing the wearer that stopping reproduction of the content is requestable.

The wearable device may further include: a third information obtainer configured to obtain peripheral environment information of the wearable device in connection with the reproduction of the content, wherein the controller may be configured to output, through the display and based on the content reproduction related information of the wearable device and the obtained peripheral environment information of the wearable device, the information informing the wearer that stopping reproduction of the content is requestable.

The wearable device may further include: a fourth information obtainer configured to obtain personal information of the wearer in connection with the reproduction of the content, wherein the controller may be configured to output, through the display and based on the content reproduction related information of the wearable device and the obtained personal information of the wearer, the information informing the wearer that stopping reproduction of the content is requestable.

The controller may be configured to continuously reproduce the content through the display when a reproduction stop rejection for the content is received through the user input unit in response to the output information informing the wearer that stopping reproduction of the content is requestable.

The controller may be configured to output, through the display, the information in a display form in which: the information is overlapped with the content; a frame of the information is inserted between frames of the content; or the information is displayed on a display region different from a display region on which the content is reproduced.

The controller may be configured to control the wearable device such that different content is viewable using the wearable device when the reproduction of the content is stopped in response to the reproduction stop request for the content.

The controller may be configured to output, through the display, information regarding a plurality of different pieces of contents, and to control the wearable device to allow viewing of content selected from among the plurality of different pieces of contents when a selection signal is received in response to the output information regarding the plurality of different pieces of contents.

The controller may be configured to output, through the display, the information by applying different reference information to the content reproduction related information of the wearable device according to a type of the content.

The controller may be configured to output the information informing the wearer that stopping reproduction of the content is requestable based on a comparison between the content reproduction related information and predetermined content reproduction stop request reference information.

According to an aspect of another exemplary embodiment, there is provided a method of operating a wearable device, the method including: reproducing content through a display of the wearable device; obtaining content reproduction related information of the wearable device, the content reproduction related information corresponding to information influential on a health of a wearer when the content is reproduced in a state in which the wearable device is worn; outputting, through the display and based on the obtained content reproduction related information, information informing the wearer that stopping reproduction of the content is requestable; and controlling the wearable device to stop the reproduction of the content in response to a reproduction stop request for the content, received through a user input in response to the output information.

The content reproduction related information of the wearable device may include at least one of: a reproduction time of the content in the status in which the wearable device is worn; a battery consumption amount of at least one of the wearable device and a device reproducing the content after starting the reproduction of the content in the status in which the wearable device is worn; and a heating temperature of the wearable device after starting the reproduction of the content in the status in which the wearable device is worn.

The method may further include: obtaining the content reproduction related information of the wearable device in connection with the reproduction of the content; and obtaining bio information of the wearer in connection with the reproduction of the content, wherein the outputting the information informing the wearer may include outputting, through the display and based on the obtained content reproduction related information of the wearable device and the obtained bio information of the wearer, the information informing the wearer.

The method may further include: obtaining peripheral environment information of the wearable device in connection with the reproduction of the content, wherein the outputting the information informing the wearer may include outputting, through the display and based on the content reproduction related information of the wearable device and the obtained peripheral environment information of the wearable device, the information informing the wearer.

The method may further include: obtaining personal information of the wearer in connection with the reproduction of the content, wherein the outputting the information may include outputting, through the display and based on the content reproduction related information of the wearable device and the obtained personal information of the wearer, the information informing the wearer.

The method may further include: receiving, by the wearable device, a continuous reproduction request for the content in response to the output, the information informing the wearer; and continuously reproducing the content in response to the received continuous reproduction request for the content.

The outputting the information informing the wearer may include outputting, through the display, the information informing the wearer in a display form in which: the information is overlapped with the content; a frame of the information informing the wearer is inserted between frames of the content on the display; or the information informing the wearer is displayed on a display region different from a display region on which the content is reproduced.

The method may further include reproducing, by the wearable device, different content when the reproduction of the content is stopped in response to the reproduction stop request for the content.

The reproducing the different content may include: outputting, through the display, information regarding a plurality of different pieces of contents; receiving a selection signal based on the output information regarding the plurality of different pieces of contents; and providing content selected from among the plurality of different pieces of contents in response to the received selection signal.

The outputting the information informing the wearer may include outputting, through the display, the information informing the wearer by applying different reference information to the content reproduction related information of the wearable device according to a type of the content.

According to an aspect of another exemplary embodiment, there is provided a non-transitory computer-readable recording medium having recorded thereon a program executable by a computer for performing the method.

According to an aspect of another exemplary embodiment, there is provided a wearable device including: a display configured to display content; a user input unit configured to receive a command of a wearer; and a controller configured to, when the content is reproduced in a state in which the wearable device is worn, output, through the display and based on content reproduction related information of the wearable device, information regarding stopping reproduction or viewing of the content, wherein the content reproduction related information corresponds to information influential on a health of the wearer.

The content reproduction related information of the wearable device may include at least one of: a reproduction time of the content in the state in which the wearable device is worn; a battery consumption amount of at least one of the wearable device and a device reproducing the content after starting the reproduction of the content in the state in which the wearable device is worn; and a heating temperature of the wearable device after starting the reproduction of the content in the state in which the wearable device is worn.

The wearable device may further include: a first information obtainer configured to obtain the content reproduction related information of the wearable device in connection with the reproduction of the content; and a second information obtainer configured to obtain bio information of the wearer in connection with the reproduction of the content, wherein the controller may be configured to output, through the display and based on the obtained content reproduction related information of the wearable device and the obtained bio information of the wearer, the information regarding stopping reproduction or viewing of the content.

The wearable device may further include: a third information obtainer configured to obtain peripheral environment information of the wearable device in connection with the reproduction of the content, wherein the controller may be configured to output, through the display and based on the content reproduction related information of the wearable device and the obtained peripheral environment information of the wearable device, the information regarding stopping reproduction or viewing of the content.

The wearable device may further include: a fourth information obtainer configured to obtain personal information of the wearer in connection with the reproduction of the content, wherein the controller may be configured to output, through the display and based on the content reproduction related information of the wearable device and the obtained personal information of the wearer, the information regarding stopping reproduction or viewing of the content.

The controller may be configured to continuously reproduce the content through the display when a reproduction stop rejection for the content is received through the user input unit in response to the output information.

The controller may be configured to output, through the display, the information in a display form in which: the information is overlapped with the content; a frame of the information is inserted between frames of the content; or the information is displayed on a display region different from a display region on which the content is reproduced.

The controller may be configured to control the wearable device such that different content is viewable using the wearable device when the reproduction of the content is stopped in response to a reproduction stop request for the content input by the wearer in response to the output information.

The controller may be configured to output, through the display, information regarding a plurality of different pieces of contents, and to control the wearable device to allow viewing of content selected from among the plurality of different pieces of contents when a selection signal is received in response to the output information regarding the plurality of different pieces of contents.

The controller may be configured to output, through the display, the information by applying different reference information to the content reproduction related information of the wearable device according to a type of the content.

BRIEF DESCRIPTION OF THE DRAWINGS

These and/or other aspects will become apparent and more readily appreciated from the following description of exemplary embodiments, taken in conjunction with the accompanying drawings in which:

FIG. 1B is a table for explaining a method of obtaining content reproduction related information of a wearable device and a content reproduction stop request reference, according to an exemplary embodiment;

FIGS. 1C-1 and 1C-2 are tables for explaining a method of obtaining bio information of a wearer and a reproduction stop request reference, according to an exemplary embodiment;

FIG. 1F is a table for explaining a method of obtaining peripheral environment information of a wearable device and a reproduction stop request reference, according to an exemplary embodiment;

FIG. 1G is a table for explaining a method of obtaining personal information of a wearer and a reproduction stop request reference, according to an exemplary embodiment;

FIG. 8A is a diagram for explaining a relationship between a reproduction stop request guide information frame and an image frame that are displayed, according to an exemplary embodiment;

FIG. 11 is a table of a relationship between reference information set in a wearable device and the number of reproduction stop request guides when obtained information is a reproduction time of content, according to an exemplary embodiment;

FIG. 12 is a table of a relationship between reference information set in a wearable device and the number of reproduction stop request guides when obtained information is a battery consumption amount, according to an exemplary embodiment;

FIG. 13A is a table of a relationship between reference information set in a wearable device and the number of reproduction stop request guides when obtained information relates to a heating temperature and includes the heating temperature and maintenance time information, according to an exemplary embodiment;

FIG. 13B is a table of a relationship between reference information set in a wearable device and the number of reproduction stop request guides when obtained information relates to a heating temperature and includes the heating temperature, according to an exemplary embodiment;

FIG. 14 is a table of a relationship between reference information set in a wearable device and the number of reproduction stop request guides when obtained information is information for determining whether eyes of a wearer are bloodshot, according to an exemplary embodiment;

FIG. 15 is a table of a relationship between reference information set in a wearable device and the number of reproduction stop request guides when obtained information is information for determining whether eyes of a wearer are dry, according to an exemplary embodiment;

FIG. 18 is a table of an example for explaining a relationship between a type of content and reference information;

DETAILED DESCRIPTION

Figure 1A:
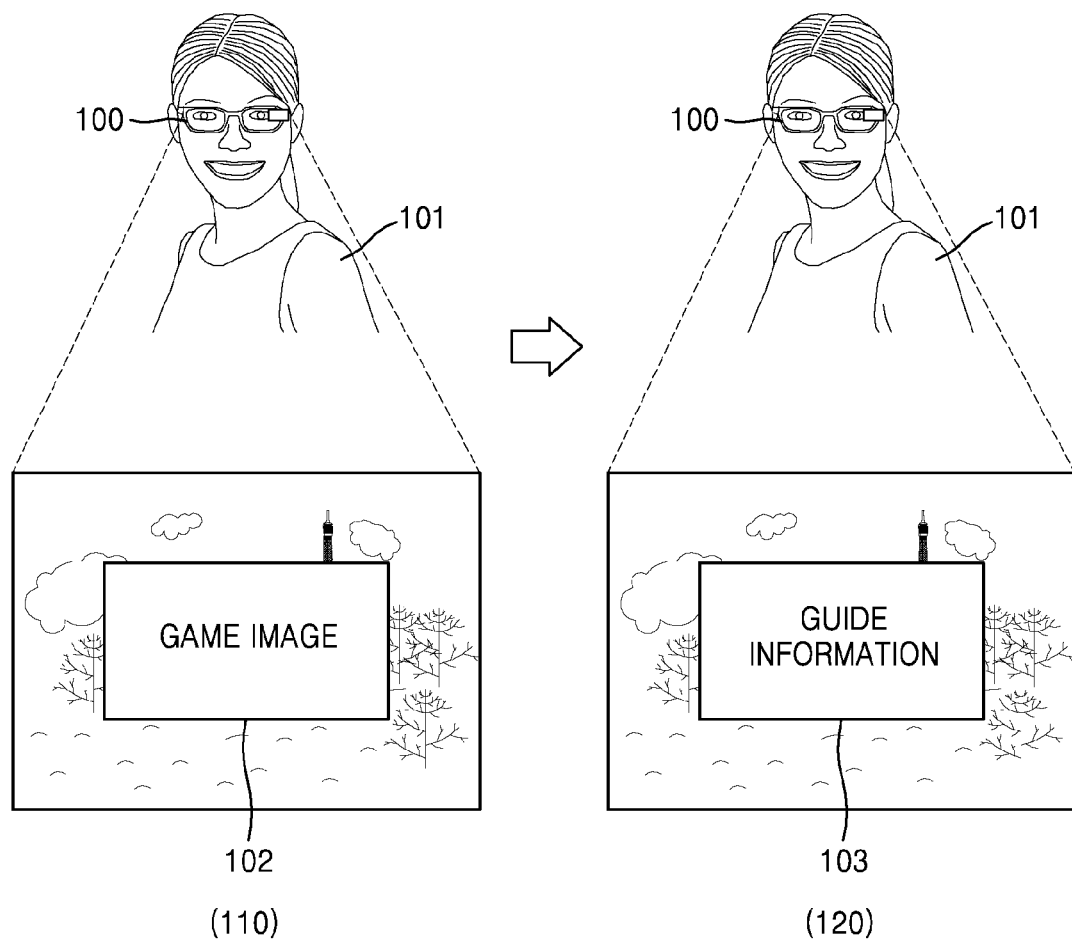
FIG. 1A is a diagram for explaining a method of operating a wearable device according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Accordingly, while exemplary embodiments are capable of various modifications and alternative forms, embodiments thereof are shown by way of example in the drawings and will herein be described in detail. It should be understood, however, that there is no intent to limit exemplary embodiments to the particular forms disclosed, but on the contrary, exemplary embodiments are to cover all modifications, equivalents, and alternatives falling within the scope of the present disclosure. Also, while describing exemplary embodiments, detailed descriptions about related well known functions or configurations that may obscure the points of exemplary embodiments are omitted.

It will be understood that, although the terms first, second, etc., may be used herein to describe various elements, these elements should not be limited by these terms. These terms are only used to distinguish one element from another.

The terms used in the present description are selected from among common terms that are currently widely used in consideration of their function in exemplary embodiments. However, the terms may be different according to an intention of one of ordinary skill in the art, a precedent, or the advent of new technology. Also, in particular cases, the terms are discretionally selected by the applicant, and the meaning of those terms will be described in detail in the corresponding part of the detailed description. Therefore, the terms used in the present description are not merely designations of the terms, but the terms are defined based on the meaning of the terms and content throughout the present disclosure.

As used herein, the singular forms "a", "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. It will be understood that, although the terms first, second, etc. may be used herein to describe various elements, these elements should not be limited by these terms.

FIG. 1A is a diagram for explaining a method of operating a wearable device 100 according to an exemplary embodiment. FIG. 1A is an example in which content reproduction stop request guide information 103, which is for informing the wearer 101 (e.g., user) about a request to stop reproduction of content 102, is displayed when a wearer 101 wears the wearable device 100 that reproduces the content 102. The content reproduction stop request guide information 103 is used to protect the health of the wearer 101. Protection of the health of the wearer 101 may include reduction of fatigue of the wearer 101 or protection of eyesight of the wearer 101, although it is understood that one or more other exemplary embodiments are not limited thereto.

The wearable device 100 may have a form that may be worn on a user's head. For example, the wearable device 100 may have forms such as eyeglasses, spectacles, sunglasses, goggles, helmets, or other types of head mounted display devices.

The wearable device 100 may be temporarily fixed onto the user's head by a frame. The wearable device 100 may include a near-to-eye display that displays an image within several centimeters from user's eyes. The wearable device 100 may be referred to as a wearable computing display device or smart glasses.

Figure 2A:
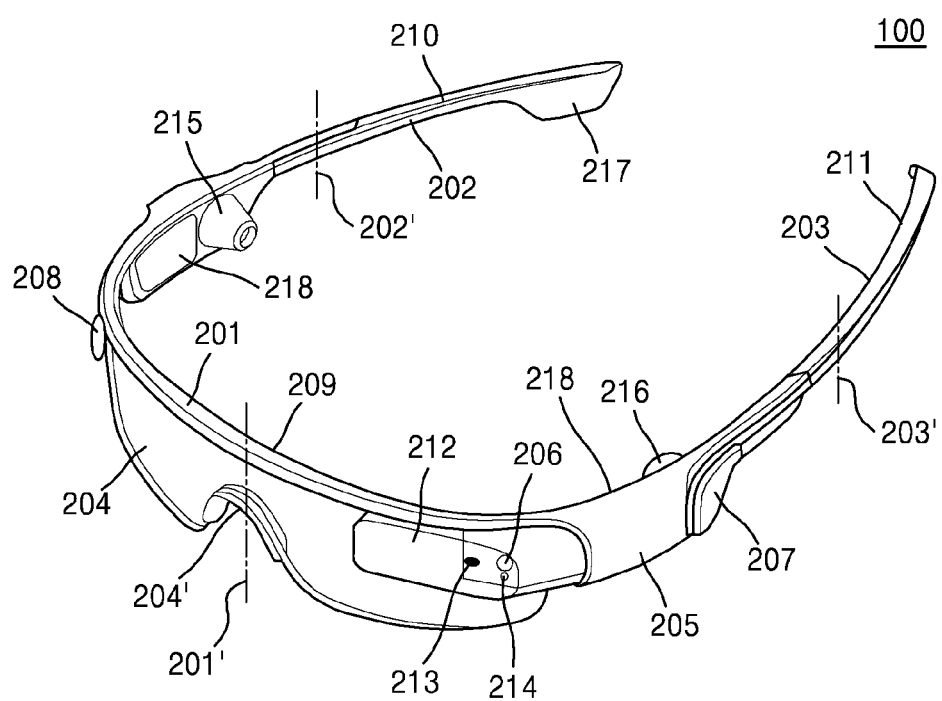
FIG. 2A is a diagram of an example of a wearable device according to an exemplary embodiment.

FIG. 2A is a diagram of an example of the wearable device 100 according to an exemplary embodiment. Referring to FIG. 2A, the wearable device 100 is configured as glasses having a single display or a monocular display.

Figure 2B:
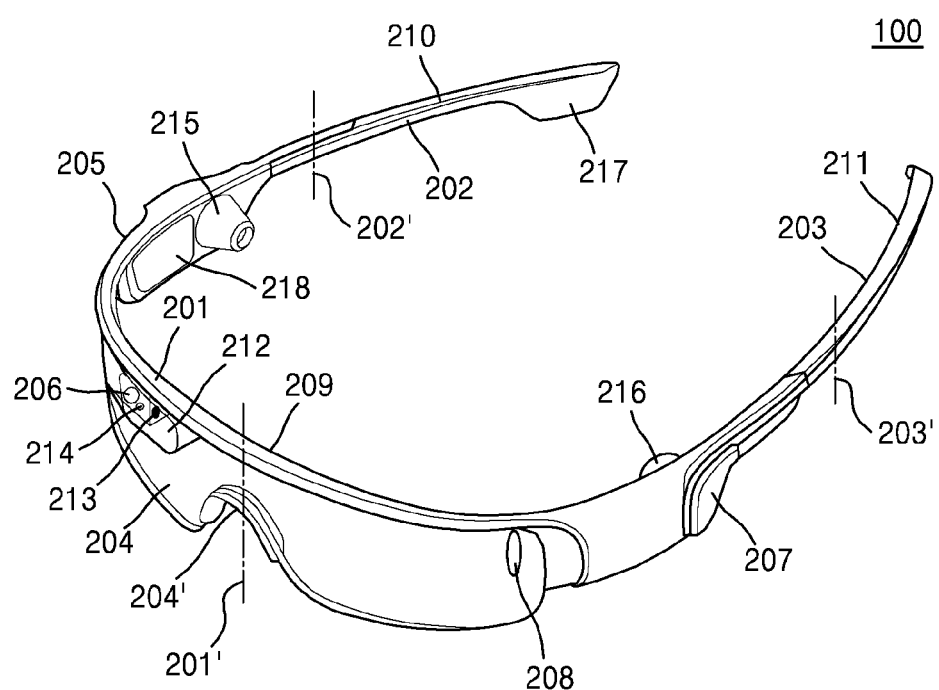
FIG. 2B is a diagram of another example of a wearable device according to an exemplary embodiment.

FIG. 2B is a diagram of another example of the wearable device 100 according to an exemplary embodiment. Referring to FIG. 2B, the wearable device 100 includes a display 212, a camera 206, a microphone 214, a ray outputter 213, a bio information obtaining camera 208, and a temperature sensor 218, which are also shown in FIG. 2A in different locations of the wearable device 100.

Referring to FIG. 2A, the wearable device 100 is configured as glasses fixed to a face of the wearer 101 through the ears and the nose of the wearer 101, but is not limited thereto in one or more other exemplary embodiments. For example, the wearable device 100 may be attached to a helmet structure or may be modified as goggles.

The wearable device 100 of FIG. 2A includes a lens frame 201, side-arms 202 and 203, a lens 204, an on-board computer 205, the camera 206, a user input unit 207 (e.g., user input device or user inputter), the bio information obtaining camera 208, a haptic module 211, a display 212, the ray outputter 213 (e.g., light outputter, light emitter, or light output device), the microphone 214, audio output units 215 and 216 (e.g., audio output devices or audio outputters), a battery 217, and the temperature sensor 218.

Some elements of the wearable device 100 may be embedded therein and other elements thereof may be mounted outside of the wearable device 100. For example, sensors 209 and 210 and the battery 217 may be embedded or included in the wearable device 100. The display 212 may be mounted or provided outside the wearable device 100. The elements embedded in the wearable device 100 and the elements mounted outside the wearable device 100 are not limited as described above. For example, the wearable device 100 may not include one or more of the sensors 209 and 210 and the haptic module 211. In this case, by way of example, the wearable device 100 may include the sensor 210 only or may include sensors mounted in more locations than those shown in FIG. 2A.

For example, the wearable device 100 may include a sweat sensor capable of sensing a sweating amount of the wearer 101 mounted in a location adjacent to the sensor 210. Furthermore, the wearable device 100 may include a body temperature sensor capable of sensing a temperature of the wearer 101 mounted in at least one of the audio output units 215 and 216.

The lens frame 201 and the side-arms 202 and 203 may be configured as solids such as plastic and/or metal or may be configured as solids such as hollow plastic and/or metal to include a material such as wirings used to connect the elements included in the wearable device 100.

The lens frame 201 and the side-arms 202 and 203 of FIG. 2A are integrally configured having no connection member or connector. Thus, the lens frame 201 and the side-arms 202 and 203 may be referred to as a frame of the wearable device 100.

Structures of the lens frame 201 and the side-arms 202 and 203 are not limited as shown in FIG. 2A.

For example, the wearable device 100 may include a connection member or connector (such as a hinge) between the lens frame 201 and the side-arms 202 and 203. For example, the wearable device 100 may include connection members between the lens frame 201 and the right side-arm 202 and between the lens frame 201 and the left side-arm 203. When the wearable device 100 includes the connection member as described above, the side-arms 202 and 203 may be folded in a direction of the lens frame 201.

For example, the wearable device 100 may include connection members in a center 201' of the lens frame 201, between the lens frame 201 and the right side-arm 202, between the lens frame 201 and the left side-arm 203, and centers 202' and 203' of the side-arms 202 and 203. When the wearable device 100 includes the connection members as described above, the lens frame 201 and the side-arms 202 and 203 may be folded in an inner direction based on each connection member, thereby minimizing a size of the wearable device 100.

The connection members that are not shown may be configured as a screw assembly or may be configured by inserting rings into grooves and connecting the rings together, but are not limited thereto.

The side-arms 202 and 203 may be configured in such a manner that allows them to be worn on the ears of the wearer 101. The side-arms 202 and 203 may be configured in a way that may extend to around the back of a head of the wearer 101.

When the side-arms 202 and 203 are configured in such a manner that allows them to extend to around the back of the head of the wearer 101, a band capable of fixing the side-arms 202 and 203 onto the head of the wearer 101 may be added between the side-arms 202 and 203.

The band may be configured as an elastic band or may be configured as a length adjustable band such that the side-arms 202 and 203 may be fixed onto the head of the wearer 101 irrespective of a size of the head of the wearer 101.

The wearable device 100 may attach a non-slip or non-sliding member capable of preventing the side-arms 202 and 203 from slipping or sliding to inner locations of the side-arms 202 and 203 contacting the back of earflaps of the wearer 101. The non-slip or non-sliding member may be configured as a material such as silicone, but the material thereof is not limited thereto. The non-slip or non-sliding member may be attached to the inner sides of the side-arms 202 and 203, but a shape thereof is not limited thereto.

Figure 4:
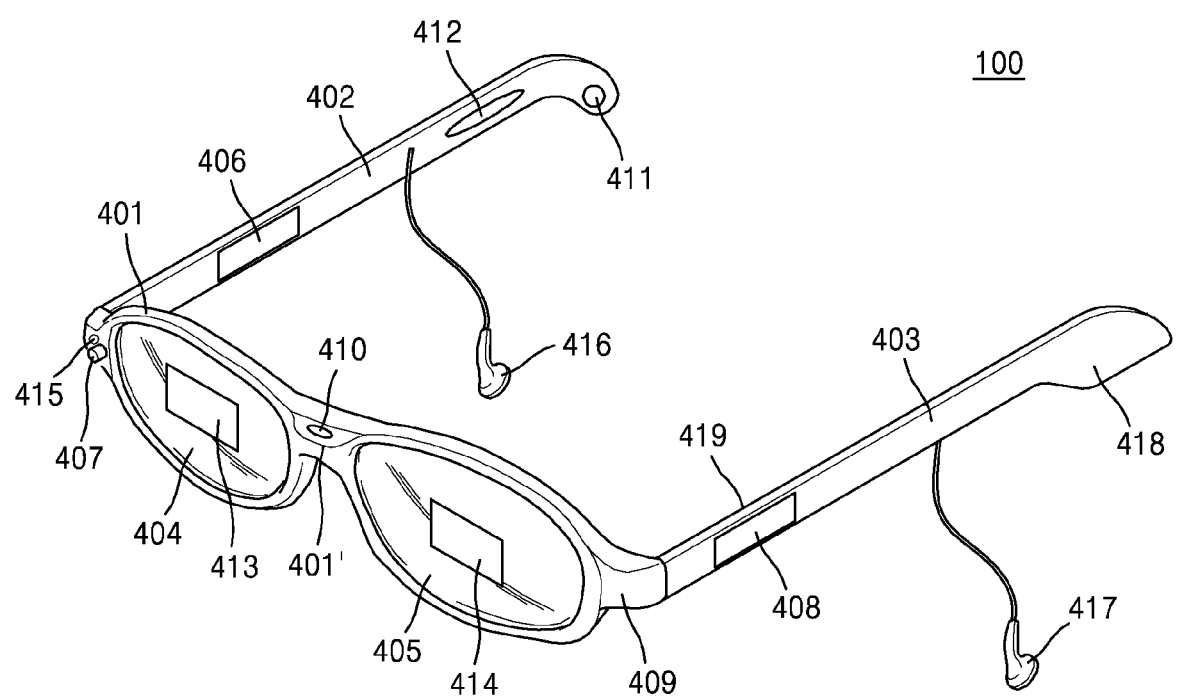
FIG. 4 is a diagram of another example of a wearable device according to an exemplary embodiment.

The lens frame 201 may be configured in such a manner that allows the lens 204 to be detached. The lens 204 of FIG. 2A may be configured integrally with a nosepiece 204', but is not limited thereto in one or more other exemplary embodiments. For example, when the lens 204 of FIG. 2A is integrally with the nosepiece 204', the lens 204 may be configured as a right lens 404 and a left lens 405 as shown in FIG. 4 that will be described below.

The lens 204 may be configured as a transparent material in such a manner that allows the wearer 101 to see a real world. The lens 204 may be configured as a material capable of transmitting light reflected through the display 212. The material that may be used as the lens 204 may include, for example, plastic such as polycarbonate or glass, but is not limited thereto in one or more other exemplary embodiments. The lens 204 may be configured as at least one coating lens of an anti-light reflection and antidazzle coating lens, an antifogging coating lens, and a sunscreen coating lens.

The on-board computer 205 may be connected to the elements included in the wearable device 100 by wire or wirelessly. The on-board computer 205 is positioned in a part of the left side-arm 203 adjacent to the lens frame 201, but is not limited thereto in one or more other exemplary embodiments. For example, the on-board computer 205 may be positioned in a part of the right side-arm 202 as shown in FIG. 2B. The on-board computer 205 may be positioned in another part of the wearable device 100, such as another part of the left side-arm 203.

The on-board computer 205 may receive data from, for example, the camera 206, the user input unit 207, the bio information obtaining camera 208, the sensors 209, 210, and 218, the microphone 214, and the temperature sensor 218. The on-board computer 205 may analyze the received data and generate information that is to be transmitted to the wearer 101 of the wearable device 100 through at least one of the display 212 and the audio output units 215 and 216. The information may be transmitted by the ray outputter 213 through the display 212.

The information that is to be transmitted to the wearer 101 may include at least one of a still image, a moving image (or video), text, and audio, but is not limited thereto in one or more other exemplary embodiments.

The camera 206 may be positioned outside the left side-arm 203 or may be embedded in the left side-arm 203. The camera 206 may be mounted in another location of the wearable device 100. For example, the camera 206 may be positioned in a part of the right side-arm 202 as shown in FIG. 2B. According to another example, the camera 206 may be positioned in a part (for example, a center) of the lens frame 201. The camera 206 may be configured as a camera used in a smart phone or a small camera such as a webcam, but is not limited thereto in one or more other exemplary embodiments. The camera 206 may be mounted in a location in which at least a part of the real world perceived by the wearer 101 of the wearable device 100 may be captured.

The user input unit 207 may include at least one of a touch pad operable by a finger of the wearer 101, a button, and a switch operable by a push manipulation of the wearer 101, but is not limited thereto in one or more other exemplary embodiments. The user input unit 207 may be positioned in a part of the left side-arm 203, but may be positioned in another part of the wearable device 100 in one or more other exemplary embodiments. For example, the user input unit 207 may be positioned in at least one of another part of the left side-arm 203, a part of the right side-arm 202 as shown in FIG. 2B, and a part of the lens frame 201.

The user input unit 207 may be used by the wearer 101 to input a command. The user input unit 207 may include an on/off switch or an on/off button capable of turning on/off power of the wearable device 100.

The bio information obtaining camera 208 may capture an eye image of the wearer 101 or a pupil image. The eye image of the wearer 101 or the pupil image may be used to obtain bio information based on eyes of the wearer 101. For example, the bio information based on the eyes using the eye image of the wearer 101 or the pupil image may include at least one piece of information among whether the eyes of the wearer 101 are bloodshot, an eye blink number of the wearer 101, an eye blink cycle of the wearer 101, whether a position of a pupil of the wearer 101 is changed, whether the pupil of the wearer 101 is changed, and the like, but is not limited thereto in one or more other exemplary embodiments.

The bio information obtaining camera 208 may be installed protruding from a right lower end of the lens frame 201, but an installation thereof is not limited thereto in one or more other exemplary embodiments. For example, the bio information obtaining camera 208 may be embedded in the lens frame 201. The bio information obtaining camera 208 may be positioned in another arbitrary part of the wearable device 100. The bio information obtaining camera 208 may be installed in a position in which the eye image of the wearer 101 or the pupil image may be captured.

The sensor 209 may be a peripheral environment sensor capable of sensing a peripheral environment of the wearable device 100. The sensor 209 may be positioned in a center inside of the lens frame 201, but is not limited thereto in one or more other exemplary embodiments. For example, the sensor 209 may be mounted in at least one location among an inner part of the lens frame 201, an outer part of the lens frame 201, an inner part of the side-arms 202 and 203, and an outer part of the side-arms 202 and 203 in addition to the center inside of the lens frame 201, but an installation location and structure of the sensor 209 are not limited thereto in one or more other exemplary embodiments.

The sensor 209 may be configured as a sensor capable of sensing the peripheral environment such as a peripheral color temperature of the wearable device 100, light (or infrared rays), temperature, humidity, wind, altitude, air pressure, fine dust, etc., but the peripheral environment to be sensed is not limited thereto in one or more other exemplary embodiments.

When the sensor 209 is a humidity sensor, the wearable device 100 may obtain bio information regarding whether the eyes of the wearer 101 are dry by using a value sensed by the sensor 109. Thus, when the sensor 209 is the humidity sensor, the sensor 209 may operate as a sensor providing a bio signal based on the eyes of the wearer 101.

The bio signal based on the eyes is used to obtain bio information based on the eyes. For example, the humidity sensor may express the bio signal based on the eyes as an electrical signal corresponding to a water vapor amount with respect to air per cubic meter (g/m3). The bio information based on the eyes may express the electrical signal output from the humidity sensor in units of grams (g).

The sensor 210 may be a sensor capable of sensing whether the wearable device 100 is worn. The sensor 210 is positioned in an inner side of the right side-arm 202 contacting the back of the ears of the wearer 101, but a location thereof is not limited thereto in one or more other exemplary embodiments. For example, the sensor 210 may be positioned in an inner side of the left side-arm 203 contacting the back of the ears of the wearer 101 or may be positioned in an inner side of a location in which the battery 217 contacting the back of the ears of the wearer 101 is embedded.

The sensor 210 may be configured as, for example, a pressure sensor. When the sensor 210 is configured as the pressure sensor, the sensor 210 may transmit a sensing value indicating whether pressure is applied and a magnitude of the pressure to the on-board computer 205. Thus, the on-board computer 205 may detect a wearing time of the wearable device 100 based on the sensing value received from the sensor 210.

The haptic module 211 is positioned in a point adjacent to an edge of the inner side of the left side-arm 203 of the wearable device 100, but an installation location thereof is not limited thereto in one or more other exemplary embodiments. For example, the haptic module 211 may be positioned in a part of the inner side of the right side-arm 202 or may be positioned in another point of the wearable device 100.

The haptic module 211 may be configured as a material capable of producing various tactile effects that the wearer 101 may feel. For example, the haptic module 211 may be configured as a material capable of producing various tactile effects such as a material capable of producing a vibration effect, a material capable of producing a stimulus effect on a contact skin surface, a material capable of producing a stimulus effect based on spray or suction of air, a material capable of producing a stimulus effect through contact of an electrode, a material capable of producing a stimulus effect using an electrostatic force, a material capable of producing cold and warm sensations using a device capable of absorbing or generating heat, and the like, but the materials used as the haptic module 211 are not limited thereto in one or more other exemplary embodiments.

The display 212 is connected to the left side-arm 203 of the wearable device 100 and positioned in a left upper end of the lens 204, but a location thereof is not limited thereto in one or more other exemplary embodiments. For example, the display 212 may be connected to the right side-arm 202 such that the display 212 is positioned in a right center of the lens 204 or may be connected to the left side-arm 203 such that the display 212 is positioned in a left center of the lens 204.

The display 212 may be connected to the right side-arm 202 of the wearable device 100 and positioned in a right upper end of the lens 204 as shown in FIG. 2B.

The display 212 of FIG. 2A may be configured as a translucent optical waveguide (for example, a prism), but is not limited thereto in one or more other exemplary embodiments. The display 212 may reflect light output from the light outputter 213 to focus an image on a fovea of retina of the eyes of the wearer 101.

The light outputter 213 may be configured as, for example, a mini projector, but is not limited thereto in one or more other exemplary embodiments.

The microphone 214 may receive or capture a voice of the wearer 101, sound other than the voice of the wearer 101, etc.

The audio output units 215 and 216 are configured as earphones that may be mounted in the ears of the wearer 101 of the wearable device 100, but are not limited thereto in one or more other exemplary embodiments. The audio output unit 215 may be positioned in the inner side of the right side-arm 202 such that the audio output unit 215 may be mounted on a right ear of the wearer 101 of the wearable device 100. The audio output unit 216 may be positioned in the inner side of the left side-arm 203 such that the audio output unit 216 may be mounted on a left ear of the wearer 101 of the wearable device 100.

The audio output units 215 and 216 may be mounted in such a manner that allows them to be fixed to the wearable device 100 as shown in FIG. 2A, but are not limited thereto in one or more other exemplary embodiments. For example, the audio output units 215 and 216 may be configured to be detachable from the wearable device 100. Thus, the wearer 101 of the wearable device 100 may selectively wear the audio output units 215 and 216 on the ears of the wearer 101.

When the audio output units 215 and 216 are detachable from the wearable device 100, the audio output units 215 and 216 may be positioned in the inner sides of the side-arms 202 and 203 contacting the back of the ears of the wearer 101. Accordingly, the wearer 101 may get the audio output units 215 and 216 out of the side-arms 202 and 203 and then wear the audio output units 215 and 216 on the ears of the wearer 101.

When the audio output units 215 and 216 are worn on the ears of the wearer 101 from the side-arms 202 and 203, the audio output units 215 and 216 may be connected to the wearable device 100 by wire or wirelessly.

When the audio output units 215 and 216 are connected to the wearable device 100 by wired, a connection line between the audio output units 215 and 216 and the wearable devices 100 may be embedded in the wearable device 100 when the audio output units 215 and 216 are mounted in the wearable device 100.

When the audio output units 215 and 216 are connected to the wearable device 100 wirelessly, the audio output units 215 and 216 may communicate with the wearable device 100 based on a near field wireless communication. When the audio output units 215 and 216 are connected to the wearable device 100 wirelessly, each of the audio output units 215 and 216 and the on-board computer 205 may include a communication module capable of performing near field communication.

The wearable device 100 may include a connection member based on an elastic material (for example, a spring) between the audio output units 215 and 216 and the wearable device 100. In this case, a shape of the connection member based on the elastic material may be changed according to locations of the ears of the wearer 101.

For example, the connection member may be modified to allow the audio output units 215 and 216 to be inclined in at least one direction among an east direction, a west direction, a south direction, a north direction, an east-west direction, a west-south direction, and a south-north direction or may be modified according to a rotation of 360 degrees.

When the wearable device 100 includes the connection member based on the elastic material between the audio output units 215 and 216 and the wearable device 100, the audio output units 215 and 216 and the wearable device 210 may be configured to communicate with each other by wire or wirelessly.

The audio output units 215 and 216 may be configured as a bone conduction speaker. The audio output units 215 and 216 according to one or more exemplary embodiments may output guide information as an audio signal informing that it may be requested to stop reproducing content.

A body temperature sensor capable of sensing a temperature of the wearer 101 may be mounted in at least one of the audio output units 215 and 216. A sensing value output from the body temperature sensor mounted in the audio output units 215 and 216 may be transmitted to the on-board computer 205. The on-board computer 205 may obtain temperature information of the wearer 101 by using the received sensing value.

The battery 217 is embedded in an edge of the right side-arm 202 of the wearable device 100, but is not limited thereto in one or more other exemplary embodiments. For example, the battery 217 may be embedded in an edge of the left side-arm 203 of the wearable device 100. The wearable device 100 may mount a connector or a port in a location adjacent to a location in which the battery 217 is embedded. The connector or the port is used to connect an external power supply device and the battery 217 and charge the battery 217. The connector or the port may be configured as, for example, a universal series bus (USB) jack.

The battery 217 may be embedded in a detachable frame in the right side-arm 202 of the wearable device 100. The frame in which the battery 217 is embedded may include the connector or the port capable of connecting the external power supply device and the battery 217 and charge the battery 217. The frame in which the battery 217 is embedded and the wearable device 100 may be configured to be connected to each other by using the USB jack, but are not limited thereto in one or more other exemplary embodiments. The frame in which the battery 217 is embedded may be referred to as a battery pack. The temperature sensor 218 may be mounted in a location adjacent to the on-board computer 205 of the wearable device 100 to sense a heating temperature of the wearable device 100. A sensing value output from the temperature sensor 218 may be transmitted to the on-board computer 205. The on-board computer 205 may obtain the heating temperature of the wearable device 100 by using the received sensing value. A location of the temperature sensor 218 is not limited as described above.

Figure 2C:
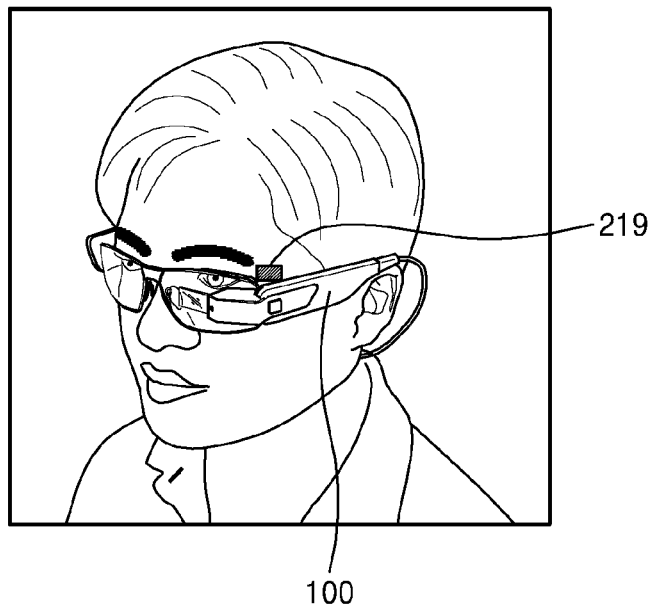
FIG. 2C is a diagram for explaining a process of obtaining information used to determine whether eyes are dry, according to an exemplary embodiment.

FIG. 2C is a diagram for explaining a process of obtaining information used to determine whether eyes are dry. The wearable device 100 may receive sound generated when the eyes are dry from an electronic patch 219 in which a microphone is embedded as shown in FIG. 2C. The electronic patch 219 may include a communication module (e.g., communication device or communicator) capable of wireless communication with the wearable device 100. The communication module may communicate with the wearable device 100 based on short-distance communication such as Near Field Communication (NFC), Bluetooth, infrared rays, etc.

To receive the sound generated when the eyes are dry from the electronic patch 219, the wearable device 100 may execute an application for the electronic patch 219 as a background application when reproducing content. The electronic patch 219 may be attached to the location adjacent to the eyes of the wearer 101. The microphone embedded in the electronic patch 219 may block sound around the wearer 101 or the voice of the wearer 101 and receive the sound generated when the eyes are dry by using a location in which the electronic patch 219 is attached.

Figure 2D:
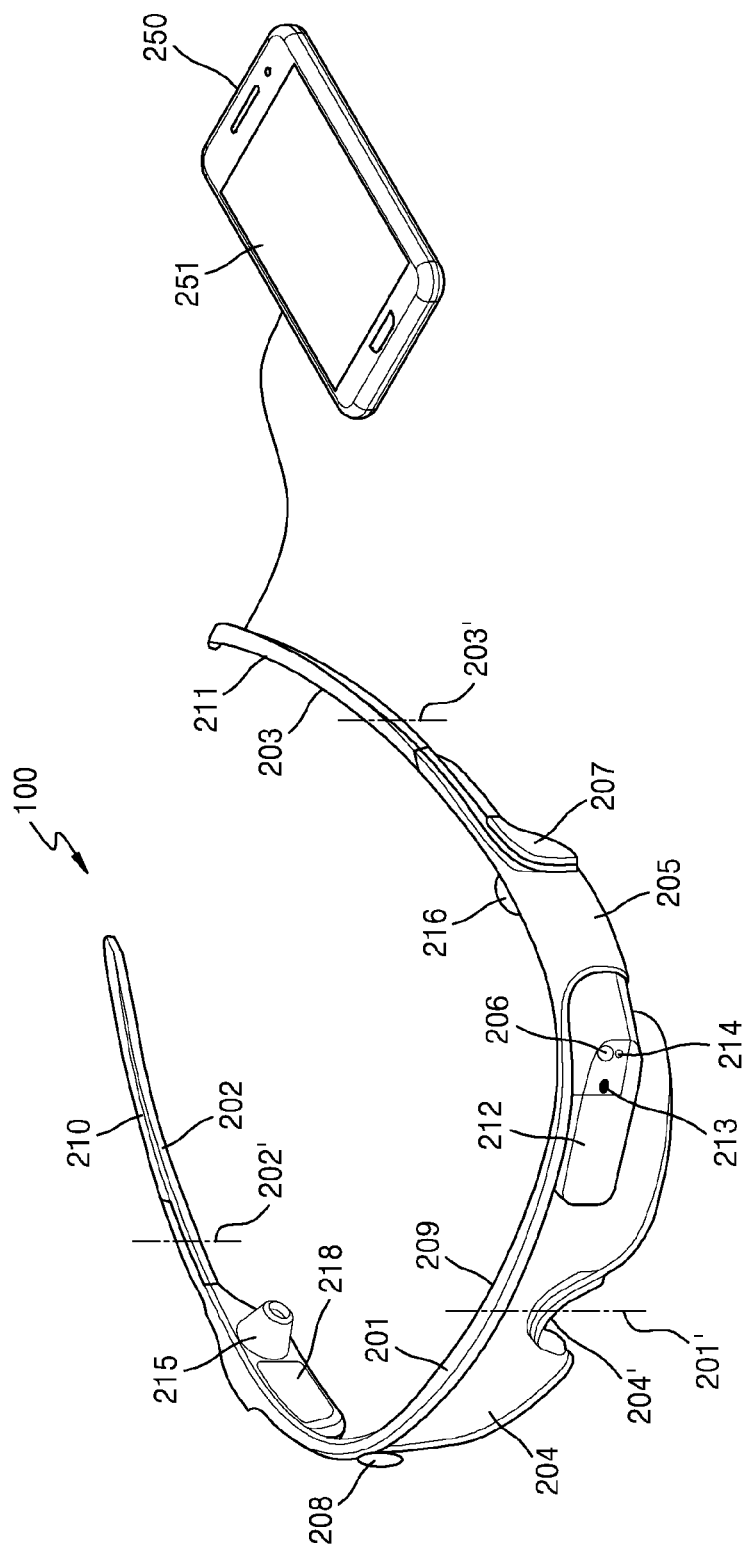
FIG. 2D is a diagram of another example of a wearable device according to an exemplary embodiment.

FIG. 2D is a diagram of another example of the wearable device 100 according to an exemplary embodiment. Referring to FIG. 2D, the wearable device 100 may be connected to a mobile device 250 by wire (for example, a USB cable) to transmit and receive data to and from the mobile device 250, but a method of transmitting and receiving the data between the wearable device 100 and the mobile device 250 is not limited thereto in one or more other exemplary embodiments. For example, the wearable device 100 and the mobile device 250 may be connected to each other wirelessly (for example, near field communication such as Bluetooth) to transmit and receive the data. The mobile device 250 includes a display 251.

The wearable device 100 may receive content that is to be reproduced from the mobile device 250. Reproduction of the content using the wearable device 100 may be controlled according to a user input through the mobile device 250 or the user input unit 207.

An operation of the wearable device 100 may be controlled according to the user input through the mobile device 250 or the user input unit 207. When the operation of the wearable device 100 is controlled by the mobile device 250, the wearable device 100 may not include the on-board computer 205. According to another exemplary embodiment, when the operation of the wearable device 100 is controlled by the mobile device 250, the on-board computer 205 included in the wearable device 100 may be controlled by the mobile device 250.

The wearable device 100 of FIG. 2D may not include the battery 217 of FIG. 2A and may receive power from the mobile device 250. Furthermore, the wearable device 100 of FIG. 2D may not include the microphone 214 and the audio output units 215 and 216 and may use a microphone and an audio output unit that are embedded in the mobile device 250.

Figure 2E:
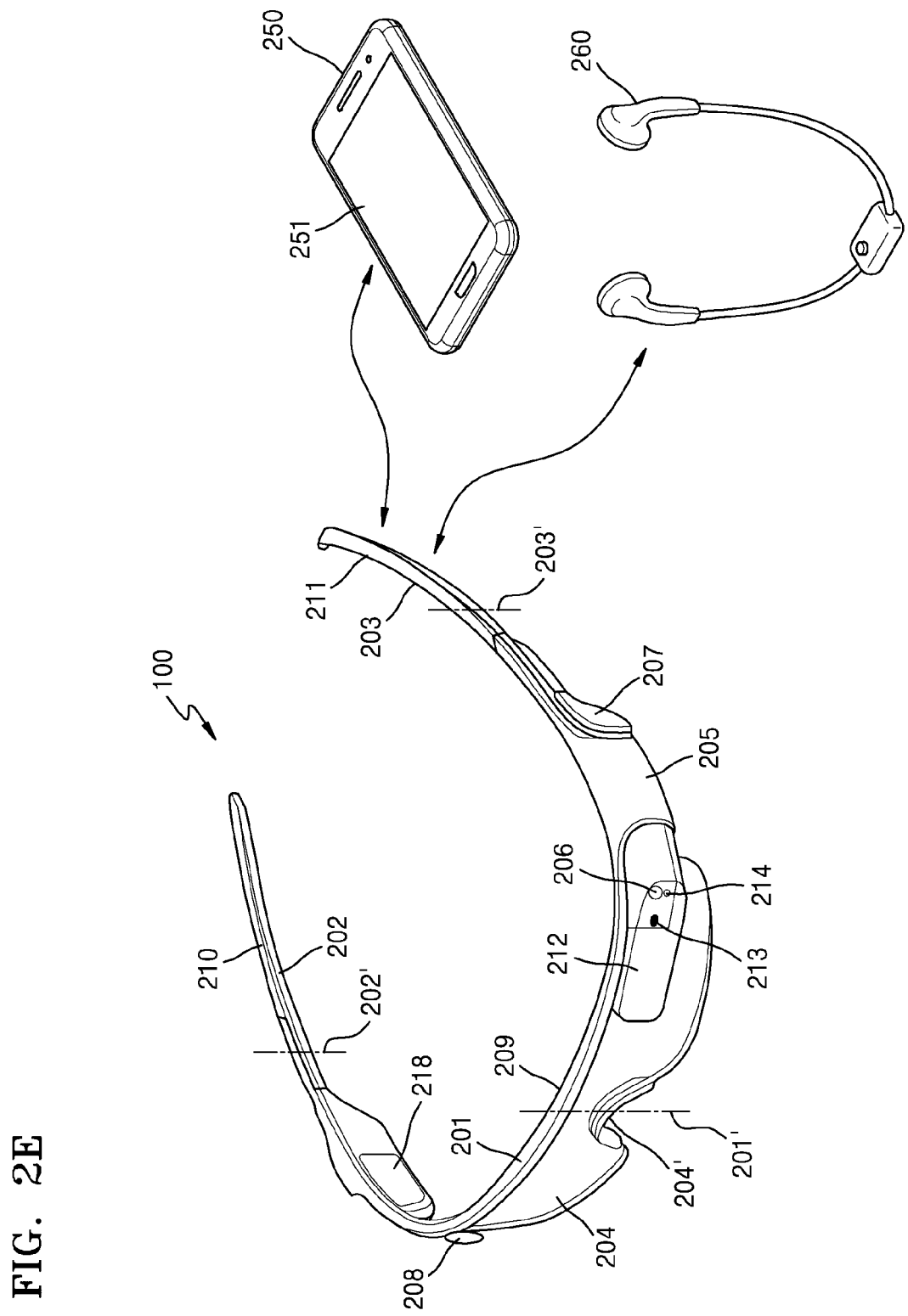
FIG. 2E is a diagram of another example of a wearable device according to an exemplary embodiment.

FIG. 2E is a diagram of another example of the wearable device 100 according to an exemplary embodiment. The wearable device 100 of FIG. 2E may transmit and receive data to and from the mobile device 250 by wire or wirelessly like the wearable device 100 of FIG. 2D.

The wearable device 100 of FIG. 2E may not include the battery 217 like the wearable device 100 of FIG. 2D and may receive power from the mobile device 250.

The wearable device 100 of FIG. 2E does not include the audio output units 215 and 216 and may output audio through wearable earphones 260. The wearable device 100 of FIG. 2E may be connected to the wearable earphones 260 wirelessly (for example, through Bluetooth communication) or by wire and output an audio signal included in reproduced content through the wearable earphones 260. The wearable earphones 260 may be referred to as mobile earphones.

Figure 2F:
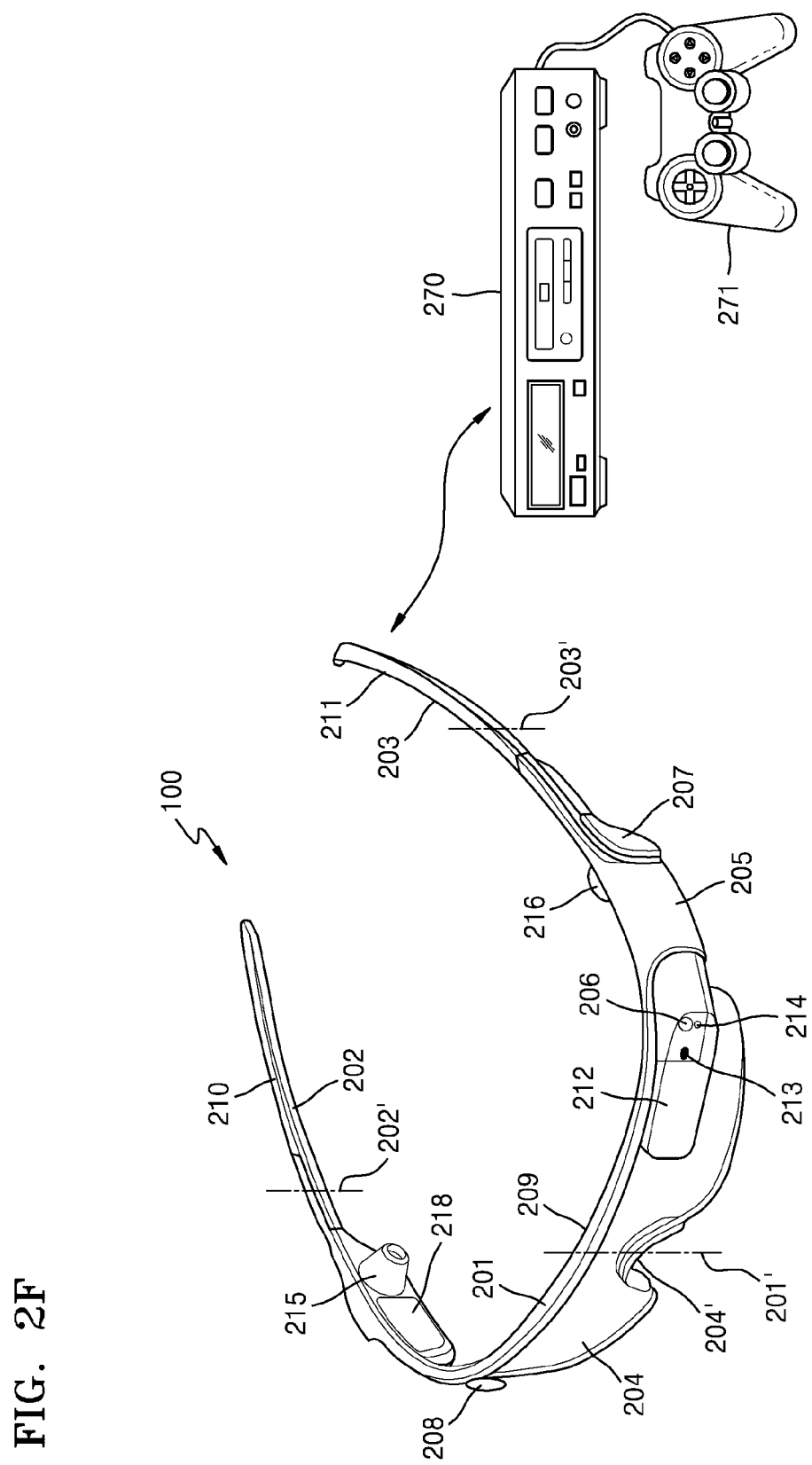
FIG. 2F is a diagram of another example of a wearable device according to an exemplary embodiment.

FIG. 2F is a diagram of another example of the wearable device 100 according to an exemplary embodiment. The wearable device 100 of FIG. 2F may be connected to a content reproduction device 270 by wire or wirelessly. The content reproduction device 270 may include a game reproduction device, a video reproduction device, a broadcasting set top box, etc., but is not limited thereto in one or more other exemplary embodiments. The content reproduction device 270 may provide content that is to be reproduced and/or power to the wearable device 100 of FIG. 2F by wire or wirelessly.

The wearable device 100 of FIG. 2F may control an operation of the content reproduction device 270 according to a user input through the user input 207. The content reproduction device 270 may be controlled according to a user input through a dedicated input device 271.

Figure 3:
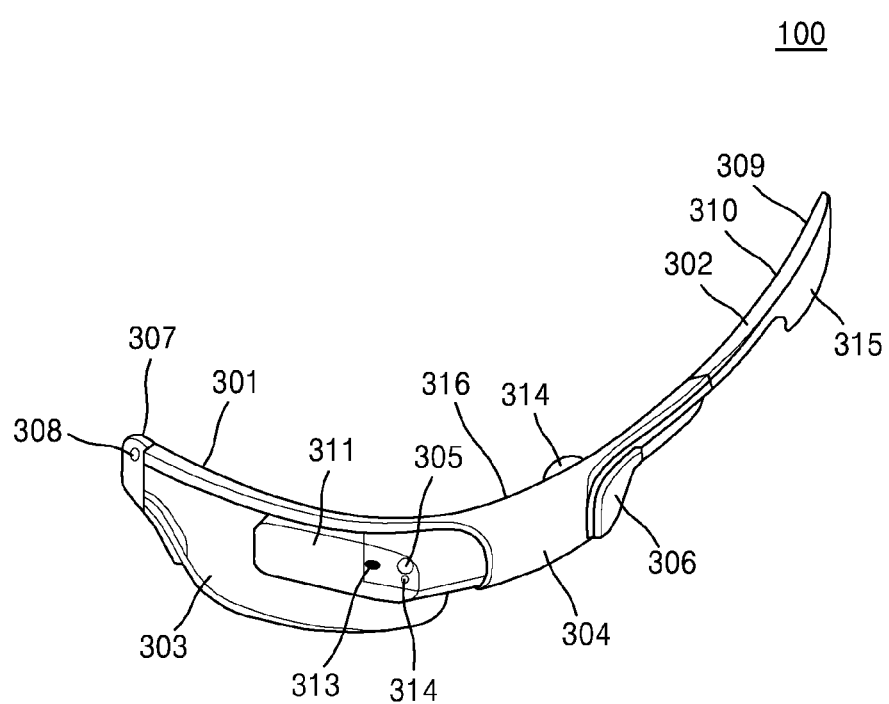
FIG. 3 is a diagram of another example of a wearable device according to an exemplary embodiment.

FIG. 3 is a diagram of another example of the wearable device 100 according to an exemplary embodiment. The wearable device 100 of FIG. 3 is in the form of glasses having a one-eyed lens 303 (i.e., a lens for one eye) and a single display or a monocular display like the wearable device 100 of FIG. 2A. The wearable device 100 of FIG. 3 is in the form of one-eyed glasses fixed to a face of the wearer 101 through a left ear of the wearer 101 and a left side of a nose of the wearer 101, but is not limited thereto in one or more other exemplary embodiments. For example, the wearable device 100 may be configured as one-eyed glasses fixed to the face of the wearer 101 through a right ear of the wearer 101 and a right side of the nose of the wearer 101. The wearable device 100 may be attached to a helmet structure.

The wearable device 100 of FIG. 3 includes a lens frame 301, a side-arm 302, a lens 303, an on-board computer 304, a camera 305, a user input unit 306 (e.g., user input device or user inputter), a bio information obtaining camera 307, sensors 308, 309, and 316, a haptic module 310, a display 311, a light outputter 312 (e.g., ray outputter, light emitter, or light outputting device), a microphone 313, an audio output unit 314 (e.g., audio output device or audio outputter), and a battery 315.

Elements and components included in the wearable device 100 of FIG. 3 are not limited as shown in FIG. 3. For example, the wearable device 100 of FIG. 3 may not include one or more of the sensors 308, 309, and 316 and the haptic module 310. For example, the wearable device 100 of FIG. 3 may include only the sensor 309 among the sensors 308, 309, and 316 or may include sensors mounted in more locations than those shown in FIG. 3. For example, the wearable device 100 of FIG. 3 may include a sweat sensor for sensing a sweating amount of the wearer 101 and a body temperature sensor for sensing a temperature of the wearer 101 mounted therein as described above with reference to the wearable device 100 of FIG. 2A.

The lens frame 301 may be configured in such a manner that allows the lens 303 to be detached as described above with reference to FIG. 2A. The wearable device 100 of FIG. 3 may include a connection member (e.g., connector) between the lens frame 301 and the side-arm 302 as described with reference to FIG. 2A. The wearable device 100 of FIG. 3 may include a connection member in a center of the side-arm 302 as described with reference to FIG. 2A.

The lens 303, the on-board computer 304, the camera 305, the user input unit 306, the bio information obtaining camera 307, the sensors 308, 309, and 316, the haptic module 310, the display 311, the light outputter 312, the microphone 313, the audio output unit 314, and the battery 315 that are included in the wearable device 100 of FIG. 3 may be positioned and configured similar to the lens 204, the on-board computer 205, the camera 206, the user input unit 207, the bio information obtaining camera 208, the sensors 209, 210, and 218, the haptic module 211, the display 212, the ray outputter 213, the microphone 214, the audio output units 215 and 216, and the battery 217, respectively, that are included in the wearable device 100 of FIG. 2A. The sensor 308 included in the wearable device 100 of FIG. 3 may correspond to the sensor 209 included in the wearable device 100 shown in FIG. 2A. The sensor 309 included in the wearable device 100 of FIG. 3 may correspond to the sensor 210 shown in FIG. 2A. The sensor 316 included in the wearable device 100 of FIG. 3 may correspond to the sensor 218 shown in FIG. 2A.

Elements included in the wearable device 100 of FIG. 3 are not limited as described above. For example, the wearable device 100 of FIG. 3 may be configured to be connected to at least one of the mobile device 250, the wearable earphones 260, and the content reproduction device 270 by wire or wirelessly like the wearable device 100 of FIGS. 2D through 2F.

When the wearable device 100 of FIG. 3 is connected to at least one of the mobile device 250, the wearable earphones 260, and the content reproduction device 270, the elements included in the wearable device 100 of FIG. 3 may be changed or vary like the elements included in the wearable device 100 of FIGS. 2D through 2F.

FIG. 4 is a diagram of another example of the wearable device 100 according to an exemplary embodiment. Referring to FIG. 4, the wearable device 100 has a binocular display. The wearable device 100 of FIG. 4 may be attached to a helmet structure or may be modified in the form of goggles.

The wearable device 100 of FIG. 4 includes a lens frame 401, side-arms 402 and 403, lenses 404 and 405, an on-board computer 406, a camera 407, a user input unit 408 (e.g., user input device or user inputter), a bio information obtaining camera 409, sensors 410, 411, and 410, a haptic module 412, displays 413 and 414, a microphone 415, audio output units 416 and 417 (e.g., audio output devices or audio outputters), and a battery 418.

The lens frame 401 included in the wearable device 100 of FIG. 4 may be configured integrally with a nosepiece 401'. The lens frame 401 may be configured as one of various shapes such as rectangular, oval, and circular shapes, but is not limited thereto in one or more other exemplary embodiments. The lens frame 401 may be configured as a material similar to that of the lens frame 201 of the wearable device 100 of FIG. 2A.

The lenses 404 and 405 of FIG. 4 may be configured as an arbitrary material suitable for displaying information such as an image or graphics projected through light outputters (such a projector described above with reference to FIG. 2A) that are not shown. The lenses 404 and 405 of FIG. 4 may be configured as a material capable of overlapping a real world that the wearer 101 of the wearable device 100 may see through the lenses 404 and 405 and the information such as the image or the graphics projected through the light outputters (e.g., light emitters, light outputting devices, or ray outputters). The material constituting the lenses 404 and 405 may be configured as plastic or glass like a material constituting the lens 204 described above with reference to FIG. 2A, but is not limited thereto in one or more other exemplary embodiments.

The side-arms 402 and 403, the on-board computer 406, the camera 407, the user input unit 408, the bio information obtaining camera 409, the sensors 410, 411, and 419, the haptic module 412, the microphone 415, the audio output units 416 and 417, and the battery 418 that are included in the wearable device 100 of FIG. 4 may be installed in different locations from those of the side-arms 202 and 203, the on-board computer 205, the camera 206, the user input unit 207, the bio information obtaining camera 208, the sensors 209, 210, and 218, the haptic module 211, the microphone 214, the audio output units 215 and 216, and the battery 217 that are included in the wearable device 100 of FIG. 2A, but functions or constructions thereof may be similar. The sensor 410 of FIG. 4 may correspond to the sensor 209 of FIG. 2A. The sensor 411 of FIG. 4 may correspond to the sensor 210 of FIG. 2A. The sensor 419 of FIG. 4 may correspond to the sensor 218 of FIG. 2A. Constructions and locations of the elements included in the wearable device 100 of FIG. 4 are not limited as described above.

The displays 413 and 414 included in the wearable device 100 of FIG. 4 may display the information such as the image or the graphics projected by the light outputters mounted on an inner surface of each of the side-arms 402 and 403. The light outputters may be configured as the light outputter 213 included in the wearable device 100 of FIG. 2A, but is not limited thereto in one or more other exemplary embodiments.

The wearable device 100 of FIG. 4 may be modified to allow the lenses 404 and 405 to operate as displays. In this case, the lenses 404 and 405 may be configured as transparent displays or translucent displays. When the lenses 404 and 405 are configured as the translucent displays, the lenses 404 and 405 may be configured as a material such as at least one light wave guide (for example, a prism), an electroluminescent display, or a liquid crystal display (LCD), but are not limited thereto in one or more other exemplary embodiments.

When the lenses 404 and 405 of FIG. 4 are configured as the transparent displays, the light outputters are not mounted in the wearable device 100 of FIG. 4, and information generated by the on-board computer 406 may be directly displayed on the lenses 404 and 405. The transparent display is a display having a certain degree of transparency so that an area behind a screen thereof may be seen.

The wearable device 100 of FIG. 4 may be connected to at least one of the mobile device 250, the wearable earphones 260, and the content reproduction device 270 by wire or wirelessly as described above with reference to FIGS. 2D through 2F. When the wearable device 100 of FIG. 4 is connected to at least one of the mobile device 250, the wearable earphones 260, and the content reproduction device 270, the wearable device 100 of FIG. 4 may be modified or vary like the wearable device 100 of FIGS. 2D through 2F. For example, the wearable device 100 of FIG. 4 may not include the battery 418.

Figure 5A:
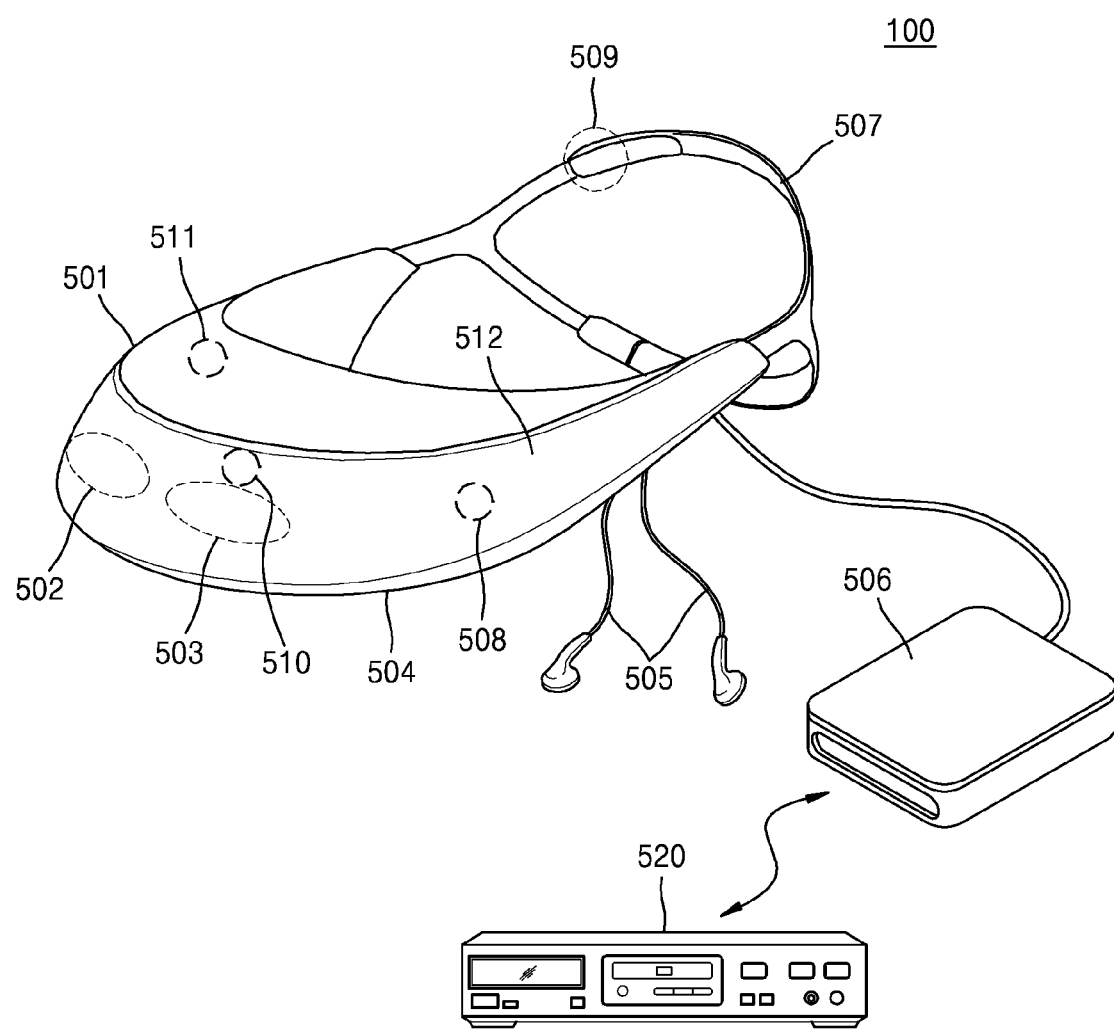
FIG. 5A is a diagram of another example of a wearable device according to an exemplary embodiment.

FIG. 5A is a diagram of another example of the wearable device 100 according to an exemplary embodiment. The wearable device 100 of FIG. 5A has a binocular display. The wearable device 100 of FIG. 5A may be modified as a helmet structure.

The wearable device 100 of FIG. 5A includes a frame 501 configured as a plastic material, two independent displays 502 and 503 adjacent to eyes of the wearer 101 in an inner side of the frame 501, a user input unit 504 (e.g., user input device or user inputter) in an entire surface of a lower portion of the frame 501 or in a part thereof, earphones 505, a battery pack 506 connected to the frame 501 by wire, a head fixing band 507 used to fix the wearable device 100 onto a head of the wearer 101, a computer 508 embedded in the frame 501, a bio information obtaining camera 510, and sensors 509, 511, and 512. The wearable device 100 of FIG. 5A may be modified to include a battery therein.

The displays 502 and 503 of FIG. 5A may use a display such as a high definition (HD) organic light emitting diode (OLED) panel, but are not limited thereto in one or more other exemplary embodiments. The displays 502 and 503 of FIG. 5A may be configured to see two-dimensional (2D) content and three-dimensional (3D) content.

The user input unit 504 of FIG. 5A is configured as at least one of a power on/off button, a menu selection button, an adjustment button, locations adjustment switches of the displays 502 and 503, and a push manipulation based button and switch including a volume switch, but is not limited thereto in one or more other exemplary embodiments. For example, the user input unit 504 may be configured as a touch panel.

The battery pack 506 of FIG. 5A may include a communication module capable of receiving content wirelessly and an interface capable of receiving content by wire. The interface may include a high definition multimedia interface (HDMI) port, but is not limited in one or more other exemplary embodiments. The battery pack 506 of FIG. 5A may be connected to the content providing device 520 through the communication module or the interface by wire or wirelessly. The content providing device 520 may include a device such as the game reproduction device, the video game device, the broadcasting set top box, etc.

The battery pack 506 of FIG. 5A may be simultaneously connected to the wearable device 100 and the content providing device 520 through the communication module wirelessly. The battery pack 506 of FIG. 5A may be connected to the wearable device 100 by wire and the content providing device 520 by wirelessly, through the communication module and the interface. The battery pack 506 of FIG. 5A may be connected to the wearable device 100 and the content providing device 520 through the interface by wire. The battery pack 506 of FIG. 5A may be connected to the wearable device 100 wirelessly and the content providing device 520 by wire, through the communication module and the interface.

When the battery pack 506 of FIG. 5A is connected to the wearable device 100 and the content providing device 520 through the communication module wirelessly, the battery pack 506 may transmit content received from the content providing device 520 to the wearable device 100 through the communication module and may transmit a control signal related to reproduction of content received from the wearable device 100 to the content providing device 520. The content providing device 520 may operate according to the control signal received through the battery pack 506.

The sensor 509 of FIG. 5A may be positioned in an inner side of the head fixing band 507 to sense whether the wearable device 100 is worn like the sensor 210 of FIG. 2A. The bio information obtaining camera 510 of FIG. 5A may be positioned in an upper end of the left display 503 to perform the same function as that of the bio information obtaining camera 208 of FIG. 2A. The sensor 511 of FIG. 5A may be positioned in a part of an upper surface of the frame 501 to sense peripheral environment information of the wearable device 100 like the sensor 209 of FIG. 2A. The sensor 512 of FIG. 5A may be mounted in a location adjacent to the on-board computer 508 to sense a heating temperature of the wearable device 100 of FIG. 5A.

Locations of the bio information obtaining camera 510 and the sensors 509, 511, and 512 of FIG. 5A are not limited as described above in one or more other exemplary embodiments. The bio information obtaining camera 510 and the sensors 509, 511, and 512 may be mounted in locations different from the above-described location of the wearable device 100 of FIG. 5A. For example, the bio information obtaining camera 510 of FIG. 5A may be positioned adjacent to the right display 502.

The haptic module 211, the microphone 214, etc., of FIG. 2A may be additionally mounted in a part of the wearable device 100 of FIG. 5A. The wearable device 100 of FIG. 5A may mount or include a forehead support in an upper end of the frame 501. The forehead support is used to support a weight of the wearable device 100. The wearable device 100 of FIG. 5A may include a body temperature sensor for sensing a temperature of the wearer 101 and a sweating sensor for sensing a sweating amount of the wearer 101 mentioned in FIG. 2A.

Figure 5B:
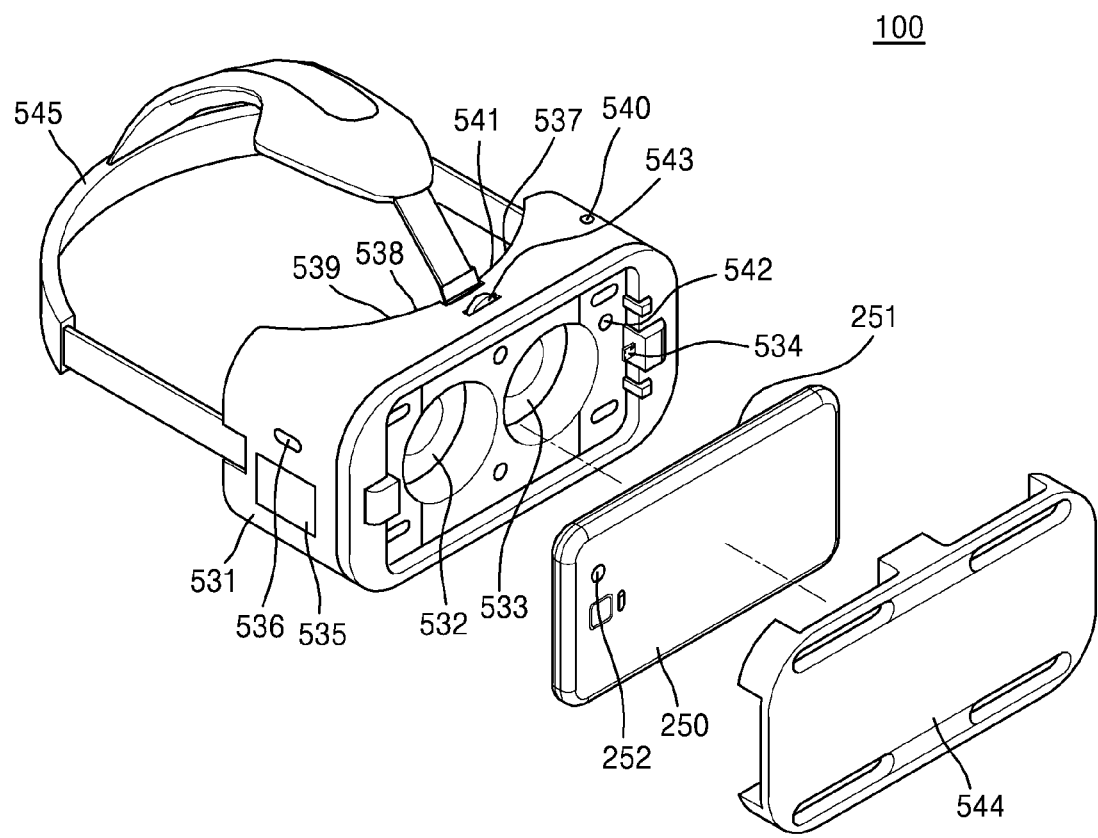
FIG. 5B is a diagram of another example of a wearable device according to an exemplary embodiment.

FIG. 5B is a diagram of another example of the wearable device 100 according to an exemplary embodiment. The mobile device 250 may be mounted in the wearable device 100 of FIG. 5B. The wearable device 100 of FIG. 5B may be connected to the mobile device 250 by wire or wirelessly. The wearable device 100 of FIG. 5B uses the display 251 of the mobile device 250 as a display.

The wearable device 100 of FIG. 5B may view content reproduced on the display 251 through two independent lenses 532 and 533 corresponding to two eyes of the wearer 101. The lenses 532 and 533 are lenses that may distort viewing of the wearer 101.

The wearable device 100 of FIG. 5B may be connected to the mobile device 250 by using a USB jack 534, but is not limited thereto in one or more other exemplary embodiments. The wearable device 100 may be connected to the mobile device 250 based on near field wireless communication or other wireless communication (e.g., Bluetooth). If the USB jack 534 is used to connect the wearable device 100 and the mobile device 250, the mobile device 250 may be controlled according to a user input received through a touch pad 535 of the wearable device 100.

The touch pad 535 is positioned in a right side of the frame 531 of the wearable device 100 but may be positioned in another side of the frame 531. The USB jack 534 is positioned in a left side but may be positioned in a right side of the frame 531.

The wearable device 100 of FIG. 5B includes a back button 536 in a location adjacent to the touch pad 535. The back button 536 may act as a see-through button. That is, if the back button 536 is pressed for a certain period of time, a rear camera 252 included in the mobile device 250 may operate. When the rear camera 252 operates, the wearer 101 may view a real peripheral situation through the rear camera 252 in real time while wearing the wearable device 100.

The wearable device 100 of FIG. 5B includes a head tracking sensor 537, an infrared (IR) sensor 538, a bio information obtaining camera 539, a peripheral environment sensor 540, a wearable sensor 541, a heating temperature sensor 542, a focus adjustment ring 543, a front plastic cover 544, and a head fixing band 545, but is not limited thereto in one or more other exemplary embodiments.

The wearable device 100 may detect a movement of the wearer 101 by using a value sensed by the head tracking sensor 537 and the IR sensor 538 of FIG. 5B and provide an image displayed on the display 251 of the mobile device 250 to an ultra-large wide screen according to the detected movement of the wearer 101. The focus adjustment ring 543 of FIG. 5B is a button capable of adjusting a screen according to the viewing of the wearer 101.

Locations of elements included in the wearable device 100 of FIG. 5B are not limited as shown in FIG. 5B.

The on-board computers 205, 304, 406, and 508 included in the wearable device 100 of FIGS. 2A, 2B, 2D, 2E, 2F, 3, 4, and 5A may include a control unit (or a processor) and a memory, but are not limited thereto in one or more other exemplary embodiments. The control unit (e.g., controller) and the memory will be described in detail with reference to FIGS. 48 and 49. The on-board computers 205, 304, 406, and 508 may control all functions of the wearable device 100.

Modifications of the wearable device 100 of FIGS. 2A, 2B, 2D, 2E, 2F, 3, 4, 5A, and 5B may receive sound obtained by a microphone included in the electronic patch 219 based on wireless communication as described with reference to FIG. 2C.

One or more exemplary embodiments will be described below based on the wearable device 100 of FIG. 2A below, but may be applied to the wearable device 100 of FIGS. 2A, 2B, 2D, 2E, 2F, 3, 4, 5A, and 5B and modifications thereof.

Meanwhile, the content 102 of FIG. 1A may be reproduced (or provided) according to a reproduction command of the wearer 101. For example, the wearable device 100 may reproduce a game image 102 reproduced according to a game reproduction command of the wearer 101 through the display 212, as exemplified by the screen 110 of FIG. 1A. An audio signal reproduced along with the game image 102 may be reproduced through the audio output units 215 and 216.

The screens 110 and 120 of FIG. 1A are examples including the reproduced image 102 and an image of a real peripheral situation (i.e., real image) that may be viewed through the wearable device 100. However, when the wearable device 100 is configured as shown in FIG. 5A or 5B, the wearer 101 may view the game image 102 only (i.e., without the real image) reproduced through the wearable device 100.

The content reproduced by the wearable device 100 is not limited to the game image 102 of FIG. 1A in one or more other exemplary embodiments. For example, the content reproduced by the wearable device 100 may include content of which reproduction is required or controlled based on an application installed in the wearable device 100.

The application installed in the wearable device 100 may include, for example, a video player application, an album application, a camera application, a Digital Multimedia Broadcasting (DMB) application, a map application, a browser application, an application store application, a video call application, a news and weather application, a calendar application, an Instant Messenger (IM) application, a phone book application, an e-mail application, a content sharing application, an electronic book application, a social media application, a messaging application, an augmented reality application, and the like, but is not limited thereto in one or more other exemplary embodiments.

The applications described throughout the specification refer to programs for performing an objective operation by using the wearable device 100. For example, the e-mail application is a program for transmitting and receiving e-mails and managing the transmitted and received e-mails. The content described throughout the specification may be provided in at least one form from among a still image, a moving image, audio, text, and multimedia, but is not limited thereto in one or more other exemplary embodiments.

When content is being reproduced by the wearable device 100 that the wearer 101 is wearing, the wearable device 100 may obtain at least one of content reproduction related information of the wearable device 100, bio information of the wearer 101, peripheral environment information of the wearable device 100, and personal information of the wearer 101. The above-described information obtained by the wearable device 100 represents information that may influence health of the wearer 101.

The content reproduction related information of the wearable device 100 may include information based on an operation of the wearable device 100. For example, the content reproduction related information of the wearable device 100 may include information based on at least one of a content reproduction time, a battery consumption amount of the wearable device 100, a temperature of the wearable device 100, a heating state (e.g., overheating state) of the wearable device 100, but is not limited thereto in one or more other exemplary embodiments. For example, the battery consumption amount of the wearable device 100 may be a battery consumption amount of another device (for example, the mobile device 250) for reproducing content.

A method of obtaining the content reproduction related information of the wearable device 100 may be the same as or similar to that described with reference to a table of FIG. 1B, but is not limited thereto in one or more other exemplary embodiments. FIG. 1B is a table for explaining a method of obtaining the content reproduction related information of the wearable device 100 and a content reproduction stop request reference, according to an exemplary embodiment. The content reproduction stop request reference is a reference (i.e., reference information) for displaying the content reproduction stop request guide information 103. The content reproduction stop request guide information 103 indicates information informing the wearer 101 that it may be requested to stop reproduction of the content. The content reproduction stop request guide information 103 may be expressed as notification information or alarm information. According to another exemplary embodiment, information regarding a stopping of viewing of the content or wearing of the wearable device 100 (e.g., a screen advising the user to stop viewing content or to remove the wearable device 101) may be output instead of the content reproduction stop request guide information 103. Numerical values of FIG. 1B are mere examples and it is understood that one or more other exemplary embodiments are not limited thereto.

Referring to FIG. 1B, a reproduction time of the content may be obtained in connection with content reproduction performed by the wearable device 100. For example, the wearable device 100 may obtain time counted by starting reproduction of the content as the reproduction time Pt (or a providing time) of the content after the wearable sensor 210 senses wearing of the wearable device 100.

Referring to FIG. 1B, a battery consumption amount of the wearable device 100 may be obtained in connection with the content reproduction performed by the wearable device 100. For example, the wearable device 100 obtains battery remains (e.g., remaining battery life) detected by starting the content reproduction as a reference battery remains Brq1 after the wearable sensor 210 senses the wearing of the wearable device 100. The wearable device 100 may periodically detect battery remains Brq2 during a content reproduction period and obtain a difference (d=Brq2−Brq1) between the reference battery remains and the periodically detected battery remains as the battery consumption amount of the wearable device 100. The battery remains may be detected by using discharge current and voltage of a battery 217.

Referring to FIG. 1B, a heating temperature of the wearable device 100 may be obtained in connection with the content reproduction performed by the wearable device 100. For example, the wearable device 100 may obtain a temperature T detected by using the temperature sensor 218 during the content reproduction after the wearable sensor 210 senses the wearing of the wearable device 100 and the content reproduction is started, as the heating temperature of the wearable device 100.

The heating temperature may be updated every time a sensing value of the temperature sensor 218 is received. The wearable device 100 may periodically operate the temperature sensor 218 to receive the sensing value of the temperature sensor 218 or may periodically monitor the sensing value of the temperature sensor 218 to obtain the heating temperature after the content reproduction is started.

As described above, information of the wearable device 100 may be obtained by using a sensing value of at least one sensor (for example, the temperature sensor 218) mounted in the wearable device 100, but is not limited thereto in one or more other exemplary embodiments. For example, the battery consumption amount may be obtained by using the discharge current and voltage of the battery 217.

When the battery 217 is not included in the wearable device 100, and, for example, a battery of the mobile device 250 connected to the wearable device 100 by wire or wirelessly is used in the wearable device 100, the above-described battery consumption amount may be a battery consumption amount of the mobile device 250.

The method of obtaining the content reproduction related information of the wearable device 100 is not limited as shown in FIG. 1B. For example, the wearable device 100 may obtain the content reproduction related information of the wearable device 100 based on a content reproduction start point irrespective of the sensing value of the wearable sensor 210.

If the wearable device 100 receives the sensing value indicating a wearing status from the wearable sensor 210 irrespective of the content reproduction start point, the wearable device 100 may periodically monitor the battery remains to obtain the battery consumption amount by using a difference of the monitored battery remains over time. When the battery consumption amount is obtained as described above, a point where the above-described reference battery remains Brq1 is detected is a point where wearing of is sensed by the sensing value of the wearable sensor 210.

If the wearable device 100 receives the sensing value indicating a wearing status from the wearable sensor 210 irrespective of the content reproduction start point, the wearable device 100 may periodically monitor an output value of the temperature sensor 218 to obtain the heating temperature.

The wearable device 100 may obtain bio information of the wearer 101 as described with reference to tables of FIGS. 1C-1 and 1C-2, but a method of obtaining the bio information of the wearer 101 by using the wearable device 100 is not limited thereto in one or more other exemplary embodiments. FIGS. 1C-1 and 1C-2 are tables for explaining a method of obtaining the bio information of the wearer 101 and a reproduction stop request reference. The reproduction stop request reference may be a reference for displaying the reproduction stop request guide information 103 as described with reference to FIG. 1B. Numerical values of FIGS. 1C-1 and 1C-2 are mere examples and it is understood that one or more other exemplary embodiments are not limited thereto.

Referring to FIGS. 1C-1 and 1C-2, the bio information of the wearer 101 obtained by the wearable device 100 may include at least one of at least one piece of bio information based on eyes of the wearer 101 and health information of the wearer 101, but is not limited thereto in one or more other exemplary embodiments.

The at least one piece of bio information based on the eyes of the wearer 101 may include information indicating whether the eyes of the wearer 101 are bloodshot, whether the eyes are dry, an eye blink number, an eye blink cycle, whether a position of a pupil is changed, whether the pupils are changed, and the like, but is not limited thereto in one or more other exemplary embodiments.

The at least one piece of bio information based on the eyes of the wearer 101 may be obtained by using at least one of the bio information obtaining camera 208, the sensor 209, and the external electronic patch 219 that are mounted in the wearable device 100, but is not limited thereto in one or more other exemplary embodiments. For example, the health information of the wearer 101 may be obtained by using a sensor mounted in an external device.

The wearable device 100 may obtain bio information regarding whether the eyes are bloodshot by using a color distribution of an eye image obtained by the bio information obtaining camera 208 after wearing of the wearable device 100 is sensed by using the sensing value of the wearable sensor 210 and content reproduction is started. The color distribution of the eye image may include a value indicating a ratio of pixels having an R value (i.e., red value) that is approximate to 255 among total pixels included in the eye image, but is not limited thereto in one or more other exemplary embodiments. The R value approximate to 255 may mean, for example, the R value equal to or greater than a predetermined number (e.g., 240), but is not limited thereto in one or more other exemplary embodiments.

Figure 1D:
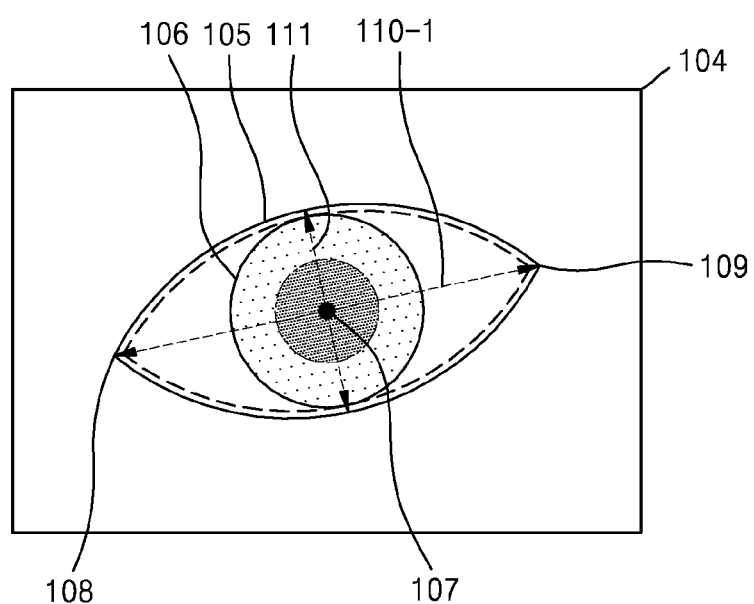
FIG. 1D is a diagram of an eye image for explaining a method of obtaining bio information regarding whether a position of a pupil is changed, according to an exemplary embodiment.
Figure 1E:
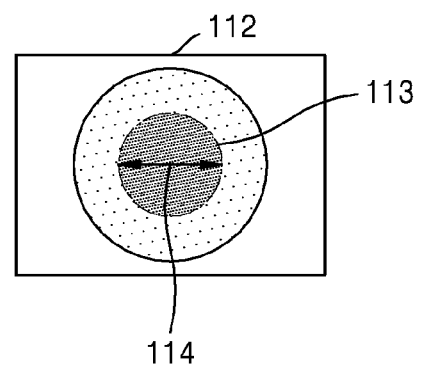
FIG. 1E is a diagram of a pupil image for explaining a method of obtaining bio information regarding whether a pupil is changed, according to an exemplary embodiment.
Figure 1H:
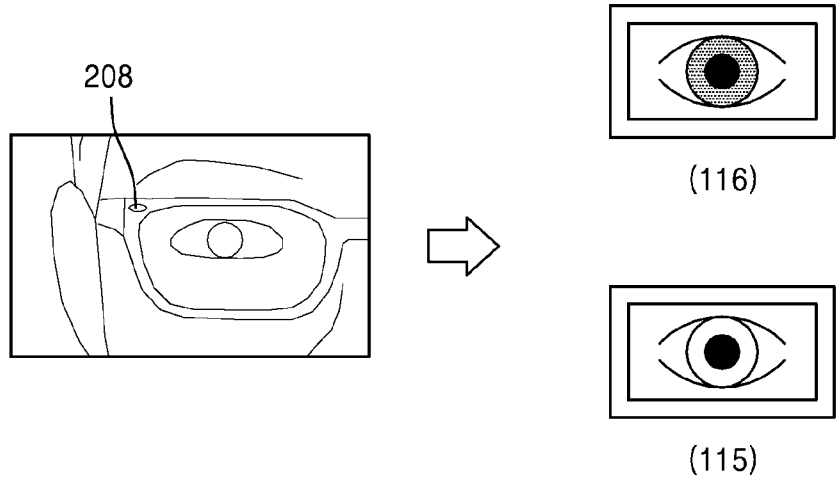
FIG. 1H is a diagram for explaining a process of obtaining bio information regarding whether eyes are bloodshot by using an eye image obtained by using the bio information obtaining camera, according to an exemplary embodiment.

FIG. 1H is a diagram for explaining a process of obtaining bio information regarding whether eyes are bloodshot by using an eye image obtained by using the bio information obtaining camera 208. The wearable device 100 may periodically obtain the eye image by using the bio information obtaining camera 208 when content reproduction is started by the wearable device 100 and during the content reproduction as shown in FIG. 1H.

The wearable device 100 may compare a color distribution of an eye image 115 when the content reproduction is started and a color distribution of an eye image 116 periodically obtained during the content reproduction to determine whether the eyes are bloodshot. The wearable device 100 may obtain a result of determining whether the eyes are bloodshot as the bio information regarding whether the eyes are bloodshot.

The wearable device 100 may obtain bio information regarding whether the eyes are dry by using a value indicating humidity sensed by the sensor 209 after wearing of the wearable device 100 is sensed, using the sensing value of the wearable sensor 210, and content reproduction is started. For example, if wearing of the wearable device 100 is sensed by using the sensing value of the wearable sensor 210 and then content reproduction is started, the wearable device 100 may obtain the bio information regarding whether the eyes are dry by using an electrical signal with respect to sound received from the electronic patch 219 and the eye image obtained by the bio information obtaining camera 208.

If wearing of the wearable device 100 is sensed by using the sensing value of the wearable sensor 210 and then content reproduction is started, the wearable device 100 may compare eye images obtained by the bio information obtaining camera 208 for a certain period of time (for example, one second) to obtain the bio information regarding the eye blink number and the eye blink cycle.

If wearing of the wearable device 100 is sensed by using the sensing value of the wearable sensor 210 and then content reproduction is started, the wearable device 100 may compare eye images obtained by the bio information obtaining camera 208 for a certain (e.g., predetermined) period of time (for example, a content reproduction time) or by a certain period of time (for example, 30 minutes) unit to obtain the bio information regarding whether the position of the pupil is changed.

FIG. 1D is a diagram of an eye image 104 for explaining a method of obtaining bio information regarding whether a position of a pupil is changed, according to an exemplary embodiment. Referring to FIG. 1D, every time the eye image 104 is obtained by the bio information obtaining camera 208 as shown in FIG. 1D, the wearable device 100 detects an eye region 105, a pupil region 106, and a center point 107 from the eye image 104 by using an eye recognition algorithm. The eye recognition algorithm may include an outline detection algorithm. The wearable device 100 may compare a location of the center point 107 detected from the eye image 104 to obtain the bio information regarding whether the position of the pupil is changed.

The eye recognition algorithm may be configured to detect an eye region 105 by using the outline detection algorithm, detect a line segment 110-1 connecting points 108 and 109 on the eye region 105, detect a line segment 111 vertically bisecting a line segment, and detect a point that the detected line segments 110-1 and 111 cross as the center point 107, but is not limited thereto in one or more other exemplary embodiments.

The wearable device 100 may obtain the bio information regarding whether the position of the pupil is changed by using an eyes tracking method of the wearer 101 based on 2D coordinate information of the center point 107 of FIG. 1D. The 2D coordinate information of the center point 107 may be center coordinate information of a pupil region 114. To track eyes of the wearer 101 by using the center coordinate information of the pupil region 114, the wearable device 100 may store reference pupil center coordinate information in advance. The reference pupil center coordinate information may be detected as information indicating where the eyes of the wearer 101 stay on an image displayed on the display 212.

If the 2D coordinate information of the center point 107 is obtained, the wearable device 100 compares the 2D coordinate information and the reference pupil center coordinate information stored in advance. As a comparison result, the wearable device 100 detects the reference pupil center coordinate information stored in advance that is identical to the obtained 2D coordinate information of the center point 107. The wearable device 100 may determine a location of the display 212 corresponding to the detected reference pupil center coordinate information as an eye location of the wearer 101. The wearable device 100 may obtain the bio information regarding whether the position of the pupil of the wearer 101 is changed by using an eyes track function of the wearer 101. The eyes track function of the wearer 101 is not limited as described above.

If wearing of the wearable device 100 is sensed by using the sensing value of the wearable sensor 210 and then content reproduction is started, the wearable device 100 may obtain the bio information regarding whether the position of the pupil is changed by using a pupil image obtained by the bio information obtaining camera 208 for a certain period of time (for example, a content reproduction time) or by a certain period of time (for example, 30 minutes) unit.

FIG. 1E is a diagram of a pupil image 112 for explaining a method of obtaining bio information regarding whether a pupil is changed, according to an exemplary embodiment. Referring to FIG. 1E, every time the pupil image 112 is obtained by the bio information obtaining camera 208 as shown in FIG. 1E, the wearable device 100 detects a pupil region 113 and a diameter 114 of the pupil region 113 from the pupil image 112 by using an eye recognition algorithm. The wearable device 100 may compare the pupil region 113 and the diameter 114 of the pupil region 113 detected from the pupil image 112 to obtain the bio information regarding whether the pupil is changed.

A method of obtaining the bio information regarding whether the pupil is changed is not limited as described above. For example, according to another exemplary embodiment, the wearable device 100 may compare a width of the pupil region 113 included in the pupil image 112 to obtain the bio information regarding whether the pupil is changed. The wearable device 100 may detect a radius by using the diameter 114 of the pupil region 113 and detect the width of the pupil region 113 by applying the detected radius to an equation of calculating a width of a circle.

The bio information based on the eyes of the wearer 101 is not limited as described above. For example, the wearable device 100 may obtain the bio information based on the eyes of the wearer 101 based on a point where content reproduction is started irrespective of the sensing value of the wearable sensor 210.

The wearable device 100 may obtain the health information of the wearer 101 related to the content reproduction. For example, if wearing of the wearable device 100 is sensed by using the sensing value of the wearable sensor 210 and then the content reproduction is started, the wearable device 100 may obtain a value sensed by a bio sensor (for example, a body temperature sensor mounted in one of the audio output units 215 and 216) mounted in the wearable device 100 or a bio sensor mounted in an external device as the health information (for example, a temperature of the wearer 101). The bio sensor may include, for example, a body temperature sensor, a sweating sensor, a blood pressure sensor, a pulse sensor, a blood sugar sensor, etc., but is not limited thereto in one or more other exemplary embodiments.

When content reproduction is started, the wearable device 100 may periodically detect a sensing value of the bio sensor, compare the detected sensing values, and obtain a detected variance or difference as the health information of the wearer 101.

The wearable device 100 may obtain health information of the wearer 101 such as a sweating amount, a blood pressure, a pulse, a blood sugar, etc., like the above-described health information regarding a body temperature.

The wearable device 100 may obtain information regarding an activity amount (for example, a moving distance of the wearer 101, a moving speed of the wearer 101, a calorie consumption amount of the wearer 101, etc.) of the wearer 101 by using a location tracking application of the wearable device 100, a health application, or an external device (for example, an activity amount measuring device of the wearer 101 such as a communicable pedometer, a treadmill, etc.).

When the content reproduction is started after wearing of the wearable device 100 is sensed, the wearable device 100 may obtain the activity amount of the wearer 101, but a method of obtaining the activity amount of the wearer 101 is not limited thereto in one or more other exemplary embodiments. For example, when the content reproduction is started irrespective of the sensing value of the wearable sensor 210, the wearable device 100 may obtain the activity amount of the wearer 101. Also, when the content reproduction is started, the wearable device 100 may obtain the activity amount of the wearer 101, compare the activity amount of the wearer 101 periodically obtained during a content reproduction period and the activity amount of the wearer 101 obtained when the content reproduction is started, and obtain an activity variance of the wearer 101 as information regarding the activity amount of the wearer 101.

If the content reproduction is started after wearing of the wearable device 100 is sensed, the wearable device 100 may access an information management server such as a medical information management server to obtain medical information of the wearer 101 from received medical information. The medical information may include, for example, past medical history information, current medical history information, etc., but is not limited thereto in one or more other exemplary embodiments.

A method of obtaining peripheral environment information of the wearable device 100 may be the same as described with respect to a table of FIG. 1F. FIG. 1F is a table for explaining the method of obtaining peripheral environment information of the wearable device 100 and a reproduction stop request reference, according to an exemplary embodiment. Numerical values of FIG. 1F are mere examples and it is understood that one or more other exemplary embodiments are not limited thereto.

Referring to FIG. 1F, the peripheral environment information of the wearable device 100 may include at least one of information regarding a peripheral color temperature of the wearable device 100, light (or infrared rays), temperature, humidity, wind, altitude, air pressure, fine dust, and the like, but is not limited thereto in one or more other exemplary embodiments.

If content reproduction is started after wearing of the wearable device 100 is sensed by a sensing value of the wearable sensor 210, the wearable device 100 may obtain the peripheral environment information of the wearable device 100 by using a sensing value of the at least one sensor 209 mounted in the wearable device 100 or a sensing value of at least one sensor mounted in an external device (for example, a smart watch, etc.) connected to the wearable device 100 but is not limited thereto in one or more other exemplary embodiments.

For example, the wearable device 100 may obtain the peripheral environment information of the wearable device 100 at the time of reproducing content irrespective of the sensing value of the wearable sensor 210. The wearable device 100 may obtain the peripheral environment information of the wearable device 100 by using an environment information providing application providing environment information based on a physical location of the wearable device 100. The wearable device 100 may be connected to an environment information providing server by using the environment information providing application to receive the environment information from the environment information providing server.

A method of obtaining personal information of the wearer 101 may be the same as or similar to that described with reference to a table of FIG. 1G, but is not limited thereto. FIG. 1G is a table for explaining a method of obtaining the personal information of the wearer 101 and a reproduction stop request reference, according to an exemplary embodiment.

Referring to FIG. 1G, the personal information of the wearer 101 may include at least one of age information and schedule information, but is not limited thereto.

If content reproduction is started after wearing of the wearable device 100 is sensed by a sensing value of the wearable sensor 210, the wearable device 100 may request the wearer 101 to input the age information and obtain information input according to a request as the age information of the wearer 101. A method of obtaining the age information of the wearer 101 is not limited thereto in one or more other exemplary embodiments. For example, if the content reproduction is started, the wearable device 100 may request the age information of the wearer 101 from life log information of the wearer 101 stored in the wearable device 100, life log information stored in an external device of the wearable device 100, or personal information management software (PIMS) and obtain information received in response to a request as the age information of the wearer 101.

If the content reproduction is started after wearing of the wearable device 100 is sensed by the sensing value of the wearable sensor 210, the wearable device 100 may request the schedule information having information related to currently reproduced content from the life log information of the wearer 101 stored in the wearable device 100, the life log information stored in the external device of the wearable device 100, or the PIMS and obtain information received in response to a request as the age information of the wearer 101.

The information related to the currently reproduced content may include the schedule information of the wearer 101 having time information before or after the content reproduction, but is not limited thereto in one or more other exemplary embodiments. For example, the wearable device 100 may request a schedule input from the wearer 101 before reproducing the content and obtain information input according to a request as the schedule information of the wearer 101.

The wearable device 100 may obtain the personal information of the wearer 101 related to a content reproduction start time irrespective of the sensing value of the wearable sensor 210.

The wearable device 100 may display the reproduction stop request guide information 103 regarding content, like in the screen 120 of FIG. 1A, by using the obtained information. The reproduction stop request guide information 103 regarding content may be provided to prevent or solve a problem that may occur to the wearer 101 when the content is continuously reproduced by the wearable device 100.

For example, the wearable device 100 may display the reproduction stop request guide information 103 regarding content so as to protect health (e.g., reducing eye fatigue) of the wearer 101 who views content reproduced by the wearable device 100.

Relaxing of the eye fatigue of the wearer 101 described with reference to exemplary embodiments may be expressed in various ways based on an effect that may be provided to the wearer 101. For example, reducing of the eye fatigue of the wearer 101 may be expressed as influencing the health of the wearer 101 like relaxing of tension and reducing eye fatigue of the wearer 101, protecting of eyesight of the wearer 101, relieving of stress and stabilizing the mind (e.g., reducing dizziness) of the wearer 101, improving of concentration of the wearer 101, etc. Various expressions regarding influencing of the health of the wearer 101 are not limited as described above.

To determine whether to display the reproduction stop request guide information 103 regarding the content by using the obtained information, the wearable device 100 may set or store reproduction stop request reference information. The reproduction stop request reference information (hereinafter referred to as reference information) may differ according to the information obtained by the wearable device 100. Furthermore, according to an exemplary embodiment, the wearer 101 may set or adjust the reference information.

Referring to FIG. 1B, when the information obtained by the wearable device 100 is the reproduction time Pt of the content, the reference information may be set as time information. The time information set as the reference information may take into consideration the time expected to build up or cause the eye fatigue of the wearer 101.

For example, if the reproduction time Pt is more than 2 hours (2 H), the wearable device 100 may display the reproduction stop request guide information 103 on the display 212 as shown on the screen 120 of FIG. 1A. Reference information regarding the reproduction time Pt of the content is not limited to 2 hours. For example, the reference information regarding the reproduction time Pt of the content may include at least one piece of predetermined time information such as 3 hours, 3 hours 30 minutes, etc.

Referring to FIG. 1B, when information obtained by the wearable device 100 is a battery consumption amount, the reference information may be set as ratio information (for example, 50%). The reference information may take into consideration the battery consumption amount expected to build up or cause the eye fatigue of the wearer 101. The wearable device 100 may detect the battery consumption amount in such a manner that the wearable device 100 may detect difference information between battery remains (i.e., remaining battery life). For example, when the content reproduction is started, and the battery remains detected by the wearable device 100 is 90%, and when the battery remains detected during the content reproduction is 40%, the wearable device 100 may detect the battery consumption amount as 50%.

When the reference information is set as 50%, if the battery consumption amount detected by the wearable device 100 is more than 50%, the wearable device 100 may display the reproduction stop request guide information 103 on the display 212 as shown on the screen 120 of FIG. 1A. The reference information regarding the battery consumption amount is not limited to 50% in one or more other exemplary embodiments. For example, the reference information regarding the battery consumption amount may include at least one piece of ratio information (%) such as 40%, 45%, etc.

Referring to FIG. 1B, if the information obtained by the wearable device 100 is a heating temperature, and includes information regarding the heating temperature and a maintenance time, the reference information may include a temperature and maintenance time information. The reference information may take into consideration the heating temperature and time for maintaining the heating temperature that are expected to build up or cause the eye fatigue of the wearer 101.

For example, if the heating temperature is maintained at 49 degrees for more than 1 hour, the wearable device 100 may display the reproduction stop request guide information 103 on the display 212 as shown on the screen 120 of FIG. 1. To detect a maintenance time of the heating temperature, the wearable device 100 may measure time from a time at which the heating temperature is detected as 49 degrees.

The reference information regarding the heating temperature is not limited thereto in one or more other exemplary embodiments. For example, the reference information regarding the heating temperature set in the wearable device 100 may include at least one of the heating temperature and maintenance time information such as maintaining at 49 degrees for more than 2 hours or 50 degrees for 1 hour 30 minutes, etc. The reference information regarding the heating temperature is not limited to 49 degrees.

Referring to FIG. 1B, when the information obtained by the wearable device 100 relates to the heating temperature, and includes the heating temperature, the reference information set in the wearable device 100 may include a temperature. The reference information may take into consideration the heating temperature expected to build up or cause the eye fatigue of the wearer 101. A cycle for receiving a sensing value by the temperature sensor 218 set in the wearable device 100 may take into consideration the eye fatigue of the wearer 101. For example, a cycle for receiving the sensing value by the temperature sensor 218 may be set as 30 minutes. When the sensing value by the temperature sensor 218 received at the cycle of 30 minutes is 49 degrees, the wearable device 100 may display the reproduction stop request guide information 103 on the display 212.

Figure 10:
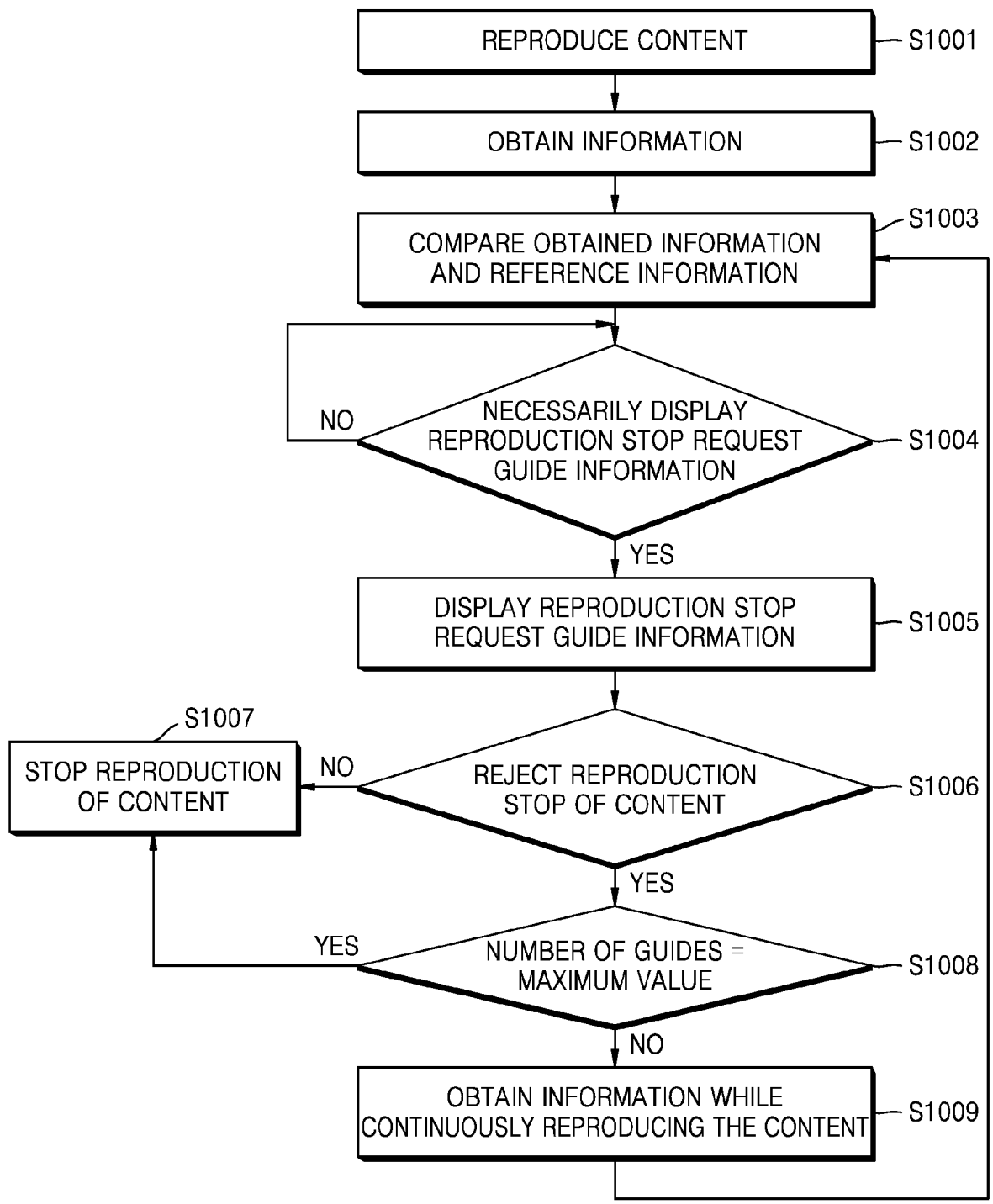
FIG. 10 is a flowchart for explaining a method of operating a wearable device according to another exemplary embodiment.

Referring to FIG. 1C-1, when the information obtained by the wearable device 100 is information regarding whether the eyes of the wearer 101 are bloodshot, the reference information set in the wearable device 100 may include information (for example, 40%) regarding an increase rate of the number of pixels (for example, pixels having an R value greater than 241) having the R value approximate to 255. The wearable device 100 may compare the number of the pixels having the R value approximate to 255 and included in an eye image detected when content reproduction is started and the number of the pixels having the R value approximate to 255 and included in an eye image detected during the content reproduction to detect the increase rate of the number of pixels having the R value approximate to 255 by using a difference. Referring to FIG. 10-1, if the increase rate of the number of pixels having the R value approximate to 255 is more than 40%, the wearable device 100 may display the reproduction stop request guide information 103 on the display 212 as shown on the screen 120 of FIG. 1A.

The reference information for detecting whether eyes are bloodshot set in the wearable device 100 is not limited as described above. For example, the reference information for detecting whether the eyes are bloodshot may be set to determine if the number of pixels having the R value approximate to 255 exceeds 50% of the total number of pixels. When the reference information is set as described above, if content reproduction is started, the wearable device 100 obtains an eye image by using the bio information obtaining camera 208 by a certain period of time unit. The wearable device 100 checks if the number of pixels having the R value approximate to 255 included in the obtained eye image exceeds 50% of the total number of pixels. If the number of pixels having the R value approximate to 255 included in the obtained eye image exceeds 50% of the total number of pixels, the wearable device 100 may display the reproduction stop request guide information 103 on the display 212.

The reference information for detecting whether the eyes are bloodshot set in the wearable device 100 may be based on the number of pixels having the R value equal to 255.

Referring to FIG. 1C_1, when the information obtained by the wearable device 100 is information regarding whether the eyes of the wearer 101 are dry, and uses the sensor 209, the reference information set in the wearable device 100 may include humidity information (for example, 30%) and maintenance time information (for example, 1 hour). For example, if content reproduction is started, the wearable device 100 may monitor a sensing value of the sensor 209 by a certain period of time unit. If it is determined that the sensing value of the sensor 209 is maintained for more than 1 hour below 30%, the wearable device 100 may display the reproduction stop request guide information 103 on the display 212. To determine if the sensing value is maintained for more than 1 hour, the wearable device 100 may measure time from a time at which the sensing value of the sensor 209 is detected at below 30%.

The reference information for determining whether the eyes are dry set in the wearable device 100 is not limited as described above. For example, the reference information for determining whether the eyes are dry may be set to humidity below 30% for more than 2 hours, humidity below 29% for 1 hour 30 minutes, etc. The reference information for determining whether the eyes are dry set in the wearable device 100 may be based on a humidity variance or difference. For example, if it is detected that the humidity variance is reduced by more than 20%, the wearable device 100 may set the reference information for determining whether the eyes are dry such that the reproduction stop request guide information 103 may be displayed on the display 212.

The humidity included in the reference information for determining whether the eyes of the wearer 101 are dry may be variably set according to an average humidity of an environment in which the wearable device 100 is used.

Referring to FIG. 1C-1, the reference information for determining whether the eyes are dry may be set to determine whether the eyes are dry by using an electrical signal regarding sound received from a microphone included in the electronic patch 219 of FIG. 2C and an eye image obtained by the bio information obtaining camera 208.

For example, the wearable device 100 may detect an amplitude of the electrical signal regarding the sound received from the electronic patch 219 at a time in which an eye blink is detected by an eye image obtained by the bio information obtaining camera 208. The electrical signal may indicate a magnitude level of the sound. The wearable device 100 detects an amplitude of the electrical signal regarding the sound received from the electronic patch 219 at a time in which the eye blink is not detected by the eye image.

The wearable device 100 compares the amplitude of the electrical signal detected at the time in which the eye blink is detected and the amplitude of the electrical signal detected at the time in which the eye blink is not detected. As a result of the comparison, if the amplitude of the electrical signal detected at the time in which the eye blink is detected is greater than the amplitude of the electrical signal detected at the time in which the eye blink is not detected, the wearable device 100 checks if the greater amplitude continues to be detected for a certain (e.g., predetermined) period of time (for example, 30 minutes).

If the amplitude of the electrical signal detected at the time in which the eye blink is detected is greater than the amplitude of the electrical signal detected at the time in which the eye blink is not detected for a certain period of time, the wearable device 100 may set the reference information for determining whether the eyes are dry so that the reproduction stop request guide information 103 may be displayed on the display 212.

To detect the eye blink, the eye image obtained by the bio information obtaining camera 208 may be a moving image continuously photographed for a certain period of time.

Referring to FIG. 1C-1, the reference information regarding the eye blink number may be set below 9 times per minute, though it is understood that this is merely an example and one or more other exemplary embodiments are not limited thereto. In the present example, if content reproduction is started by the wearable device 100, the wearable device 100 detects the eye blink number per minute by using an eye image obtained by the bio information obtaining camera 208. If the detected eye blink number is below 9 times per minute, the wearable device 100 may display the reproduction stop request guide information 103 on the display 212. The eye image obtained by the bio information obtaining camera 208 to detect the eye blink number may be a continuously photographed moving image during a certain period of time.

The reference information regarding the eye blink number is not limited as described above. For example, the wearable device 100 may set the reference information regarding the eye blink number so that the reproduction stop request guide information 103 may be displayed on the display 212 if a status in which the eye blink number is below 9 times per minute is maintained for more than 30 minutes. The reference information may set the eye blink number per minute below 6 times.

The reference information regarding the eye blink number may be set based on a variance or a difference of the eye blink number. For example, the wearable device 100 compares the eye blink number detected from the eye image obtained by the bio information obtaining camera 208 at a certain period during a content reproduction period. As a result of the comparison, if the variance of the eye blink number is more than 15%, the wearable device 100 may set the reference information regarding the eye blink number so that the reproduction stop guide information 103 may be displayed on the display 212. The variance of the eye blink number may include both an increase and a decrease in the eye blink number.

Referring to FIG. 1C-1, the reference information regarding the eye blink cycle may be set as 15 seconds. For example, if the content reproduction is started by the wearable device 100, the wearable device 100 detects the eye blink cycle based on an eye image obtained by the bio information obtaining camera 208. If time corresponding to the detected eye blink cycle is more than 15 seconds, the wearable device 100 may display the reproduction stop request guide information 103 on the display 212. The reference information regarding the eye blink cycle is not limited as described above. A moving image continuously photographed for a certain period of time may be the eye image obtained by the bio information obtaining camera 208 to detect the eye blink cycle.

The reference information regarding the eye blink cycle may be set as a variance or a difference of the eye blink cycle. For example, the wearable device 100 detects the eye blink cycle at a certain (e.g., predetermined) cycle by using the eye image obtained by the bio information obtaining camera 208 while the content is reproduced by the wearable device 100. The wearable device 100 compares the detected eye blink cycle. As a result of the comparison, if the variance of the eye blink cycle is more than 15%, the wearable device 100 may display the reproduction stop request guide information 103 on the display 212. The variance of the eye blink cycle may include both a case in which the eye blink cycle is increased and a case in which the eye blink cycle is decreased.

Referring to FIG. 1C-1, the reference information for determining whether the position of the pupil is changed may be set to determine if a location variance is below 0.4 mm. For example, if the content reproduction is started by the wearable device 100, the wearable device 100 detects the center point 107 as described with reference to FIG. 1D based on the eye image obtained by the bio information obtaining camera 208. If a distance between a location of the center point 107 detected from a previous eye image and a location of the center point 107 detected from a current eye image is below 0.4 mm, the wearable device 100 may determine that there is little position change in the pupil of the wearer 101.

According to the determination, the wearable device 100 may display the reproduction stop request guide information 103 on the display 212. The eye image obtained by the bio information obtaining camera 208 to determine whether the position of the pupil is changed may be a moving image continuously photographed during a certain period of time.

Referring to FIG. 1C-1, the reference information for determining whether the pupil is changed may be set to determine if a reduced width of the pupil continues for more than 1 hour. For example, if the content reproduction is started by the wearable device 100, the wearable device 100 detects the diameter 114 of the pupil region 113 as described with reference to FIG. 1E based on a pupil image obtained by the bio information obtaining camera 208. The wearable device 100 calculates the width of the pupil region 113 based on the detected diameter 114 of the pupil region 113. The wearable device 100 compares a width of the pupil region 113 detected from a current pupil image and a width of the pupil region 113 detected from a previous pupil image to determine if the width of the pupil region 113 is reduced.

If it is determined that the width of the pupil region 113 detected from the current pupil image is smaller than the width of the pupil region 113 detected from the previous pupil image, the wearable device 100 determines if the reduced width of the pupil region 113 continues for more than a predetermined time (e.g., 1 hour). To determine if the reduced width of the pupil region 113 continues for more than 1 hour, the wearable device 100 may measure time from a time at which the reduced width of the pupil region 113 is detected.

If it is determined that the reduced width of the pupil region 113 continues for more than 1 hour, the wearable device 100 may display the reproduction stop request guide information 103 on the display 212. The pupil image obtained by the bio information obtaining camera 208 to determine whether the pupil is changed may be a moving image continuously photographed for a certain period of time.

The reference information for determining whether the pupil is changed is not limited as described above. For example, according to another exemplary embodiment, the wearable device 100 may determine whether a diameter of the pupil detected from the pupil image is maintained at below about 3 mm for more than 1 hour 30 minutes to display the reproduction stop request guide information 103 on the display 212.

Alternatively, the wearable device 100 detects a diameter of the pupil detected from a currently obtained pupil image. The wearable device 100 compares a diameter detected from a previously obtained pupil image and the diameter of the pupil detected from the currently obtained pupil image to determine if the diameter of the pupil is reduced. If it is determined that the reduced diameter of the pupil continues for more than 1 hour, the wearable device 100 may display the reproduction stop request guide information 103 on the display 212. In the above-described case, the reference information for determining whether the pupil is changed includes information for determining if the diameter of the pupil smaller than a previous diameter of the pupil is maintained for more than 1 hour. The bio information regarding whether the above-described pupil is changed may be referred to as bio information regarding a status of the pupil.

Referring to FIG. 1C-2, when a body temperature of the wearer 101 is higher or lower than an average body temperature during a content reproduction period, reference information regarding the body temperature may be set such that the reproduction stop request guide information 103 may be displayed on the display 212 by the wearable device 100, but is not limited thereto in one or more other exemplary embodiments. For example, if a body temperature variance of the wearer 101 increases by 1° C. during the content reproduction period, the reference information regarding the body temperature may be set such that the reproduction stop request guide information 103 may be displayed on the display 212 by the wearable device 100. The average body temperature may be an average body temperature of the wearer 101, although it is understood that one or more other exemplary embodiments are not limited thereto. For example, according to another exemplary embodiment, the average body temperature may be a generally known average body temperature (e.g., a predetermined average body temperature).

In the generally known average body temperature, the average body temperature set in the wearable device 100 may differ according to whether the wearer 101 is an adult or a child. For example, the average body temperature set in the wearable device 100 may be 36.6~36.9° C. in the adult and 36.0~37.5° C. in the child. The average body temperature may be differently applied according to a location in which the body temperature of the wearer 101 is measured. For example, different average body temperatures may be applied according to a case where the body temperature is measured based on an ear of the wearer 101 and a case where the body temperature is measured based on an armpit of the wearer 101.

The location in which the body temperature is measured may be determined according to a body temperature measurement device. For example, when the body temperature device is an earring or in-ear type, the wearable device 100 may recognize the measured body temperature as a body temperature based on the ear. When the body temperature measurement device is a shoulder band type, the wearable device 100 may recognize the measured body temperature as a body temperature based on the armpit. The body measurement device may be an external device connected to the wearable device 100 by wire or wirelessly and may be a wearable device. The wearable device 100 may recognize if the body temperature measurement device is the earring type or the shoulder band type based on identification information of the body temperature measurement device.

Referring to FIG. 1C-2, when a sweating amount of the wearer 101 is greater than an average sweating amount during the content reproduction period, reference information regarding the sweating amount may be set such that the reproduction stop request guide information 103 may be displayed on the display 212 by the wearable device 100, but is not limited thereto in one or more other exemplary embodiments.

For example, if a variance or difference of the sweating amount of the wearer 101 during the content reproduction period is greater than 10%, the reference information regarding the variance of the sweating amount may be set such that the wearable device 100 may display the reproduction stop request guide information 103 on the display 212. The average sweating amount may be an average sweating amount of the wearer 101, but is not limited thereto in one or more other exemplary embodiments.

The reference information regarding the sweating amount may be differently set according to a use environment of the wearable device 100. For example, reference information regarding a sweating amount in an environment having a small sweating amount due to a dry use environment of the wearable device 100 and reference information regarding a sweating amount in an environment having a large sweating amount due to a humid use environment thereof may be differently set.

Referring to FIG. 1C-2, if a blood pressure of the wearer 101 is higher or lower than a normal blood pressure during the content reproduction period, reference information regarding the blood pressure may be set such that the reproduction stop request stop guide 103 may be displayed on the display 212 by the wearable device 100, but is not limited thereto in one or more other exemplary embodiments. For example, if it is determined that a blood pressure variance of the wearer 101 during the content reproduction period is higher than 20%, the reference information regarding the blood pressure may be set such that the reproduction stop request guide information 103 may be displayed on the display 212 by the wearable device 100.

Referring to FIG. 1C-2, if a pulse of the wearer 101 is faster or slower than a normal pulse, reference information regarding the pulse may be set such that the reproduction stop request guide information 103 may be displayed on the display 212 by the wearable device 100, but is not limited thereto in one or more other exemplary embodiments. For example, if a pulse variance of the wearer 101 during the content reproduction period is greater than 10%, the reference information regarding the pulse may be set such that the reproduction stop request guide information 103 may be displayed on the display 212 by the wearable device 100.

Referring to FIG. 1C-2, if a blood sugar of the wearer 101 is higher than a normal blood sugar during the content reproduction period, reference information regarding the blood sugar may be set such that the reproduction stop request guide information 103 may be displayed on the display 212 by the wearable device 100, but is not limited thereto in one or more other exemplary embodiments. For example, if it is determined that a blood sugar variance of the wearer 101 is higher than 20%, the reference information regarding the blood sugar may be set such that the reproduction stop request guide information 103 may be displayed on the display 212 by the wearable device 100 but is not limited thereto.

Referring to FIG. 1C-2, if an activity amount of the wearer 101 is greater than a normal activity amount during the content reproduction period, reference information regarding an activity amount may be set such that the reproduction stop request guide information 103 may be displayed on the display 212 by the wearable device 100, but is not limited thereto in one or more other exemplary embodiments. The normal activity amount may be represented as an activity amount (for example, a numerically expressed moving distance, a moving speed, a calorie consumption amount, a heart rate, etc.) in which a breath or breathing rate of the wearer 101 may be determined to be a certain state.

Referring to FIG. 1C-2, the wearable device 100 may change reference information regarding information (for example, content reproduction related information of the wearable device 100, bio information of the wearer 101, peripheral environment information of the wearable device 100, etc.) used by the wearable device 100 to display the reproduction stop request guide information 103 on the display 212 by using obtained medical information.

For example, when the wearer 101 is determined as a diabetes patient based on medical information obtained by the wearable device 100, the wearable device 100 may change the reference information regarding the blood sugar variance from 20% to 10%. If the wearer 101 is determined to suffer from conjunctivitis based on the medical information obtained by the wearable device 100, the wearable device 100 may change reference information for determining whether eyes are bloodshot. The wearable device 100 may change reference information related to content reproduction related information of the wearable device 100, peripheral environment information of the wearable device 100, etc., based on the medical information.

Referring to FIG. 1F, reference information regarding a color temperature may be set based on a peripheral color temperature of the wearable device 100 and maintenance time during the content reproduction period. For example, when the color temperature corresponds to dark blue light, if 2 hours has elapsed, the reference information regarding the color temperature may be set such that the reproduction stop request guide information 103 may be displayed on the display 212 by the wearable device 100. When the color temperature is a light red light, if 4 hours has elapsed, the reference information regarding the color temperature may be set such that the reproduction stop request guide information 103 may be displayed on the display 212 by the wearable device 100. The reference information regarding the color temperature is not limited as described above.

Referring to FIG. 1F, reference information regarding light may be set according to a peripheral brightness level and exposure time of the wearable device 100 during the content reproduction period. Reference information regarding infrared rays may be set according to a peripheral infrared index and exposure time of the wearable device 100 during the content reproduction period Referring to FIG. 1F, if a peripheral temperature of the wearable device 100 is higher than a reference (e.g., predetermined) temperature or a temperature variance or difference is higher than 3° C. during the content reproduction period, reference information regarding a temperature may be set such that the reproduction stop request guide information 103 may be displayed on the display 212 by the wearable device 100.

Referring to FIG. 1F, if a peripheral humidity of the wearable device 100 is lower than 30% or higher than 70% during the content reproduction period, reference information regarding a humidity may be set such that the reproduction stop request guide information 103 may be displayed on the display 212 by the wearable device 100.

Referring to FIG. 1F, if a peripheral wind strength of the wearable device 100 is higher than a reference (e.g., predetermined) wind strength or a wind strength variance is higher than 10% during the content reproduction period, reference information regarding wind may be set such that the reproduction stop request guide information 103 may be displayed on the display 212 by the wearable device 100. The reference wind strength may be indoor wind strength, but is not limited thereto in one or more other exemplary embodiments.

Referring to FIG. 1F, if a peripheral altitude of the wearable device 100 is higher than a reference (e.g., predetermined) altitude (for example, 700 m) during the content reproduction period or an altitude variance during a short period of time (for example, 5 minutes) is higher than 40%, reference information regarding an altitude may be set such that the reproduction stop request guide information 103 may be displayed on the display 212 by the wearable device 100.

Referring to FIG. 1F, if a peripheral air pressure of the wearable device 100 is higher than a reference (e.g., predetermined) air pressure (for example, 2 air pressure) or an air pressure variance or difference is higher than 10% during the content reproduction period, reference information regarding an air pressure may be set such that the reproduction stop request guide information 103 may be displayed on the display 212 by the wearable device 100.

Referring to FIG. 1F, if a peripheral fine dust concentration of the wearable device 100 is higher than a reference (e.g., predetermined) fine dust concentration (for example, 30~80 μg/m³) or a fine dust concentration variance or difference is higher than 10% during the content reproduction period, reference information regarding fine dust may be set such that the reproduction stop request guide information 103 may be displayed on the display 212 by the wearable device 100. A reference regarding the fine dust concentration may be divided into a fine dust mode and an ultrafine dust mode.

Referring to FIG. 1G, the wearable device 100 may change reference information regarding information used to determine whether to display the reproduction stop request guide information 103 on the display 212 during the content reproduction period according to other information, e.g., age information and schedule information.

For example, the wearable device 100 may differentiate the reference information of the information used to determine whether to display the reproduction stop request guide information 103 on the display 212 according to age groups. For example, the wearable device 100 may change reference information regarding a content reproduction time applied to 20 s from 2 hours to 4 hours, change the reference information regarding the content reproduction time applied to 30 s from 2 hours to 3 hours, and maintain the reference information regarding the content reproduction time applied to 40 s to 2 hours.

The wearable device 100 may change the reference information of the information used to determine whether to display the reproduction stop request guide information 103 on the display 212 according to schedules. For example, when a schedule of the wearer 101 includes a meeting before content is reproduced, the wearable device 100 may change reference information regarding a content reproduction time from 2 hours to 1 hour. When a next day schedule of the wearer 101 is a holiday, the wearable device 100 may change the reference information regarding the content reproduction time from 2 hours to 4 hours.

The reference information may be set by the wearable device 100 in advance based on an experimentally determined value, by the wearer 101, or by an external device of the wearable device 100, but is not limited thereto in one or more other exemplary embodiments. The experimentally determined value may be obtained by monitoring reproduction related information of the wearable device 100 that is generated when content is reproduced by the wearable device 100, bio information of the wearer 101, peripheral environment information of the wearable device 100, personal information of the wearer 101, etc., but is not limited thereto in one or more other exemplary embodiments.

The reproduction stop request references of FIGS. 1B, 1C-1, 1C-2, 1F, and 1G represent reference information used to determine whether the wearable device 100 displays the content reproduction stop request guide information 103 on the display 212.

Figure 6:
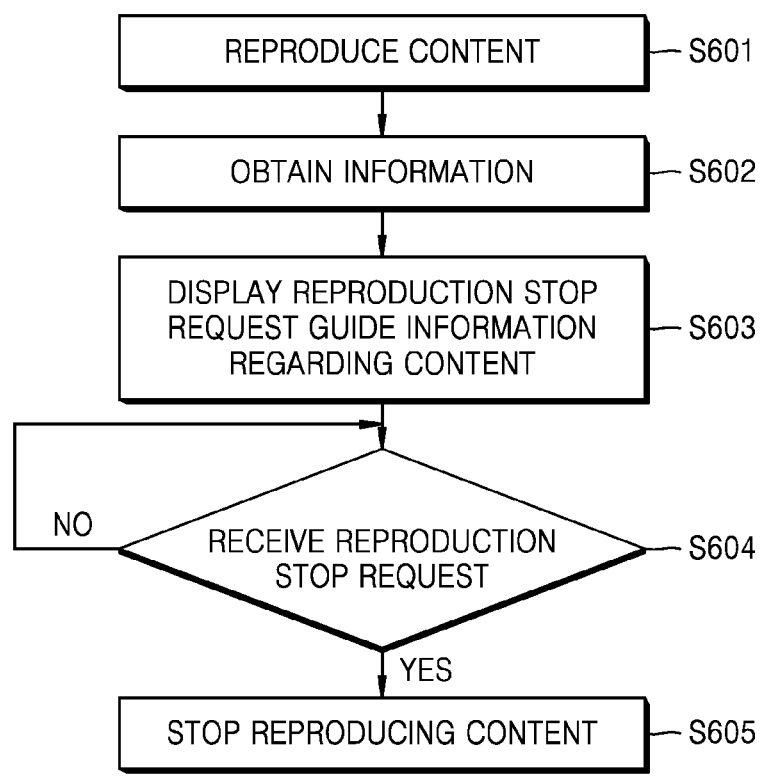
FIG. 6 is a flowchart for explaining a method of operating a wearable device according to an exemplary embodiment.
Figure 7:
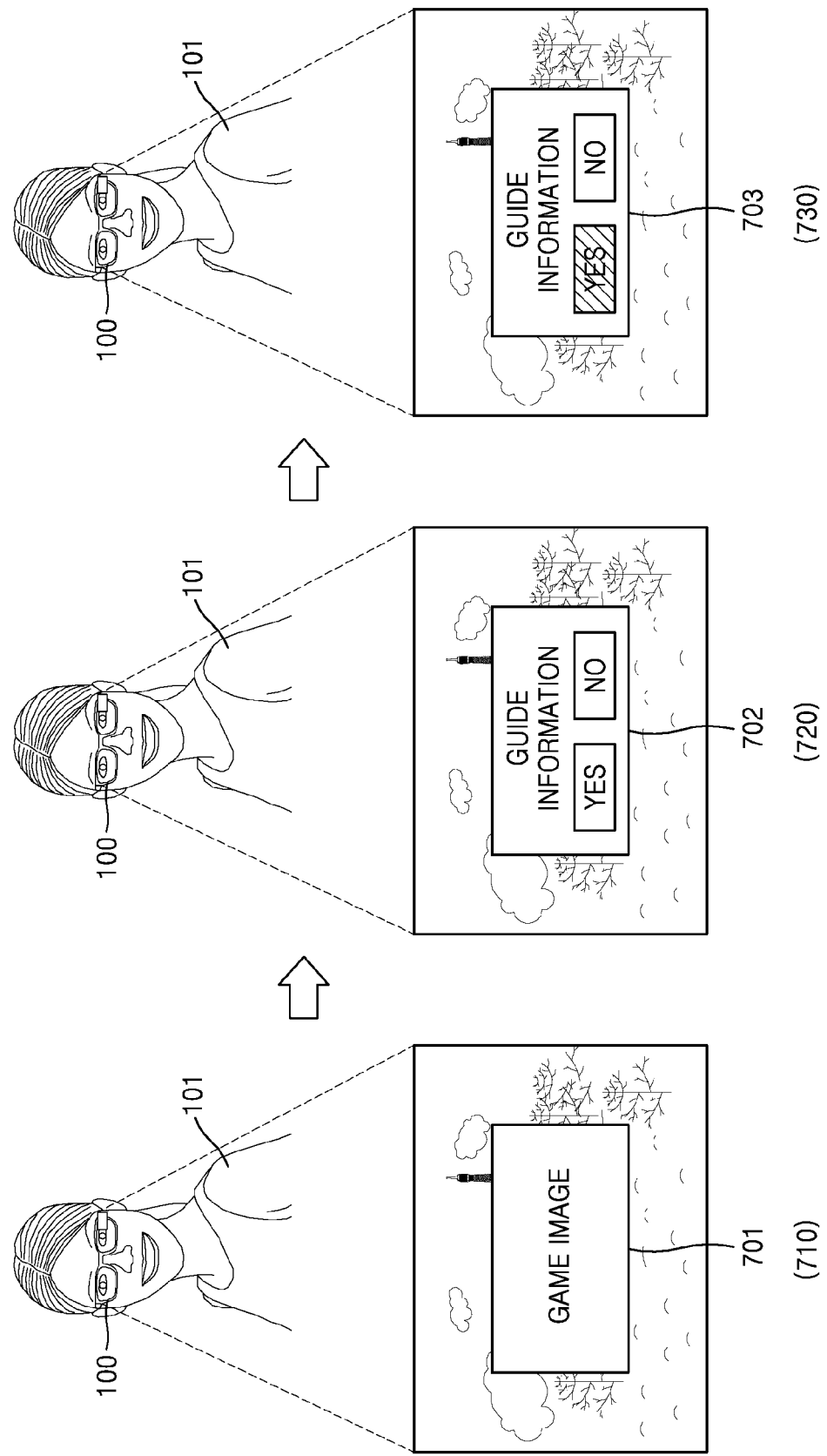
FIG. 7 is a diagram of an example for explaining the flowchart of FIG. 6.

FIG. 6 is a flowchart for explaining a method of operating the wearable device 100 according to an exemplary embodiment. FIG. 7 is a diagram of an example for explaining the flowchart of FIG. 6, according to an exemplary embodiment. The flowchart of FIG. 6 will be described with reference to FIG. 7 below.

In operation S601, when reproduction of a game selected by the wearer 101 is started by the wearable device 100, a game image 701 is reproduced through the display 212. Accordingly, as shown on a screen 710 of FIG. 7, the wearer 101 of the wearable device 100 views a real world provided the lens 204 and the display 212.

When the wearable device 100 is configured as shown in FIG. 5A or 5B, the wearer 101 may view the game image 701 reproduced through the wearable device 100.

When reproducing of the game image 702 is started, in operation S602, the wearable device 100 obtains at least one piece of information from among content reproduction related information of the wearable device 100, bio information of the wearer 101, peripheral environment information of the wearable device 100, and personal information of the wearer 101 that are generated or obtained and relate to the reproducing of content.

The content reproduction related information of the wearable device 100, the bio information of the wearer 101, the peripheral environment information of the wearable device 100, and the personal information of the wearer 101 may be obtained as described above with reference to FIGS. 1B through 1G.

In operation S603, the wearable device 100 displays reproduction stop request guide information 702 regarding the content by using the obtained information. The reproduction stop request guide information 702 may be displayed on the display 212 as shown on a screen 720 of FIG. 7. The reproduction stop request guide information 702 may be a reproduction stop request guide information image for informing the wearer 101 that it may be requested to stop reproducing the content (e.g., suggesting to the user to stop reproducing the content).

Referring to the screen 720 of FIG. 7, the reproduction stop request guide information 702 may include at least one of a query language (for example, do you want to stop reproducing content?) regarding whether to stop reproducing content, an input item regarding a command (for example, yes) used to request a stop of the reproducing of the content, an input item regarding a command (for example, no) used to reject a stop of the reproducing of the content, etc., but is not limited thereto in one or more other exemplary embodiments.

For example, the query language regarding whether to stop reproducing the content may be output as an audio signal, and the reproduction stop request guide information 702 may include the input item regarding the command (for example, yes) used to request the stop of the reproducing of the content and the input item regarding the command (for example, no) used to reject the stop of the reproducing of the content.

The command used to request the stop of the reproducing of the content and the command used to reject the stop of the reproducing of the content may be received as a voice signal of the wearer 101. If a command based on the voice signal of the wearer 101 is received through the microphone 214, the wearable device 100 may change the reproduction stop request guide information 702 to reproduction stop request guide information 703 shown on a screen 730 of FIG. 7. The wearer 101 may confirm based on the screen 730 of FIG. 7 that the input item (for example, yes) has been selected based on the voice signal of the wearer 101.

Referring to the screens 720 and 730 of FIG. 7, the wearable device 100 displays the reproduction stop request guide information 702 and 703 on a region on which the game image 701 is displayed. To display the reproduction stop request guide information 702 and 703 like the screens 720 and 730 of FIG. 7, the wearable device 101 may temporarily stop reproducing the game image 701 and provide the reproduction stop request guide information 702 and 703. A period in which reproduction of the game image 702 is temporarily stopped may be set in advance according to a period to display the reproduction stop request guide information 702 and 703. In one or more exemplary embodiments, the period may be adjusted by a user input or by an application's (e.g., game application) settings. Furthermore, according to one or more other exemplary embodiments, the game image 702 may not be temporarily stopped while the reproduction stop request guide information 702 and 703 is output.

To display the reproduction stop request guide information 702 and 703 like the screens 720 and 730 of FIG. 7, the wearable device 100 may use a method of inserting a still image or a moving image into a moving image.

FIG. 8A is a diagram of an example of explaining a relationship between a game frame 801 and a reproduction stop request guide information frame 802 as a frame structure of inserting a moving image into a moving image. The game frame 801 is a frame regarding or corresponding to game image 701 of FIG. 7. The reproduction stop request guide information frame 802 is a frame regarding or corresponding to the reproduction stop request guide information 702 and 703 of FIG. 7.

Referring to FIG. 8A, the wearable device 100 obtains or generates a frame 803 edited by inserting an M number of reproduction stop request guide information frame 802 between a frame N+1 and a frame N+2 of the game frame 801. The frame described in FIG. 8A is based on an intra (I) frame, though it is understood that this is merely exemplary and one or more other exemplary embodiments are not limited thereto. The M number of reproduction stop request guide information frame 802 may be determined according to a time at which the reproduction stop request guide information 702 is to be reproduced. For example, when the reproduction stop request guide information 702 is reproduced for 2 seconds, M may be 60. A section in which the reproduction stop request guide information 702 is reproduced is not limited as described above.

If a command (for example, yes) of the wearer 101 as described above is received in the section in which the reproduction stop request guide information 702 is reproduced, the wearable device 100 may change content of the reproduction stop request guide information frame 802 from the screen 720 of FIG. 7 to the screen 730. According to the insertion of the reproduction stop request guide information frame 802, the wearable device 100 may change a reproduction section of an audio signal corresponding to a subsequent frame including the frame N+2 of the game frame 801 to be synchronized with the frame N+2 of the game frame 802.

Figure 8B:
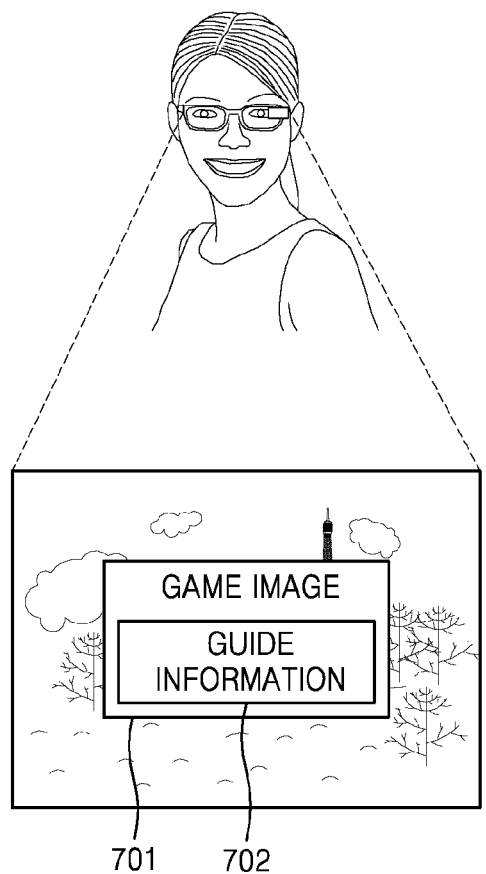
FIGS. 8B and 8C are diagrams of examples of displaying reproduction stop request guide information according to one or more exemplary embodiments.

The wearable device 100 may overlap and display the reproduction stop request guide information 702 on the game image 701 as shown in FIG. 8B. The wearable device 100 may overlap the reproduction stop request guide information 702 on the game image 701 in a manner similar to that when inserting subtitle information into an image, but is not limited thereto in one or more other exemplary embodiments. For example, the wearable device 100 may display the reproduction stop request guide information 702 in the form of a popup window. When the reproduction stop request guide information 702 is displayed in the form of the popup window, the wearable device 100 may continuously reproduce the game image 701. The wearable device 100 may set a region in which the wearer 101 has no difficulty in viewing the game image 701 as a region to which the reproduction stop request guide information 702 may be overlapped.

Figure 8C:
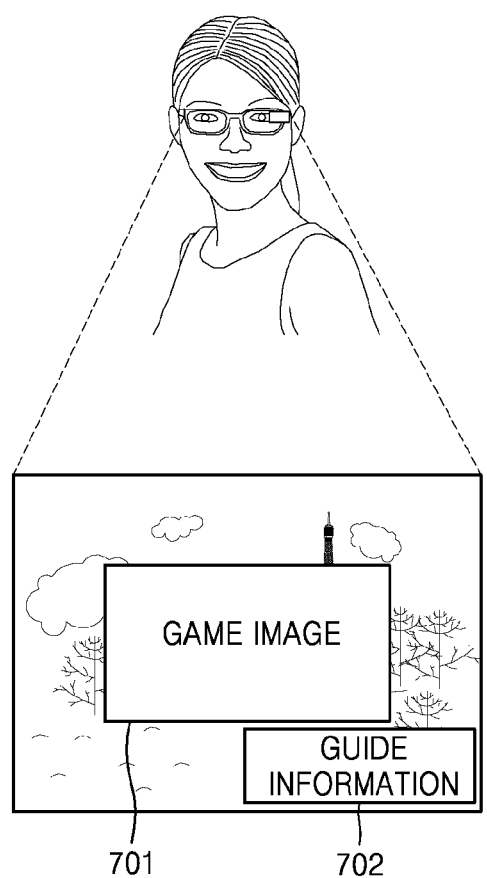

The wearable device 100 may display the reproduction stop request guide information 702 as shown in FIG. 8C on a display region independent from (e.g., separated from) the game image 701. When the reproduction stop request guide information 702 is displayed on the display region independent from the game image 701 as shown in FIG. 8C, the wearable device 100 may transmit the reproduction stop request guide information 702 to another device (or an external device) to display the reproduction stop request guide information 702 on a display of the other device. The other device may be a device whose display is positioned in a real world that may be viewed through the lens 204 of the wearable device 100. For example, the other device may be a device such as a television (TV), a personal computer (PC), a mobile device, a monitor, a display, a tablet device, a projector device, etc.

To display the reproduction stop request guide information 702 as shown in FIG. 8C, in a situation where the reproduction stop request guide information 702 is to be displayed, the wearable device 100 may transmit information regarding the reproduction stop request guide information 702 to the other device. The information regarding the reproduction stop request guide information 702 may include a reproduction stop request guide information message, but is not limited thereto in one or more other exemplary embodiments. For example, the information regarding the reproduction stop request guide information 702 may include the reproduction stop request guide information 702 and display standard information regarding the reproduction stop request guide information 702. The display standard information may include at least one of a resolution and format information (for example, JPG, etc.) of the reproduction stop request guide information 702, but is not limited thereto in one or more other exemplary embodiments. The format information of the reproduction stop request guide information 702 indicates a file format of the reproduction stop request guide information 702.

A communication channel between the wearable device 100 and the other device may be set when the reproduction stop request guide information 702 is to be displayed, but is not limited thereto in one or more other exemplary embodiments. For example, the communication channel between the wearable device 100 and the other device may be set before the reproduction stop request guide information 702 is to be displayed. That is, the wearable device 100 may transmit the information regarding the reproduction stop request guide information 702 to a device whose display is positioned in the real world that may be viewed through the lens 204 among other devices in which the communication channel is set.

The device whose display is positioned in the real world that may be viewed through the lens 204 among other devices may be selected by the wearer 101 based on a list of devices connected to the wearable device 100.

For example, the wearable device 100 receives and stores information regarding a location of another device when the communication channel is set. The wearable device 100 may select another device based on the stored information regarding the location of another device and a current location of the wearable device 100. When another device is a mobile device, the location information of the other device stored in the wearable device 100 may be changed every time the location of the other device is changed. The communication channel between the other device and the wearable device 100 may be set based on near field wireless communication or wireless communication such as Bluetooth, RFID, etc., but is not limited thereto.

When the reproduction stop request guide information 702 is displayed as shown in FIGS. 8B and 8C, the wearable device 100 may display more brief information than reproduction stop request guide information displayed on the screen 720 of FIG. 7.

When the reproduction stop request guide information 702 is displayed as shown on the screen 720 of FIG. 7, if a reproduction stop request for content is received through the user input unit 207 (operation S604), the wearable device 100 stops reproducing the content (operation S605). Since reproduction of the content is stopped, the wearable device 100 may display an image indicating a status in which content is not reproduced to a region in which the game image 701 and the reproduction stop request guide information 702 and 703 are provided, but is not limited thereto in one or more other exemplary embodiments. The image indicating the status in which the content is not reproduced may be a black image or a white image, but is not limited thereto in one or more other exemplary embodiments.

If the reproduction stop request for the content is not received in operation S604 of FIG. 6, the wearable device 100 maintains a standby status until the reproduction stop request for the content is received.

The flowchart of FIG. 6 may be modified such that if the reproduction stop request for the content is not received in operation S604, an operation of the wearable device 100 may return to operation S601.

A failure in receiving the reproduction stop request for the content may include a content reproduction stop request rejection. When it is determined that the reproduction stop request for the content is not received since the content reproduction stop request rejection is received in operation S604 of FIG. 6, the operation of the wearable device 100 may return to operation S601 to continuously reproduce content being reproduced.

Figure 9:
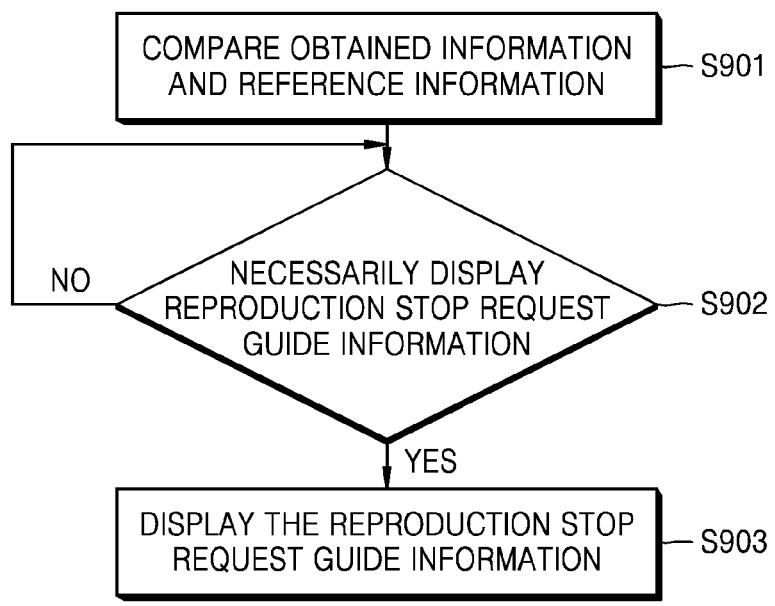
FIG. 9 is a detailed flowchart of an operation of displaying reproduction stop request guide information included in the flowchart of FIG. 6.

FIG. 9 is a detailed flowchart of operation S603 of displaying the reproduction stop request guide information 702 of FIG. 6, according to an exemplary embodiment. FIG. 9 is an example of displaying the reproduction stop request guide information 702 one time by using one piece of reference information.

In operation S901, the wearable device 100 compares information obtained in operation S602 and the reference information. The reference information may be determined according to the information obtained in operation S602 as described above with reference to FIGS. 1B through 1G.

As a result of the comparison in operation S901, if it is determined to display the reproduction stop request guide information 702 (operation S902), the wearable device 100 displays the reproduction stop request guide information 702 as described above with reference to FIGS. 7, 8B, and 8C (operation S903). A method of displaying the reproduction stop request guide information 702 may be set in the wearable device 100 in advance or may be selected by the wearer 101, but is not limited thereto in one or more other exemplary embodiments. In a case where it is determined to display the reproduction stop request guide information 702, a status is indicated, in which the health of the wearer 101 may be influenced (for example, eye fatigue) since the wearer 101 views content reproduced by the wearable device 100 as described above with reference to FIGS. 1A through 1G. The status may be determined based on the reference information set according to obtained information as described above with reference to FIGS. 1B through 1G.

FIG. 10 is a flowchart for explaining a method of operating the wearable device 100 according to another exemplary embodiment. FIG. 10 is an example of displaying the reproduction stop request guide information 702 a plurality of times by using reference information.

In operations S1001 and S1002, the wearable device 100 operates similarly to operations S601 and S602 of FIG. 6.

In operation S1003, the wearable device 100 compares information obtained in operation S1002 and the reference information. The form or number of the reference information may be different according to the obtained information.

FIG. 11 is a table of a relationship between reference information set in the wearable device 100 and the number of reproduction stop request guide information when obtained information is a reproduction time of content, according to an exemplary embodiment. Referring to the table of FIG. 11, the form of the reference information is time, the number of the reference information is 5, and the number of the reproduction stop request guide information is 5, but the form and number of the reference information and the number of the reproduction stop request guide information are not limited thereto in one or more other exemplary embodiments.

FIG. 12 is a table of a relationship between reference information set in the wearable device 100 and the number of reproduction stop request guide information when obtained information is a battery consumption amount, according to an exemplary embodiment. Referring to the table of FIG. 12, the form of the reference information is a ratio, the number of the reference information is 3, and the number of the reproduction stop request guide information is 3, but the form and number of the reference information and the number of the reproduction stop request guide information are not limited thereto in one or more other exemplary embodiments.

FIG. 13A is a table of a relationship between reference information set in the wearable device 100 and the number of reproduction stop request guide information when obtained information relates to a heating temperature and includes the heating temperature and maintenance time information, according to an exemplary embodiment. Referring to the table of FIG. 13A, the form of the reference information is a temperature and time, the number of the reference information is 3, and the number of the reproduction stop request guide information is 3, but the form and number of the reference information and the number of the reproduction stop request guide information are not limited thereto in one or more other exemplary embodiments.

FIG. 13B is a table of a relationship between reference information set in the wearable device 100 and the number of reproduction stop request guide information when obtained information relates to a heating temperature and includes the heating temperature, according to an exemplary embodiment. Referring to the table of FIG. 13B, the form of the reference information is a temperature, the number of the reference information is 1, and the number of the reproduction stop request guide information is 3, but the form and number of the reference information and the number of the reproduction stop request guide information are not limited thereto in one or more other exemplary embodiments.

FIG. 14 is a table of a relationship between reference information set in the wearable device 100 and the number of reproduction stop request guide information when obtained information is information for determining whether eyes of the wearer 101 are bloodshot, according to an exemplary embodiment. Referring to the table of FIG. 14, the form of the reference information is an increase rate in the number of pixels having an R value approximate to 255, the number of the reference information is 3, and the number of the reproduction stop request guide information is 3, but the form and number of the reference information and the number of the reproduction stop request guide information are not limited thereto in one or more other exemplary embodiments.

When it is determined whether the eyes are bloodshot by using a plurality of pieces of reference information as shown in FIG. 14, whether the eyes are bloodshot may represent a bloodshot degree of the eyes. For example, when the increase rate is 20%, the bloodshot degree of the eyes may be a low level, when the increase rate is 30%, the bloodshot degree of the eyes may be a middle level, and when the increase rate is 40%, the bloodshot degree of the eyes may be a high level. However, it is understood that these rates are merely exemplary, and one or more other exemplary embodiments are not limited thereto.

FIG. 15 is a table of a relationship between reference information set in the wearable device 100 and the number of reproduction stop request guide information when obtained information is information for determining whether eyes of the wearer 101 are dry, according to an exemplary embodiment. Referring to the table of FIG. 15, the form of the reference information is humidity and time information, the number of the reference information is 3, and the number of the reproduction stop request guide information is 3, but the form and number of the reference information and the number of the reproduction stop request guide information are not limited thereto in one or more other exemplary embodiments.

When it is determined whether the eyes of the wearer 101 are dry by using a plurality of pieces of reference information as shown in FIG. 15, whether the eyes of the wearer 101 are dry may represent a degree of dryness of the eyes. For example, when the degree of dryness of the eyes is determined based on humidity and time as shown in FIG. 1C-2, in a maintenance status for 1 hour at humidity 30%, the degree of dryness of the eyes may be a low level, in a maintenance status for 1 hour 30 minutes at humidity 30%, the degree of dryness of the eyes may be a middle level, and in a maintenance status for 2 hours at humidity 30%, the degree of dryness of the eyes may be a high level. However, it is understood that these values are merely exemplary, and one or more other exemplary embodiments are not limited thereto.

The number of the reproduction stop request guide information of FIGS. 11 through 12, 13A, 13B, and 14 through 15 indicates the number of the reproduction stop request guide information 702 displayed on the display 212. When the number of the reference information is plural, the number of the reproduction stop request guide information may be the same as the number of the reference information, but is not limited thereto in one or more other exemplary embodiments. For example, a plurality of numbers of the reproduction stop request guide information may be set with respect to one piece of the reference information as shown in FIG. 13B. The greater the number of the reproduction stop request guide information, the higher the eye fatigue of the wearer 101.

The number of reproduction stop request guide information allocated to one piece of reference information may be set in the wearable device 100 in advance according to a type of obtained information, but is not limited thereto in one or more other exemplary embodiments. For example, the number of reproduction stop request guide information allocated to one piece of reference information may be set by the wearer 101 or by an external device (for example, a service providing server, etc.) of the wearable device 100 and may be provided to the wearable device 100.

In addition to bio information of the wearer 101 of FIGS. 14 and 15, a table indicating bio information of FIGS. 1C-1 and 1C-2, and a relationship between at least one piece of reference information regarding peripheral environment information of FIG. 1F may be set in the wearable device 100. The table set in the wearable device 100 may be made, obtained, or generated based on a reproduction stop request reference defined in FIGS. 1C-1, 1C-2, and 1F. At least one piece of reference information with respect to the obtained information and the number of reproduction stop request guide information may be differently set based on medical information of the wearer 101 described in FIG. 1C-2 and personal information of the wearer 101 described in FIG. 1G.

Meanwhile, when information obtained in operation S1002 is a content reproduction time, in operation S1003 of FIG. 10, the wearable device 100 compares the reference information of FIG. 11 and a reproduction time of obtained content.

As a result of the comparison, if the reproduction time of the obtained content is 1 hour, in operation S1004, the wearable device 100 determines to display the reproduction stop request guide information 702 on the display 212. Accordingly, the wearable device 100 displays the reproduction stop request guide information 702 on the display 212 (operation S1005).

If the wearer 101 requests a content reproduction stop in operation S1006 based on the displayed reproduction stop request guide information 702, in operation S1007, the wearable device 100 stops reproducing the content. An operation of the wearable device 100 to stop reproducing the content may be performed as in operation S605 of FIG. 6.

In operation S1006 of FIG. 10, if the wearer 101 rejects the content reproduction stop, in operation S1008, the wearable device 100 checks the number of the reproduction stop request guide information 702. As a result of check, if the number of the reproduction stop request guide information 702 is not identical to a maximum value, the wearable device 100 obtains a content reproduction time while continuously reproducing the content in operation S1009.

The maximum value may be differently set according to respective obtained information. The maximum value may be determined according to the number of the reference information or may be determined according to a fatigue management level of the wearer 101 during a content reproduction period. For example, when the fatigue management level of the wearer 101 is a low level (weak level), the maximum value may be set such that the reproduction stop request guide information 702 may be displayed one time with respect to one piece of reference information as shown in FIGS. 11, 12, 13A, 14, and 15.

When the fatigue management level of the wearer 101 is a high level (strong level), the maximum value may be set such that the reproduction stop request guide information 702 may be displayed a plurality of times with respect to one piece of reference information as shown in FIG. 13B. A case where the fatigue management level of the wearer 101 is a low level and a case where the fatigue management level of the wearer 101 is a high level are not limited as described above.

When it is configured that one may be selected from a plurality of the fatigue management levels (for example, a high level mode and a low level mode) of the wearer 101 with respect to information (for example, a heating temperature) that is to be obtained by the wearable device 100, the wearer 101 may select the fatigue management level of the wearer 101 before content is reproduced, but is not limited thereto in one or more other exemplary embodiments. The wearable device 100 may display guide information on the display 212 before reproducing the content such that the wearer 101 may select the fatigue management level of the wearer 101.

The high level mode of the fatigue management level of the wearer 101 may be a mode in which the reproduction stop request guide information 702 is displayed a plurality of times with respect to one piece of reference information. The low level mode of the fatigue management level of the wearer 101 may be a mode in which the reproduction stop request guide information 702 is displayed one time with respect to one piece of reference information. A condition for determining whether to relax the fatigue of the wearer 101 may be set such that the high level mode of the fatigue management level of the wearer 101 is more restrictive than the low level mode of the fatigue management level of the wearer 101.

In the table of FIG. 11, the maximum value is 5. In the tables of FIGS. 12, 13A, 13B, and 14 through 15, the maximum value is 3. However, it is understood that the maximum value with respect to respective information is not limited thereto in one or more other exemplary embodiments.

Meanwhile, in operation S1009 of FIG. 10, if a content reproduction time is obtained while content is reproduced, the wearable device 100 returns to operation S1003 to repeatedly perform the above-described process.

As a result of the check in operation S1008, if the number of the reproduction stop request guide information 702 is identical to the maximum value, the wearable device 100 does not display the reproduction stop request guide information 702 on the display 212, but forcibly stops reproducing the content in operation S1007.

The operations of the wearable device 100 based on operations S1008 and S1007 are not limited as described above. For example, as a result of the check in operation S1008, if the number of displaying the reproduction stop request guide information 702 on the display 212 is identical to the maximum value, the wearable device 100 may stop reproducing the content. When stopping the reproducing of the content, the wearable device 100 may provide guide information regarding a content reproduction stop. The guide information regarding the content reproduction stop may be provided as, for example, "reproduction of content will be stopped in C minutes". The wearer 101 may previously prepare for a forcible stop of reproduction of the content according to the guide information regarding the content reproduction stop.

When the obtained information is a content reproduction time, and the reference information set in the wearable device 100 is as shown in the table of FIG. 11, the reproduction stop request guide information 702 may be provided 5 times at the maximum according to a content reproduction stop rejection command of the wearer 101 based on the flowchart of FIG. 10.

When the obtained information is a battery consumption amount, and the reference information set in the wearable device 100 is as shown in the table of FIG. 12, the reproduction stop request guide information 702 may be provided 3 times at the maximum according to the content reproduction stop rejection command of the wearer 101 based on the flowchart of FIG. 10.

When the obtained information is a heating temperature and maintenance time, and the reference information set in the wearable device 100 is as shown in the table of FIG. 13A, the reproduction stop request guide information 702 may be provided 3 times at the maximum according to the content reproduction stop rejection command of the wearer 101 based on the flowchart of FIG. 10.

When the obtained information is a heating temperature, and the reference information set in the wearable device 100 is as shown in the table of FIG. 13B, the reproduction stop request guide information 702 may be provided 3 times at the maximum according to the content reproduction stop rejection command of the wearer 101 based on the flowchart of FIG. 10.

When the obtained information is a bloodshot degree of eyes, and the reference information set in the wearable device 100 is as shown in the table of FIG. 14, the reproduction stop request guide information 702 may be provided 3 times at the maximum according to the content reproduction stop rejection command of the wearer 101 based on the flowchart of FIG. 10.

When the obtained information is a degree of dryness of eyes based on a peripheral humidity, and the reference information set in the wearable device 100 is as shown in the table of FIG. 15, the reproduction stop request guide information 702 may be provided 3 times at the maximum according to the content reproduction stop rejection command of the wearer 101 based on the flowchart of FIG. 10.

A repeated process based on the maximum value of FIG. 10 will now be described in more detail with reference to the table regarding the content reproduction time of FIG. 11.

Since the number of the reproduction stop request guide information 702 is one time in operation S1008 as described above, the wearable device 100 obtains content reproduction time information while continuously providing content in operation S1009 and returns to operation S1003 to compare the obtained content reproduction time information and reference information.

As a result of the comparison, if the content reproduction time is 2 hours, in operation S1004, the wearable device 100 determines to display the reproduction stop request guide information 702 on the display 212. Accordingly, in operation S1005, the wearable device 100 displays the reproduction stop request guide information 702 on the display 212.

If the wearer 101 requests a content reproduction stop based on the reproduction stop request guide information 702, the wearable device 100 stops reproducing the content in operation S1007.

If the wearer 101 rejects the content reproduction stop based on the reproduction stop request guide information 702, the wearable device 100 checks if the number of providing the reproduction stop request guide information 702 (or a reproduction stop request guide number) is identical to a maximum value in operation S1008. Referring to FIG. 11, since the number of providing the reproduction stop request guide information 702 is 2 times at present, the wearable device 100 determines that the number of providing the reproduction stop request guide information 702 is not identical to 5 times, which is the maximum value.

Accordingly, the wearable device 100 continuously reproduces content to obtain content reproduction time information in operation S1009 and returns to operation S1003 to compare the obtained content reproduction time information and reference information.

If the content reproduction time information is 3 hours, in operation S1004, the wearable device 100 determines to display the reproduction stop request guide information 702 on the display 212. Accordingly, in operation S1005, the wearable device 100 displays the reproduction stop request guide information 702 on the display 212.

If the wearer 101 requests the content reproduction stop based on the reproduction stop request guide information 702, the wearable device 100 stops reproducing the content in operation S1007.

If the wearer 101 rejects the content reproduction stop based on the reproduction stop request guide information 702, the wearable device 100 checks if the number of providing the reproduction stop request guide information 702 is identical to the maximum value in operation S1008. Referring to FIG. 11, since the number of providing the reproduction stop request guide information 702 is 3 times at present, the wearable device 100 determines that the number of providing the reproduction stop request guide information 702 is not identical to 5 times, which is the maximum value.

Accordingly, the wearable device 100 continuously reproduces content to obtain content reproduction time information in operation S1009 and returns to operation S1003 to compare the obtained content reproduction time information and the reference information.

If the content reproduction time information is 4 hours, in operation S1004, the wearable device 100 determines to display the reproduction stop request guide information 702 on the display 212. Accordingly, in operation S1005, the wearable device 100 displays the reproduction stop request guide information 702 on the display 212.

If the wearer 101 requests the content reproduction stop based on the reproduction stop request guide information 702, the wearable device 100 stops reproducing the content in operation S1007.

If the wearer 101 rejects the content reproduction stop based on the reproduction stop request guide information 702, the wearable device 100 checks if the number of providing the reproduction stop request guide information 702 is identical to the maximum value in operation S1008. Referring to FIG. 11, since the number of providing the reproduction stop request guide information 702 is 4 times at present, the wearable device 100 determines that the number of providing the reproduction stop request guide information 702 is not identical to 5 times, which is the maximum value.

Accordingly, the wearable device 100 continuously reproduces content to obtain content reproduction time information in operation S1009 and returns to operation S1003 to compare the obtained content reproduction time information and the reference information.

If the content reproduction time information is 5 hours, in operation S1004, the wearable device 100 determines to display the reproduction stop request guide information 702 on the display 212. Accordingly, in operation S1005, the wearable device 100 displays the reproduction stop request guide information 702 on the display 212.

If the wearer 101 requests the content reproduction stop based on the reproduction stop request guide information 702, the wearable device 100 stops reproducing the content in operation S1007.

If the wearer 101 rejects the content reproduction stop based on the reproduction stop request guide information 702, the wearable device 100 checks if the number of providing the reproduction stop request guide information 702 is identical to the maximum value in operation S1008. Referring to FIG. 11, since the number of providing the reproduction stop request guide information 702 is 5 times at present, the wearable device 100 determines that the number of providing the reproduction stop request guide information 702 is identical to 5 times, which is the maximum value.

Accordingly, the wearable device 100 may forcibly stop reproducing the content in operation S1007 as described above.

An operation of displaying the reproduction stop request guide information 702 on the display 212, as shown in the flowchart of FIG. 10, may be performed a plurality of times like the above-described content reproduction time when the obtained information is a battery consumption amount, a heating temperature, a bloodshot degree of eyes of the wearer 101, and a degree of dryness of the eyes of the wearer 101 by using the tables of FIGS. 12, 13A, 13B, and 14 through 15. The number of providing the reproduction stop request guide information 702 mentioned in the above-described flowchart of FIG. 10 indicates the number of times of displaying the reproduction stop request guide information 702.

The operation, as shown in the flowchart of FIG. 10, may be performed by using the tables regarding the reference information as shown in FIGS. 11 through 12, 13A, 13B, and 14 through 15 with respect to respective information or combinations of at least two pieces of information described above with reference to FIGS. 1B, 1C-1, 1C-2, 1F, and 1G. The tables of FIGS. 11, 12, 13A, 13B, 14, and 15 are tables regarding one piece of information. In the tables of FIGS. 13A and 15, two pieces of reference information are used but are tables regarding one piece of information. That is, FIG. 13A is the table regarding the heating temperature of FIG. 1B, and FIG. 15 is the table regarding the degree of dryness of the eyes of the wearer 101 of FIG. 1C-1.

The combinations of at least two pieces of information may be defined, by way of example, as follows:

(1) combination of at least two pieces of information among content reproduction related information of the wearable device 100 of FIG. 1B;

(2) combination of at least one piece of information among content reproduction related information of the wearable device 100 of FIG. 1B and at least one piece of information among bio information based on eyes of the wearer 101 of FIG. 10-1;

(3) combination of at least one piece of information among content reproduction related information of the wearable device 100 of FIG. 1B and at least one piece of information among health information of the wearer 101 of FIG. 10-2;

(4) combination of at least one piece of information among content reproduction related information of the wearable device 100 of FIG. 1B and at least one piece of information among peripheral environment information of FIG. 1F;

(5) combination of at least two pieces of information among the bio information based on eyes of the wearer 101 of FIG. 1C-1;

(6) combination of at least one piece of information among the bio information based on eyes of the wearer 101 of FIG. 1C-1 and at least one piece of information among the health information of the wearer 101 of FIG. 10-2;

(7) combination of at least one piece of information among the bio information based on eyes of the wearer 101 of FIG. 1C-1 and at least one piece of information among the peripheral environment information of FIG. 1F;

(8) combination of at least two pieces of information among the health information of the wearer 101 of FIG. 10-2;

(9) combination of at least one piece of information among the health information of the wearer 101 of FIG. 1C-2 and at least one piece of information among the peripheral environment information of FIG. 1F, and

(10) combination of at least two pieces of information among the peripheral environment information of FIG. 1F.

The health information of the wearer 101 described in the above-described examples may include health information excluding the medical information of FIG. 1C-2. Examples of the combinations of at least two pieces of information are not limited as described above.

Figure 16:
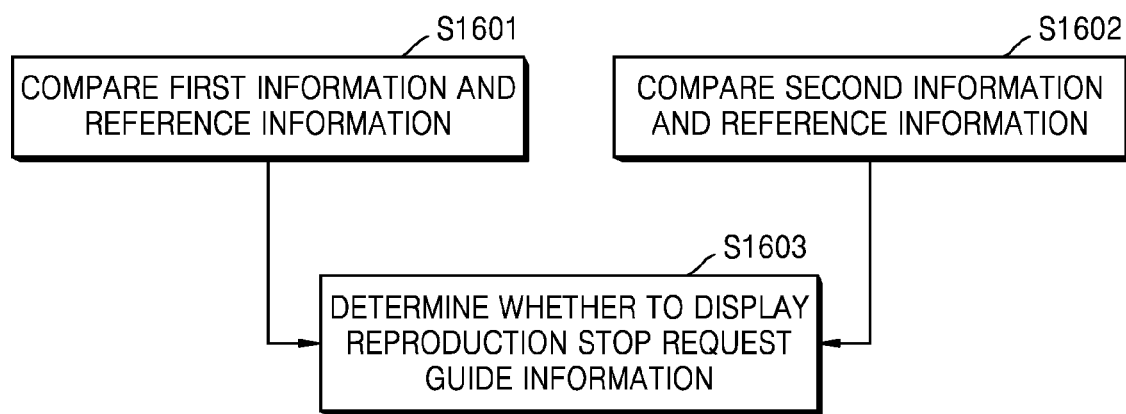
FIG. 16 is a flowchart of determining whether to display reproduction stop request guide information on a display based on combinations of two pieces of information, according to an exemplary embodiment.

FIG. 16 is a flowchart of determining whether to display the reproduction stop request guide information 702 on the display 212 based on the above-described combinations of two pieces of information. When the flowchart of FIG. 16 is included in operation S603 of FIG. 6, in operation S602 of FIG. 6, the wearable device 100 may obtain first information and second information.

In operation S1601, the wearable device 100 compares the obtained first information and reference information. The first information may include one of information described in the above-described combinations (1) through (10) of two pieces of information. For example, the first information may be one of content reproduction related information of the wearable device 100 described in FIG. 1B, but is not limited thereto. When the first information is a content reproduction time, the reference information may be set as a reproduction stop request reference of FIG. 1B or reference information of FIG. 11, but is not limited thereto.

In operation S1602, the wearable device 100 compares the obtained second information and the reference information. The second information may include one of the information described in the above-described combinations (1) through (10) of two pieces of information. For example, the second information may be one of the content reproduction related information of the wearable device 100 mentioned in FIG. 1B, but is not limited thereto. For example, when the second information is a battery consumption amount, the reference information may be set as the reproduction stop request reference of FIG. 1B or reference information of FIG. 12, but is not limited thereto.

Operations S1601 and S1602 may be simultaneously performed as shown in FIG. 16, but are not limited thereto in one or more other exemplary embodiments. For example, the wearable device 100 may perform operation S1601 prior to operation S1602 or may perform operation S1602 prior to operation S1601.

In operation S1603, when it is determined to display the reproduction stop request guide information 702 on the display 212 according to a result of the comparison in operation S1601 and to display the reproduction stop request guide information 702 on the display 212 according to a result of the comparison in operation S1602, the wearable device 100 may determine to display the reproduction stop request guide information 702 on the display 212.

However, in operation S1603, the wearable device 100 may determine whether to display the reproduction stop request guide information 702 according to previously set priority information of the first information and the second information. For example, when a priority of the first information is higher or greater than that of the second information, the wearable device 100 may determine that the reproduction stop request guide information 702 may be displayed on the display 212 according to a comparison result of the first information and reference information irrespective of a comparison result of the second information and the reference information. Meanwhile, when a priority of the second information is higher or greater than that of the first information, the wearable device 100 may determine that the reproduction stop request guide information 702 may be displayed on the display 212 according to the comparison result of the second information and the reference information irrespective of the comparison result of the first information and the reference information.

In operation S1603, if it is determined to display the reproduction stop request guide information 702 on the display 212 according to the comparison result of at least one of the first information and the second information and the reference information, the wearable device may determine that the reproduction stop request guide information 702 may be displayed on the display 212.

A condition for determining whether to display the reproduction stop request guide information 702 on the display 212 based on a plurality of pieces of information may be set in the wearable device 100 in advance, but is not limited thereto in one or more other exemplary embodiments. For example, the above-described condition may be set by the wearer 101 or by an external device (for example, a portable terminal of a parent, a guardian, a supervisor, etc.).

The above-described condition may include, for example, a first condition that considers both a comparison result based on the first information of operation S1601 and the second information of operation S1602, a second condition that considers a comparison result of information having a higher priority among a comparison result based on the first information and a comparison result based on the second information, a third condition that considers one of the comparison result based on the first information and the comparison result based on the second information, but is not limited thereto in one or more other exemplary embodiments. One comparison result as described in the third condition may include a previously obtained comparison result, but is not limited thereto in one or more other exemplary embodiments.

When the first information is one of content reproduction related information of the wearable device 100 of FIG. 1B, the second information may be one of bio information of the wearer 101 of FIGS. 1C-1 and 1C-2.

When the first information is one of the content reproduction related information of the wearable device 100 of FIG. 1B, the second information may be one of peripheral environment information of the wearable device 100 of FIG. 1F.

When the first information is one of the bio information of the wearer 101 of FIGS. 1C-1 and 1C-2, the second information may be one of the bio information of the wearer 101 of FIGS. 1C-1 and 1C-2.

When the first information is one of the bio information of the wearer 101 of FIGS. 1C-1 and 1C-2, the second information may be one of the peripheral environment information of the wearable device 100 of FIG. 1F.

When the first information is one of the peripheral environment information of the wearable device 100 of FIG. 1F, the second information may be one of the peripheral environment information of the wearable device 100 of FIG. 1F.

Figure 17:
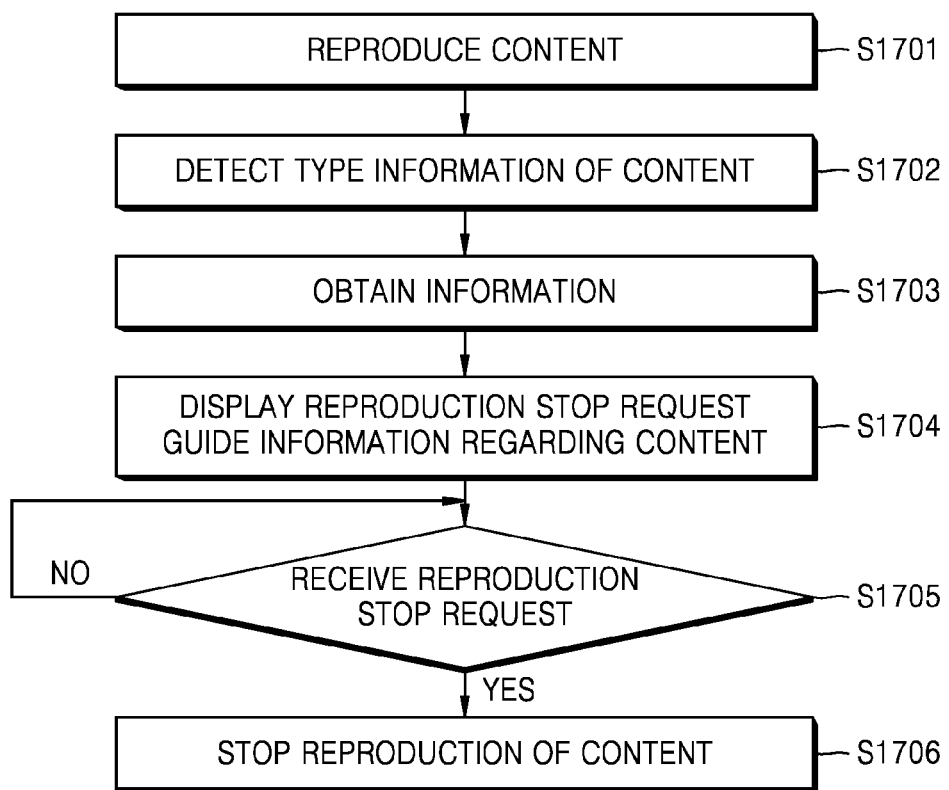
FIG. 17 is a flowchart for explaining a method of operating a wearable device according to another exemplary embodiment.

FIG. 17 is a flowchart for explaining a method of operating the wearable device 100 according to another exemplary embodiment. FIG. 17 is an example of displaying reproduction stop request guide information regarding content according to content type information.

Operations of the wearable device 100 in operations S1701, S1703, S1705, and S1706 of FIG. 17 are similar to operations of the wearable device 100 in operations S601, S602, S604, and S605 of FIG. 6, and thus redundant descriptions thereof are omitted below.

In operation S1702, the wearable device 100 detects type information of reproduced content. The type information of the content indicates information informing which category of information is transferred by or corresponds to the content. By way of example, the type information of the content may be determined according to an application reproducing the content. For example, when an application executed by the wearable device 100 is a game application, the type information of the content may be detected as "game". When the application executed by the wearable device 100 is a DMB application, the type information of the content may be detected as "broadcasting". When the application executed by the wearable device 100 is a video player application, the type information of the content may be detected as "movie". When the application executed by the wearable device 100 is an e-book application, the type information of the content may be detected as "e-book".

The type information of the content may be detected from information regarding an application currently executed by the wearable device 100. The information regarding the application may include information such as an application name or a category to which the application belongs (for example, game, life, music, video on demand (VOD), e-book, etc.), but is not limited thereto in one or more other exemplary embodiments. The category to which the application belongs may indicate a range to which an application having the same type belongs. The category to which the application belongs may be a keyword allocated to the application having the same type, but is not limited thereto in one or more other exemplary embodiments. The wearable device 100 may detect the type information of the content by using information regarding the category to which the application belongs, but is not limited thereto in one or more other exemplary embodiments.

In operation S1704, the wearable device 100 compares the obtained information and reference information. The reference information may include reference information set according to a type of the content detected in operation S1702. A form of the reference information may be the same as or similar to that described with reference to FIGS. 6 through 10.

FIG. 18 is a table of an example for explaining a relationship between a type of content and reference information, according to an exemplary embodiment. The reference information of FIG. 18 is reference information regarding a content reproduction time, but is not limited thereto in one or more other exemplary embodiments. For example, the reference information may be set based on reproduction stop request references and a content type of FIGS. 1B, 1C-1, 1C-2, and 1F according to information obtained in operation S1703.

Different reference information may be set according to the content type as shown in FIG. 18. For example, when the content type is a game, the reference information is 1 hour. When the content type is a movie, the reference information is 2 hours. When the content type is an e-book, the reference information is 3 hours. When the content type is music, the reference information is 4 hours.

As seen from the reference information set in FIG. 18, the reference information may be set in consideration of a concentration of the wearer 101 according to a content type. The concentration of the wearer 101 indicates a degree of immersion or attention of the wearer 101 into content reproduced by the wearable device 100.

The concentration according to the content type may be set based on an experimental result when the content is reproduced, but is not limited thereto. The concentration of the wearer 101 may be included in metadata of each piece of content, but is not limited thereto in one or more other exemplary embodiments. For example, the concentration of the wearer 101 regarding each piece of content may be managed by a content manager.

The content manager may be an application for managing information regarding each piece of content that may be reproduced by the wearable device 100, but is not limited thereto in one or more other exemplary embodiments. The information regarding each piece of content may include, for example, capacity of content, a content provider, a concentration of a user regarding the content, etc., but is not limited thereto. For example, when the content is a movie, the information regarding the content may further include information regarding an actor, a shooting location, props, genre, etc.

The concentration of the wearer 101 may be expressed as level 1, level 2, level 3, and level 4. If the level 1 is lower than the level 4 in terms of the concentration of the wearer 101, the game of FIG. 18 may be set as the level 4, the movie may be set as the level 3, the e-book may be set as the level 2, and the music may be set as the level 1.

The reference information may be set by further subdividing a type of the same content. For example, referring to the table of FIG. 18, the reference information of the movie is set as 2 hours irrespective of genre of the movie. However, the reference information may be differently set according to the genre of the movie. For example, the reference information may be differently set according to a horror movie, a romantic movie, and a comedy movie. In this case, the reference information regarding the horror movie may be set as 2 hours, the reference information regarding the romantic movie may be set as 3 hours, and the reference information of the comedy movie may be set as 4 hours.

The reference information may be differently set based on an application installed in the wearable device 100. For example, the reference information may be set by units such as a video player application, an album application, a camera application, a digital multimedia broadcasting (DMB) application, a map application, a search application, an application store application, a conference call application, a news and weather application, a schedule application, etc., that are installed in the wearable device 100.

The flowchart of FIG. 10 may be modified such that an operation of detecting content type information may be inserted between operations S1002 and S1003 and reference information adjusted according to the content type and obtained information may be compared in operation S1003.

Figure 19:
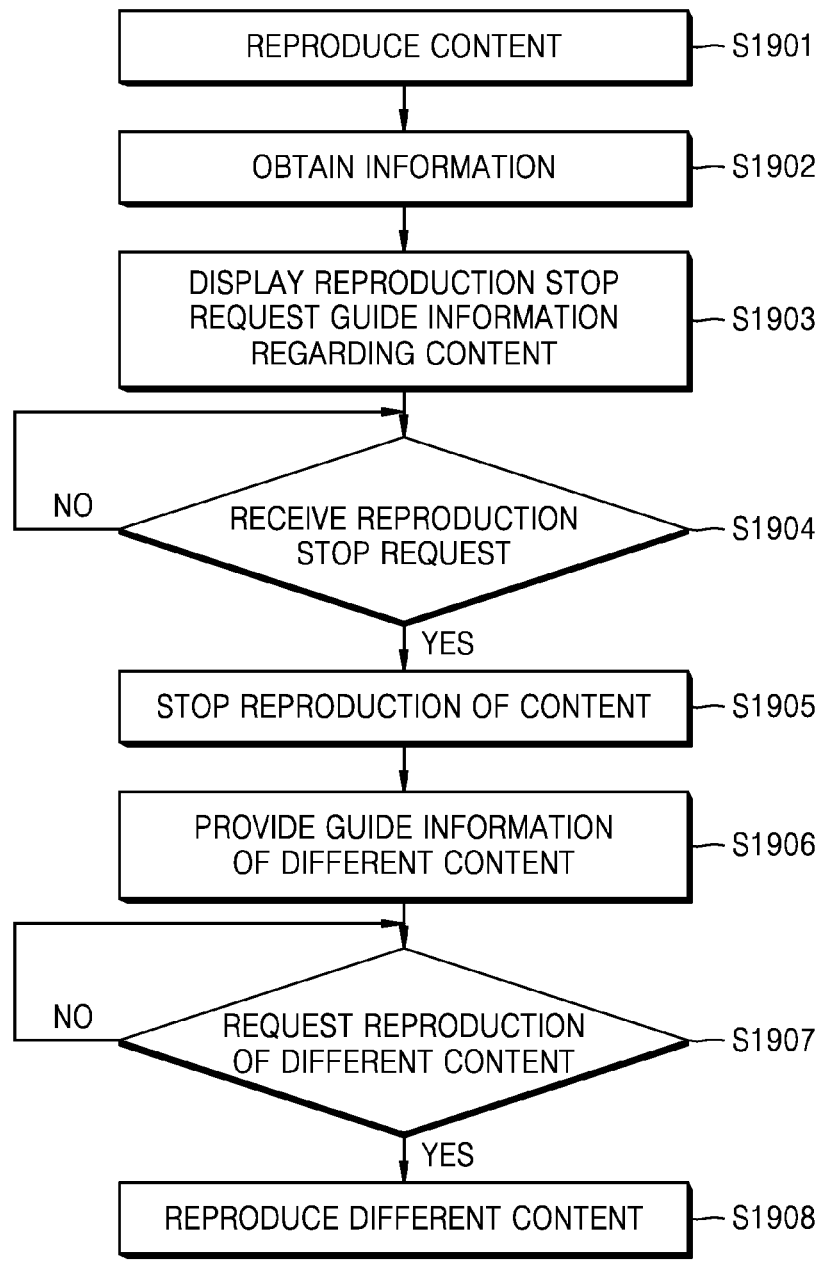
FIG. 19 is a flowchart for explaining a method of operating a wearable device according to another exemplary embodiment.

FIG. 19 is a flowchart for explaining a method of operating the wearable device 100 according to another exemplary embodiment. The method of FIG. 19 includes an operation of reproducing different content. The different content is content for providing an effect of relieving eye fatigue of the wearer 101, protecting eyesight, providing healing, etc., as content (for example, game content, movie content, etc.) reproduced by the wearable device 100 is viewed.

Operations of the wearable device 100 in operations S1901 through S1905 of FIG. 19 may be similar to operations of the wearable device 100 in operations S601 through S605 of FIG. 6, and thus redundant descriptions thereof are omitted below.

After the wearable device 100 stops reproducing content in operation S1905, the wearable device 100 provides guide information regarding the different content to the wearer 101 in operation S1906. The guide information regarding the different content is guide information for confirming, from the wearer 101, whether to reproduce the different content. For example, the guide information may include information for selecting whether to reproduce the content for providing the above-described effect to the wearer 101, but is not limited thereto in one or more other exemplary embodiments.

For example, the wearable device 100 may display guide information as shown in FIGS. 20 through 23 on the display 212.

Figure 20:
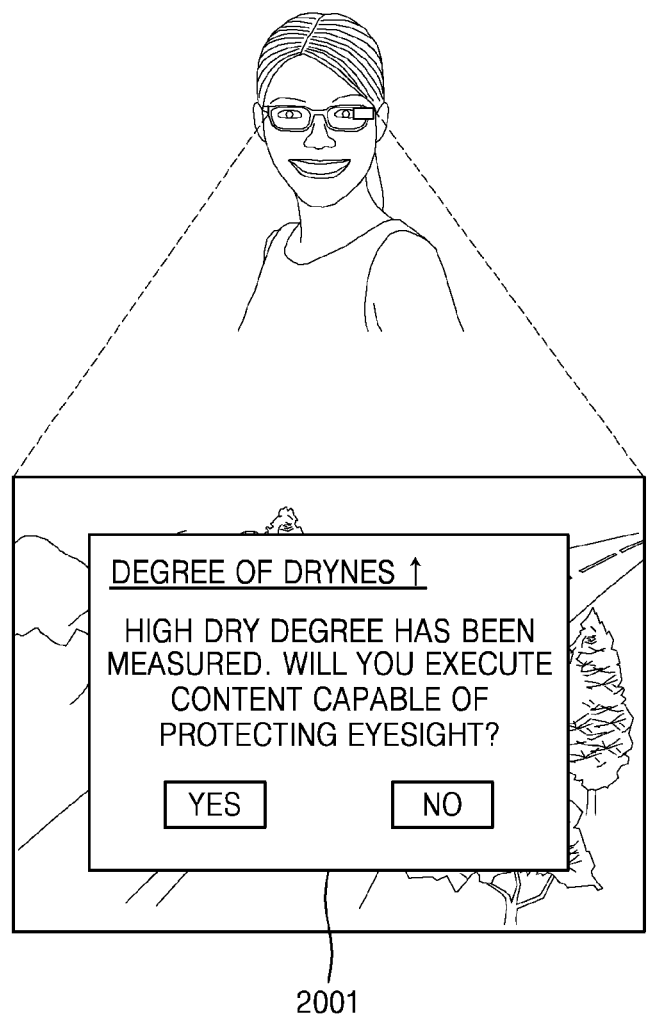
FIGS. 20 through 23 are diagrams of examples of displaying guide information according to an exemplary embodiment.

FIG. 20 is a diagram of an example of displaying, by the wearable device 100, reproduction stop request guide information 2001 including guide information informing that a degree of dryness of eyes is high, according to an exemplary embodiment. The reproduction stop request guide information 2001 may include text (for example, a degree of dryness) relating to the degree of dryness of eyes, a symbol (for example, an arrow) indicating that the degree of dryness of eyes is high, and a reproduction stop request guide message (for example, the degree of dryness is measured to be higher than usual. Please reproduce content for protecting your eyesight), but is not limited thereto in one or more other exemplary embodiments.

For example, the wearable device 100 may display a high level or a low level of the degree of dryness of eyes according to a color of the text (for example, the degree of dryness) instead of the symbol. For example, when the degree of dryness of eyes is high, the wearable device 100 may display the text in a red color. The reproduction stop request guide information 2001 may include a reproduction stop request guide message and/or commands in the form of a query, like the reproduction stop request guide information 702 of FIG. 7.

Figure 21:
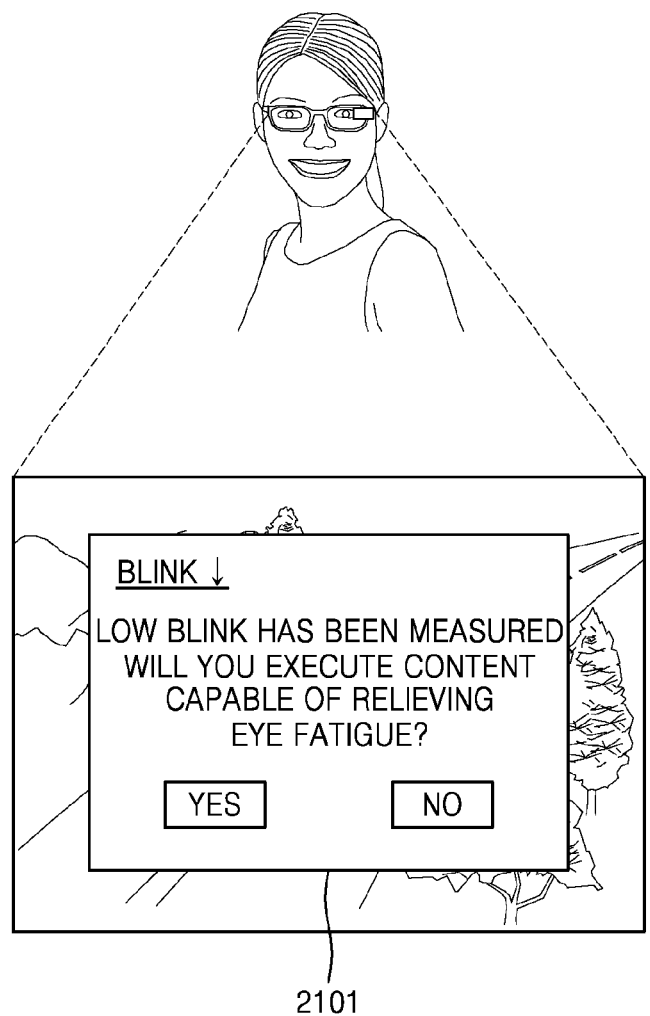

FIG. 21 is a diagram of an example of displaying, by the wearable device 100, reproduction stop request guide information 2101 including guide information based on an eye blink, according to an exemplary embodiment. The reproduction stop request guide information 2101 may include text (for example, a blink) relating to the eye blink, a symbol (for example, an arrow) indicating that the eye blink is low, and a reproduction stop request guide message (for example, the eye blink is measured to be lower than usual. Please reproduce content for relieving your eye fatigue), but is not limited thereto in one or more other exemplary embodiments.

For example, the wearable device 100 may display high levels and low levels of the eye blink according to a color of the text (for example, the blink) instead of the symbol. In this case, when the eye blink is low, the wearable device 100 may display the text in the red color. The wearable device 100 may display the reproduction stop request guide information 2101 including a reproduction stop request guide message and/or commands in the form of a query, like the reproduction stop request guide information 702 of FIG. 7.

Figure 22:
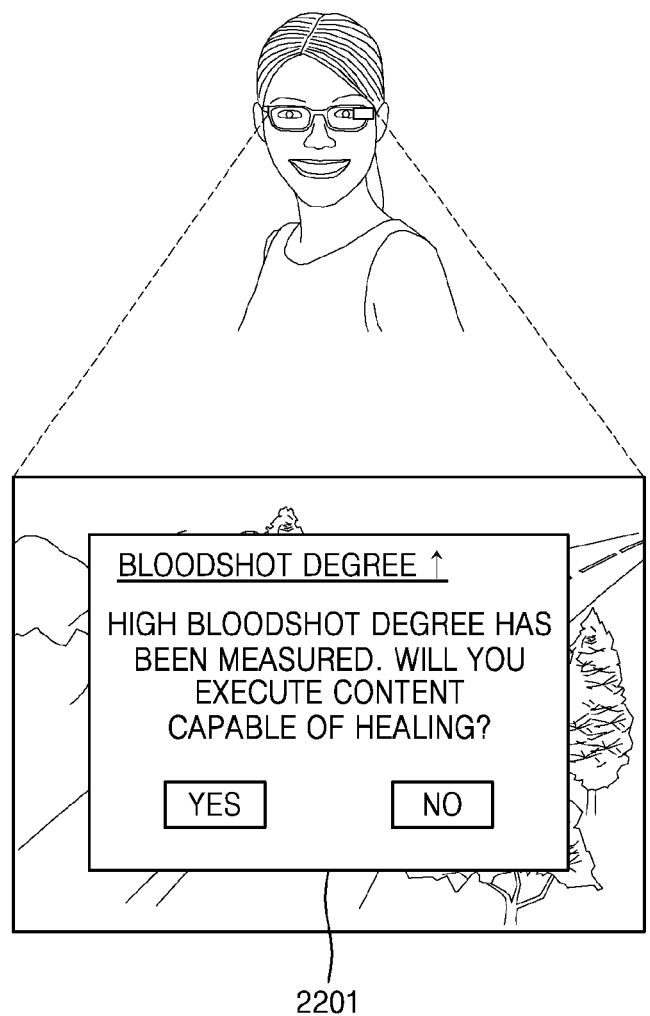

FIG. 22 is a diagram of an example of displaying, by the wearable device 100, reproduction stop request guide information 2201 including guide information based on an eye bloodshot degree, according to an exemplary embodiment. The reproduction stop request guide information 2201 may include text (for example, a bloodshot degree) relating to the eye bloodshot degree, a symbol (for example, an arrow) indicating that the eye bloodshot degree is high, and a reproduction stop request guide message (for example, the eye bloodshot degree is measured to be higher than usual. Please reproduce content for relieving your eye fatigue), but is not limited thereto in one or more other exemplary embodiments.

For example, the wearable device 100 may display high levels and low levels of the eye bloodshot degree according to a color of the text (for example, the bloodshot degree) instead of the symbol. In this case, when the eye bloodshot degree is high, the wearable device 100 may display the text in the red color. The wearable device 100 may display the reproduction stop request guide information 2201 including a reproduction stop request guide message and/or commands in the form of a query, like the reproduction stop request guide information 702 of FIG. 7.

Figure 23:
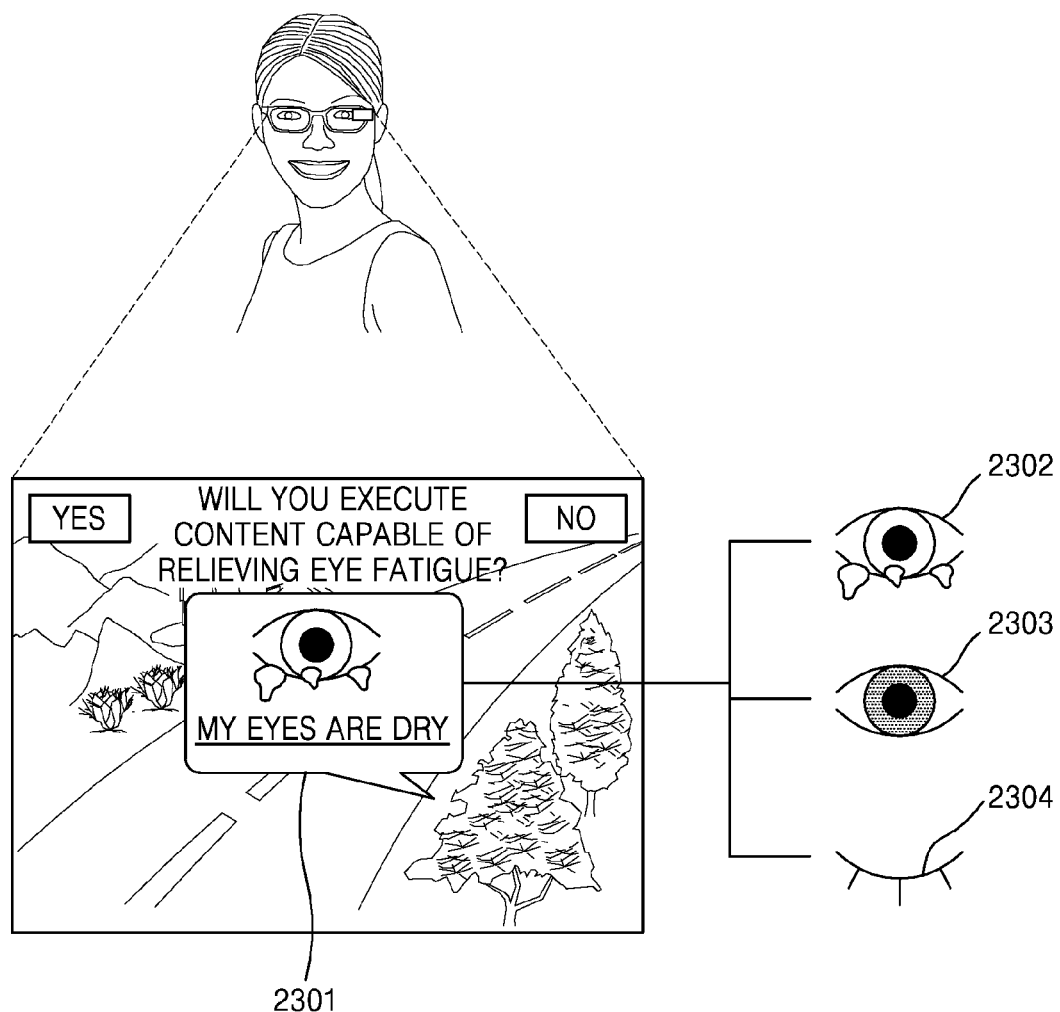

FIG. 23 is a diagram of an example of displaying, by the wearable device 100, reproduction stop request guide information 2301 including guide information in the form of an icon, according to an exemplary embodiment. An eye icon 2302 is an icon indicating a degree of dryness of eyes. An eye icon 2303 is an icon indicating an eye bloodshot degree. An eye icon 2304 is an icon indicating an eye blink.

The wearable device 100 may display the eye icons 2302, 2303, and 2304 of FIG. 23 instead of the reproduction stop request guide information 2001, 2101, and 2201 of FIGS. 20 through 23. The wearable device 100 may display the reproduction stop request guide information 2001, 2101, and 2201 of FIGS. 20 through 23 as reproduction stop request guide information including text (for example, a high eye bloodshot degree, a low eye blink number, and a high eye degree of dryness), but is not limited thereto in one or more other exemplary embodiments.

In operation S1907, if a reproduction request for the different content is received based on the reproduction stop request guide information, the wearable device 100 reproduces the different content (operation S1908).

The different content may include information for influencing health of the wearer 101. For example, the different content may include at least one of information such as food information for relieving fatigue of the wearer 101, a recipe of the food information, and a food purchase place (e.g., a restaurant, a grocery store, etc.), but is not limited thereto. For example, the different content may include link information linking an Internet website that provides information relating to the food information. When the link information is provided, if a selection command for the provided link information is input, the information relating to the food information provided from the linked Internet website may be displayed on the display 212.

The different content may include content as shown in FIGS. 24 through 29. Examples of FIGS. 24, 26, 27, 28, and 29 are with respect to the wearable device 100 configured as shown in FIG. 5A or 5B, but are not limited thereto.

When the wearable device 100 is configured as shown in FIG. 2A, 2B, 2D, 2E, 2F, 3, or 4, the different content may be reproduced through a region on which the game image 102 is displayed. When the wearable device 100 is configured as shown in FIG. 2A, 2B, 2D, 2E, 2F, 3, or 4, the wearer 101 may simultaneously view a real world that may be viewed through the wearable device 100 and the different content.

When the wearable device 100 is configured as shown in FIG. 2A, 2B, 2D, 2E, 2F, 3, or 4, the different content may be reproduced by another device (for example, a TV, a mobile device, a PC, etc.) whose display is positioned in the real world that may be viewed through the wearable device 100.

When the different content is reproduced by the other device, if a reproduction request for the different content is received, the wearable device 100 may transmit a reproduction request signal regarding the different content to the other device. The wearable device 100 and the other device 100 may be connected based on near field wireless communication, wireless communication, or wired communication. The wearable device 100 may control a reproduction operation for the different content by the other device according to a user input through the user input unit 207. For example, the wearable device 100 may control a reproduction stop for the different content by the other device.

Figure 24:
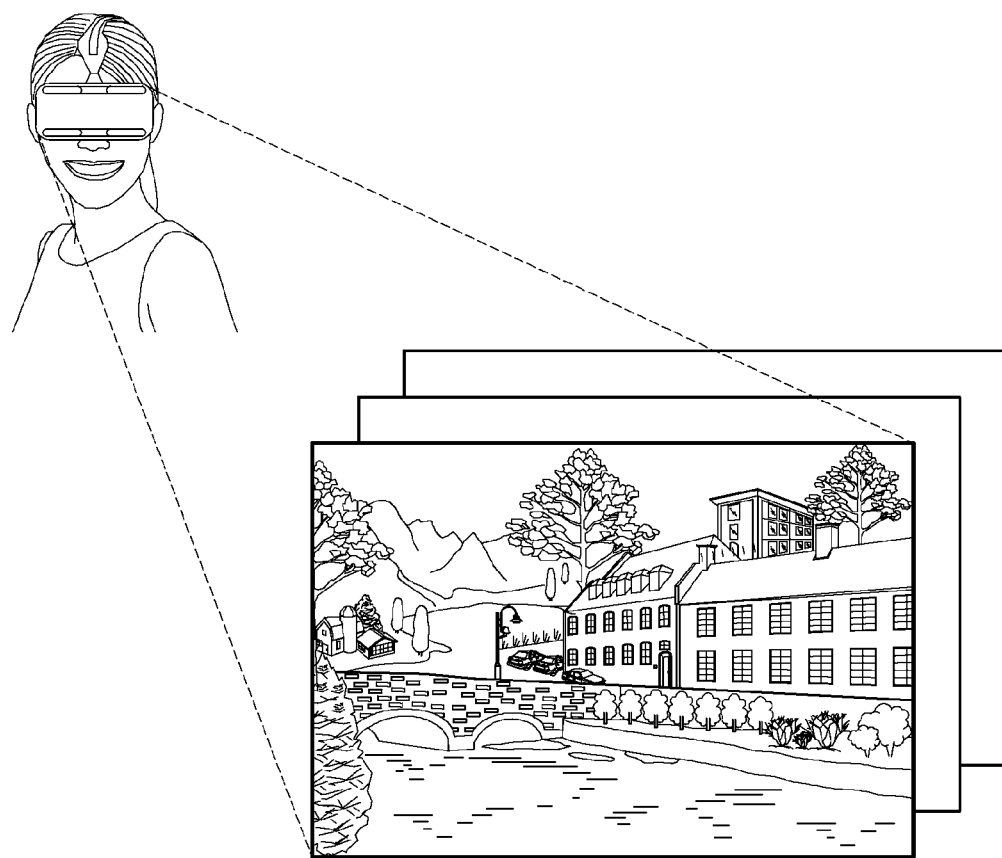
FIGS. 24 through 29 are diagrams of examples of different contents according to one or more exemplary embodiments.

FIG. 24 is a diagram of an example in which a 2D image is reproduced as another piece of content, according to an exemplary embodiment. The 2D image may include an image including a natural phenomenon such as a tree, a mountain, a river, a field, etc., and a color that is comfortable to a user's eyes and an image including a pattern that is comfortable to the user's eyes, but is not limited thereto in one or more other exemplary embodiments.

Figure 25:

FIG. 25 is a diagram of an example in which sound is reproduced as another piece of content, according to an exemplary embodiment. In FIG. 25, the wearable device 100 is configured as shown in FIG. 2A, 2B, 2D, 2E, 2F, 3 or 4, but is not limited thereto. For example, the wearable device 100 of FIG. 25 may be configured as shown in FIG. 5A or 5B. The reproduced sound includes sound for relieving fatigue of the wearer 101. For example, the sound may include a sound of nature such as the sound of a stream, a birdcall, music with a slow tempo, and sound for relieving the fatigue of the wearer 101 such as ballad or classics. An intensity of the output sound and output time may be set by the wearer 101 or may be output based on previously set intensity of sound and output time, although it is understood that one or more other exemplary embodiments are not limited thereto.

Figure 26:
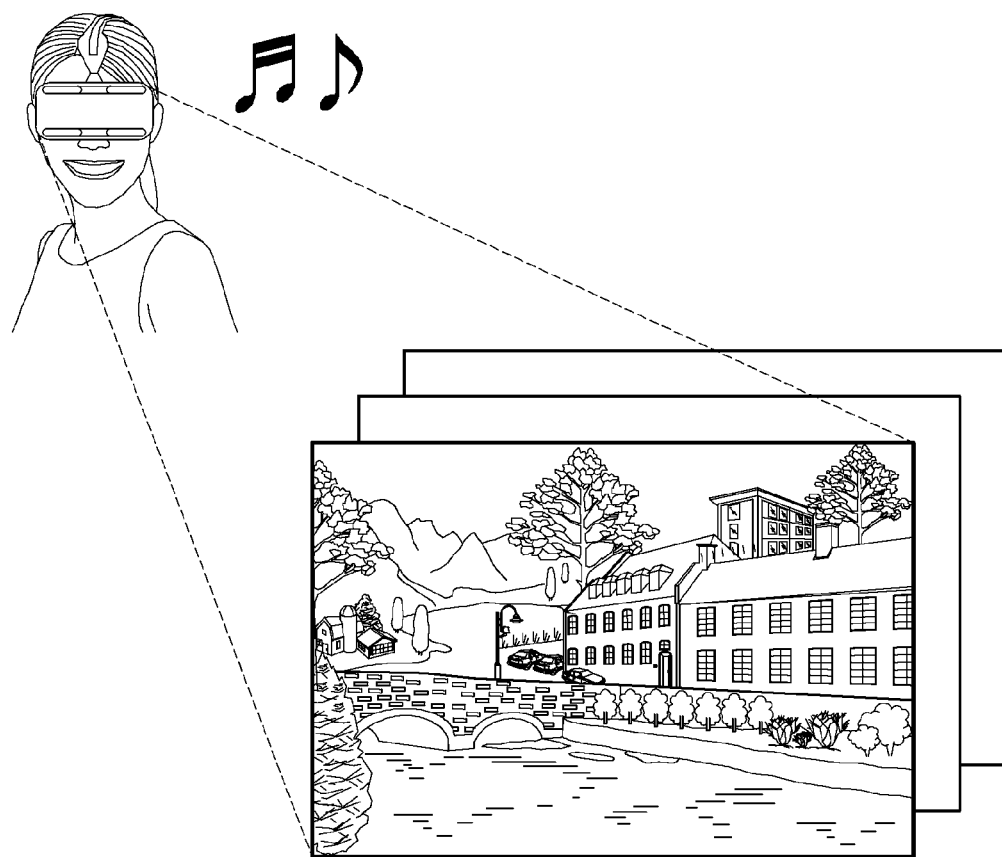

FIG. 26 is a diagram of an example in which content that is a mixture of a 2D image and sound are mixed is reproduced as different content, according to an exemplary embodiment. The 2D image may be the same as the image described above with reference to FIG. 24, and the sound may be the sound described above with reference to FIG. 25, but are not limited thereto in one or more other exemplary embodiments.

Figure 27:
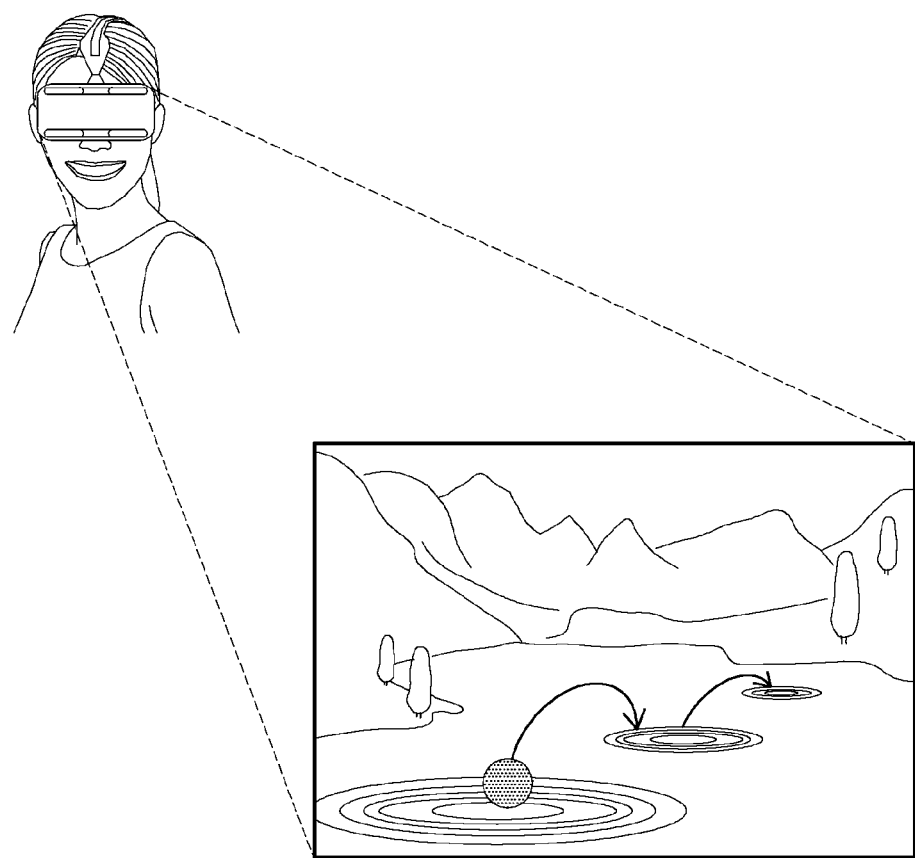

FIG. 27 is a diagram of an example in which a 3D image is reproduced as different content, according to an exemplary embodiment. The 3D image may include a duck and drake image used to gaze a long distance and a short distance so as to relax muscles of eyes of the wearer 101. The image for gazing the long distance and the short distance may be repeatedly reproduced. A repeatedly reproduced number may be set as, for example, 64 times, but is not limited thereto in one or more other exemplary embodiments. The image for gazing the long distance and the short distance may be repeatedly reproduced, thereby helping or adjusting depth perception of the eyes of the wearer 101.

Figure 28:
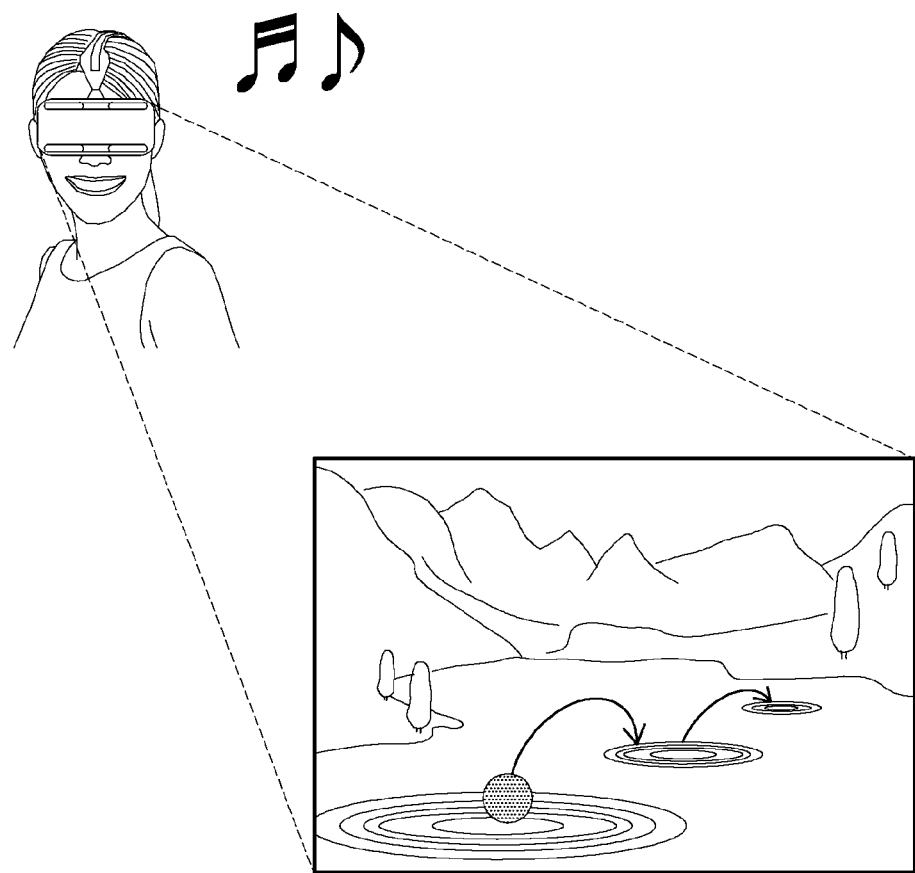

FIG. 28 is a diagram of an example in which content that is a mixture of a 3D image and sound is reproduced as different content, according to an exemplary embodiment. The 3D image may be the same as the 3D image described above with reference to FIG. 27, and the sound may be the same as the sound described above with reference to FIG. 25, but are not limited thereto in one or more other exemplary embodiments.

Figure 29:
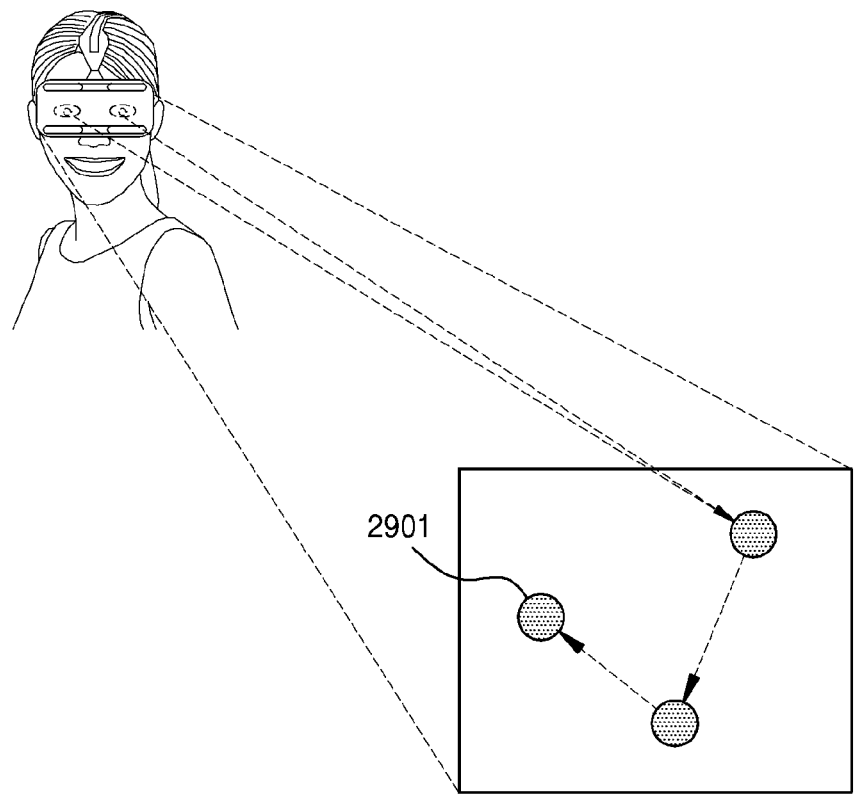

FIG. 29 is a diagram of an example in which an image having a pupil stretching function is reproduced as different content, according to an exemplary embodiment. The pupil stretching function is a mode in which a pupil motion is guided to relax stiffened muscles of eyes. The pupil motion may include at least one of a rectilinear motion of pupils, a diagonal motion, a rotational motion, a random motion, and a distance motion, but is not limited thereto.

The pupil stretching function may move and display an object 2901 as shown in FIG. 29. The wearer 101 may perform the pupil motion by moving a focus along the moved object 2901. The object 2901 may be displayed as a circular shape as shown in FIG. 29, but is not limited thereto in one or more other exemplary embodiments. For example, the object 2901 may be configured as a rectangular shape, a triangular shape, or a specific symbol shape. By way of example, the object 2901 may be moved to perform the pupil motion in a direction of 12 o'clock→3 o'clock→6 o'clock→9 o'clock and then in a reverse direction. The object 2901 may be moved to repeat the pupil motion a plurality of times.

The object 2901 may be moved on a rectilinear line up and down or left and right to guide pupils of the wearer 101 to move in a rectilinear direction (the rectilinear motion of the pupils). The object 2901 may be moved in a diagonal direction to guide the pupils of the wearer 101 to move in the diagonal direction (the diagonal motion of the pupils). The object 2901 may be moved to draw a circle so as to guide the pupils of the wearer 101 to perform the rotational motion (the rotational motion of the pupils).

The object 2901 may be moved in random to guide the random motion of the pupils of the wearer 101. For example, the wearable device 100 may display a drawing image previously set on the display 212 and move the object 2901 along an outline of the drawing image to guide the random motion of the pupils of the wearer 101.

The drawing image displayed on the display 212, a moving speed of the object 2901, a size of the object 2901, a shape, a color, etc., may be set in various ways according to an input of the wearer 101. The wearable device 100 may recognize the wearer 101 to display the drawing image and the object 2901 according to the drawing image set for the recognized wearer 101, the moving speed of the object 2901, the size of the object 2901, the shape, the color, etc.

The guide information provided in operation S1906 may be changed as information for guiding or determining whether to provide a function of relieving the fatigue of the wearer 101. The function of relieving the fatigue of the wearer 101 may include one of a function of reproducing different content of FIGS. 24 through 29, an eye patch function or a sleep function of FIG. 30, or a heating function of FIG. 31. However, it is understood that the function of relieving the fatigue of the wearer 101 is not limited thereto in one or more other exemplary embodiments.

For example, the function of relieving the fatigue of the wearer 101 may include a function of inducing the wearer 101 to view a real world in a far distance through the wearable device 101 or to take off the wearable device 101. For example, the wearable device 100 may reproduce an induction or instruction message through a region in which the game image 102 is reproduced to induce the wearer 101 to view the real world in the far distance through the wearable device 101 or to take off the wearable device 101.

When the game image 102 is reproduced, the induction message may be reproduced in such a manner that the induction message may be continuously displayed. According to another exemplary embodiment, the induction message may be intermittently reproduced, for example, as shown in FIG. 8B or 8C.

Figure 30:
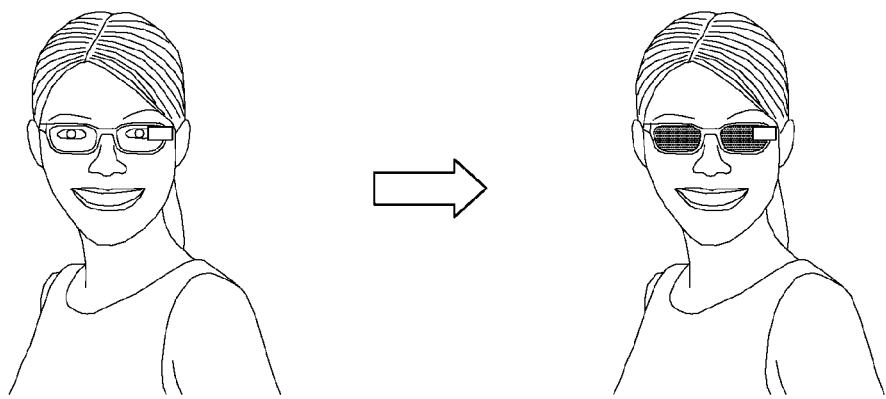
FIG. 30 is a diagram for explaining an eye patch function or a sleep function that may be provided according to one or more exemplary embodiments.

FIG. 30 is a diagram of an example in which an eye patch function or a sleep function is provided as a function of relieving fatigue of the wearer 101, according to an exemplary embodiment. The lens 204 may be configured as a material such as smart glass to perform the eye patch function. For example, if power is applied to the lens 204, the lens 204 may be configured as bonding glass containing a special film in which liquid crystals are sealed between glass such that a transparent status may be changed to an opaque status, but is not limited thereto in one or more other exemplary embodiments.

The eye patch function may be implemented by using an electrochromic method. The electrochromic method injects a special electrochromic material between glass substrates, applies voltages, and paints the special electrochromic material.

The sleep function is a function of setting an operation or mode of the wearable device 100 to a sleep mode. The sleep mode corresponds to a status in which the wearable device 100 is not powered off or the operation of the wearable device 100 is stopped. The sleep mode may be referred to as a power saving mode of the wearable device 100.

The wearable device 100 providing the eye patch function or the sleep function of FIG. 30 may be configured as shown in FIG. 2A, 2B, 2D, 2E, 2F, 3, 4, 5A, or 5B, but is not limited thereto.

Figure 31:
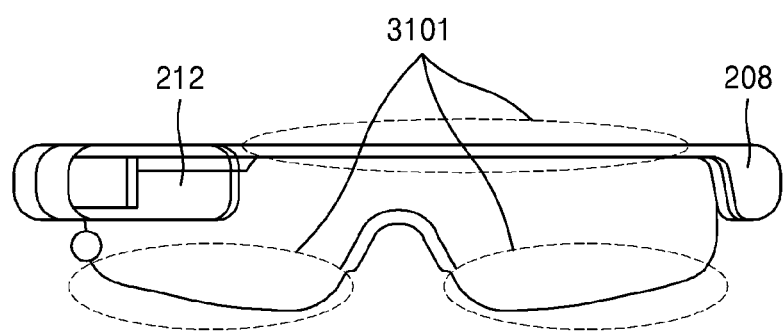
FIG. 31 is a diagram of an example of a wearable device that may provide a heating function that may be provided according to one or more exemplary embodiments.

FIG. 31 is a diagram of an example of the wearable device 100 that may provide a heating function as a function of relieving fatigue of the wearer 101. The heating function indicates a mode in which a heating unit 3101, mounted in an inner side surface of the lens frame 201 of the wearable device 100 and an inner side surface of the lens 204 or embedded in inner sides of the lens frame 201 and the lens 204, generates heat to massage around the eyes.

The heating unit 3101 may be configured to emit far-infrared radiation as a function of relieving the fatigue of the wearer 101. The heating unit 3101 may be installed or embedded in a location in which blood dots around the eyes of the wearer 101 may be massaged in the inner sides of the lens frame 201 and the lens 204, but is not limited thereto in one or more other exemplary embodiments. The lens frame 201 may be configured as shown in the frame 501 of FIG. 5A or the frame 531 of FIG. 5B to mount the heating unit 3101, but is not limited thereto in one or more other exemplary embodiments.

A structure of the wearable device 100 providing the heating function is not limited as shown in FIG. 31. For example, the heating function as shown in FIG. 31 may be applied to the wearable device 100 of FIG. 5A or 5B described above.

Figure 32:
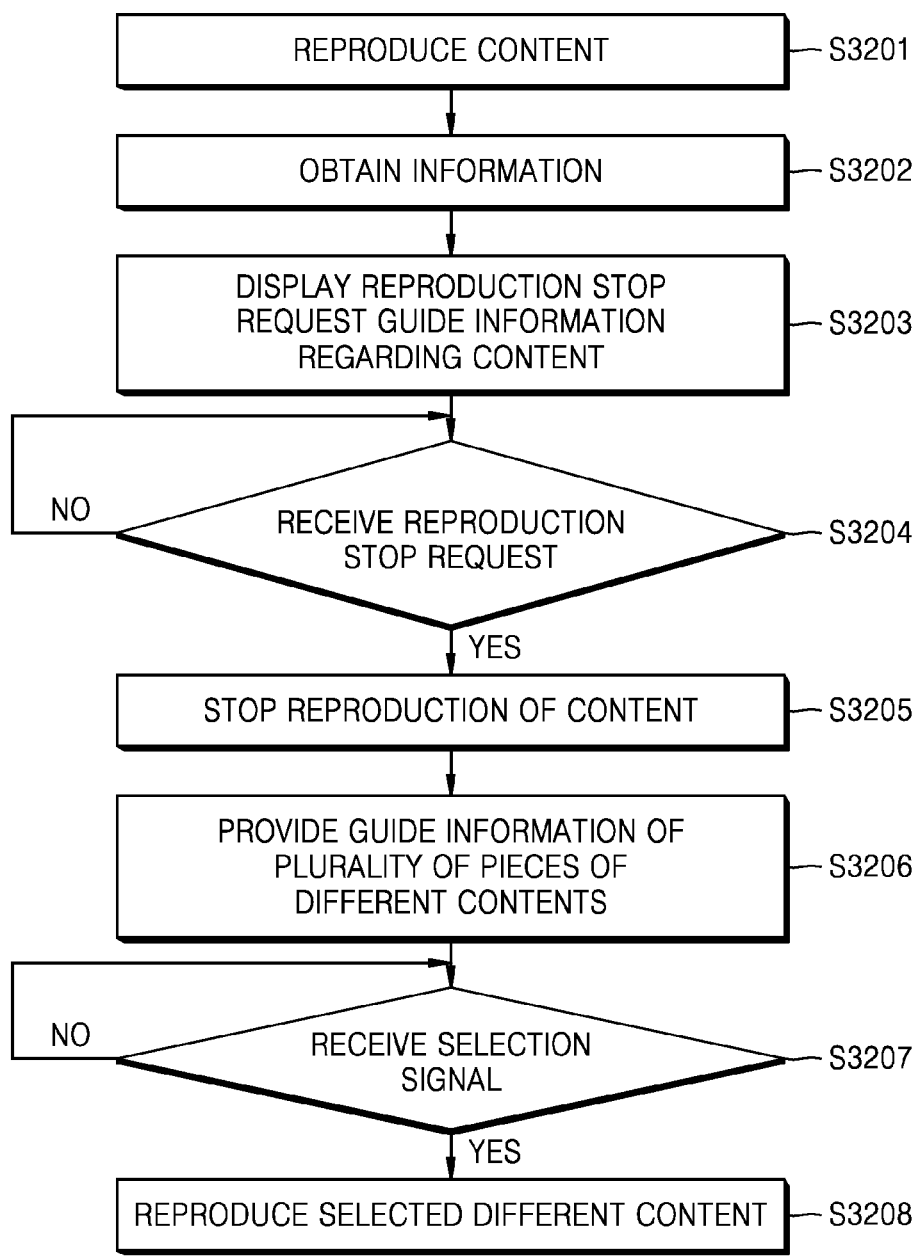
FIG. 32 is a flowchart for explaining a method of operating a wearable device according to another exemplary embodiment.

FIG. 32 is a flowchart for explaining a method of operating the wearable device 100 according to another exemplary embodiment. FIG. 32 is an example of providing guide information to a plurality of pieces of different contents capable of relieving fatigue of the wearer 101.

Operations of the wearable device 100 in operations S3201 through S3205 of FIG. 32 are similar to those of the wearable device 100 in operations S1901 through S1905 of FIG. 19 described above.

Figure 33:
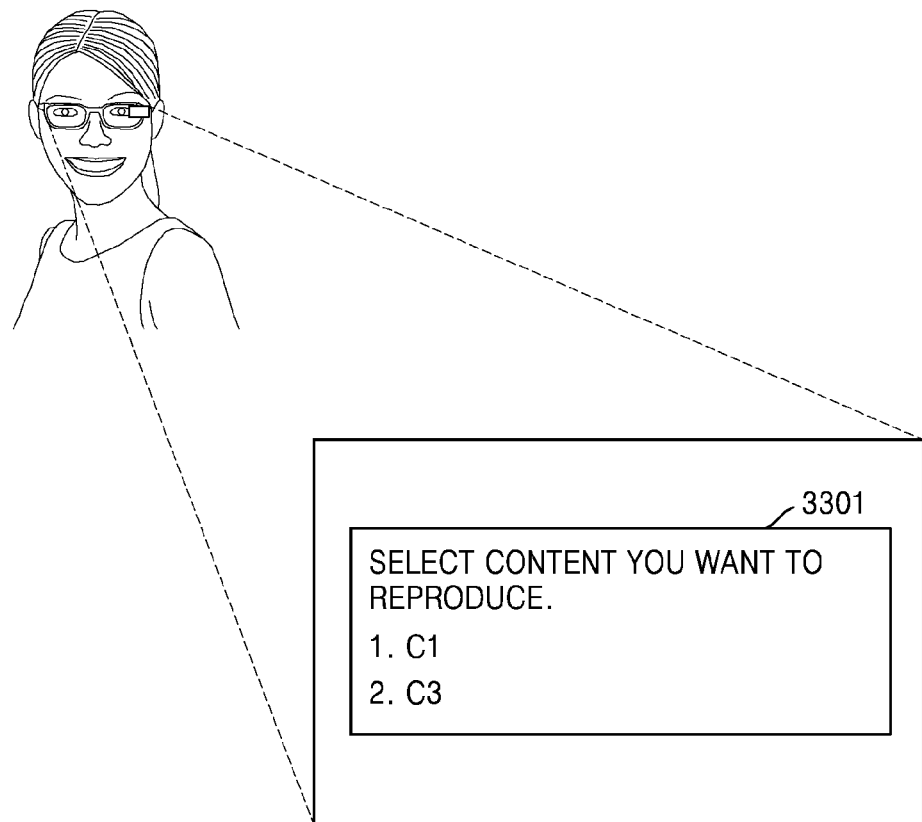
FIG. 33 is a diagram of an example of displaying information regarding a plurality of pieces of selectable contents in the form of a list, according to an exemplary embodiment.

In operation S3206, the wearable device 100 provides the guide information to the plurality of pieces of different contents capable of relieving fatigue of the wearer 101. The wearable device may display the guide information to the plurality of pieces of different contents on the display 212 as shown in FIG. 33. The screen 3301 of FIG. 33 is an example of displaying information regarding a plurality of pieces of contents in the form of a list. Referring to the screen 3301 of FIG. 33, the plurality of pieces of contents are C1 and C3. The plurality of pieces of contents may include at least one, for example, content from among those described above with reference to FIGS. 24 through 29, but is not limited thereto in one or more other exemplary embodiments.

Figure 34:
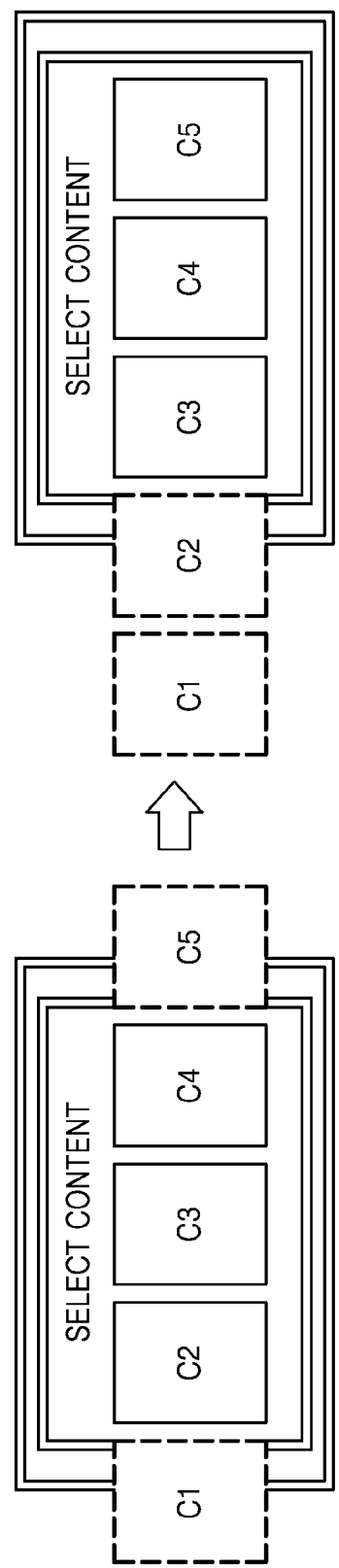
FIG. 34 is a diagram of an example of another screen that displays information regarding a plurality of pieces of selectable different contents, according to an exemplary embodiment.

The wearable device 100 may display the information regarding the plurality of pieces of contents on the display 212 as shown in FIG. 34. FIG. 34 is a diagram of another example of displaying information regarding a plurality of pieces of different contents, according to an exemplary embodiment. Referring to FIG. 34, the wearable device 100 displays the information regarding the plurality of pieces of different contents on a single screen and moves and displays information regarding selectable content based on an input of the wearer 101.

In FIG. 34, an input of the wearer 101 may be an input based on the user input unit 207 or an input based on eyes like an eye blink of the wearer 101 or a pupil motion, but is not limited thereto in one or more other exemplary embodiments. For example, the input of the wearer 101 may be a voice signal of the wearer 101 received through the microphone 214 or a gesture of the wearer 101 recognized by the camera 206 or other sensors (e.g., gyroscope).

The input of the wearer 101 may include an input for moving the information regarding the plurality of pieces of different contents displayed to search for content and an input of selecting different content. When different content is displayed as shown in FIG. 34, the wearable device 100 may move the plurality of pieces of different contents displayed according to the input of the wearer 101 in left and right directions or may move the plurality of pieces of different contents in up and down directions.

The input of the wearer 101 based on the eyes may use an eye image obtained by the bio information obtaining camera 208, but is not limited thereto. The wearable device 100 may provide the information regarding the plurality of pieces of different contents in the form of at least one of an icon, a representative image indicating a description of different content, and text. For example, the wearable device 100 may provide the information regarding the plurality of pieces of different contents in the form of a combination of the icon and a name of different content.

In operation S3208, if a selection signal regarding different content is received in operation S3207, the wearable device 100 reproduces the selected different content.

In the flowchart of FIG. 32, the guide information regarding the plurality of pieces of different contents may be modified as guide information regarding a plurality of functions as in the flowchart of FIG. 19. The plurality of functions includes a function of relieving fatigue of the wearer 101. The plurality of functions may include at least two among, for example, the respective content reproducing functions of FIGS. 24 through 29 described above, the eye patch function or the sleep function of FIG. 30, and the heating function and the induction function of FIG. 31 described above.

Figure 35:
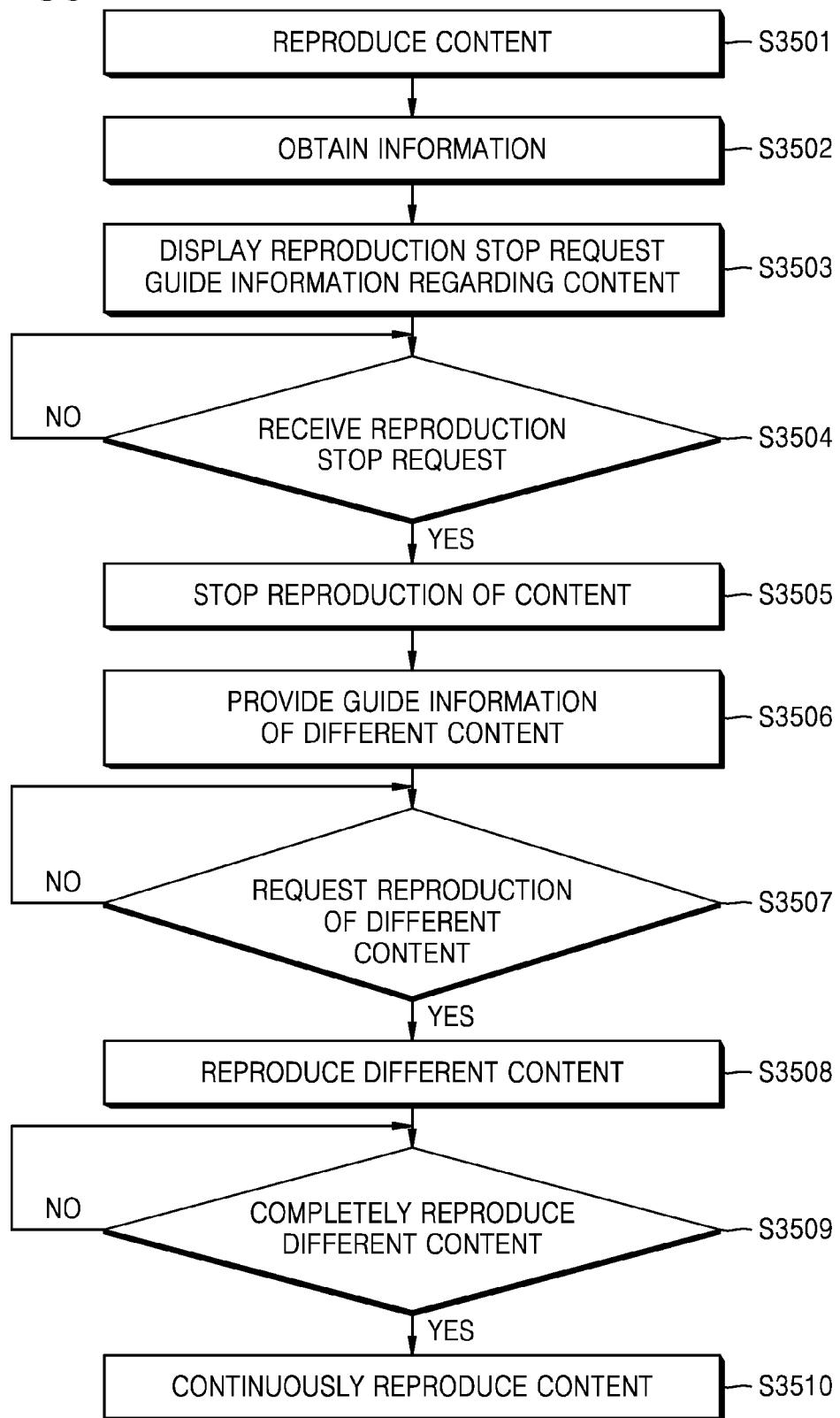
FIG. 35 is a flowchart for explaining a method of operating a wearable device according to another exemplary embodiment.

FIG. 35 is a flowchart of a method of operating the wearable device 100 further including an operation of continuously reproducing content whose reproduction was stopped in the operation shown in the flowchart of FIG. 19, according to an exemplary embodiment.

Operations of the wearable device 100 in operations S3501 through S3508 may be performed similarly to operations of the wearable device 100 in operations S1901 through S1908.

In operation S3509, if it is determined that different content has been completely reproduced, the wearable device 100 resumes continuous reproduction of content that was being reproduced before reproducing the different content (i.e. resumes reproduction of content for which reproduction was stopped at S3504).

A continuous reproduction of content may be a reproduction of the content from a point where the reproduction of the content is stopped or a point by a certain section previous to the point where the reproduction of the content is stopped, but is not limited thereto in one or more other exemplary embodiments. When the reproduced content is an image, the certain section may be set as several frames, but is not limited thereto in one or more other exemplary embodiments. For example, when the content is content restored from an image compressed as an intra (I) picture, a predict (P) picture, a bi-direction (B) picture, and the point where the reproduction of the content is stopped is not a point in which the I picture is reproduced, the certain section may be set such that the content may be reproduced from the I picture prior to the point where the reproduction of the content is stopped, but is not limited thereto in one or more other exemplary embodiments. A complete reproduction of different content corresponds to a complete execution of different content.

Figure 36:
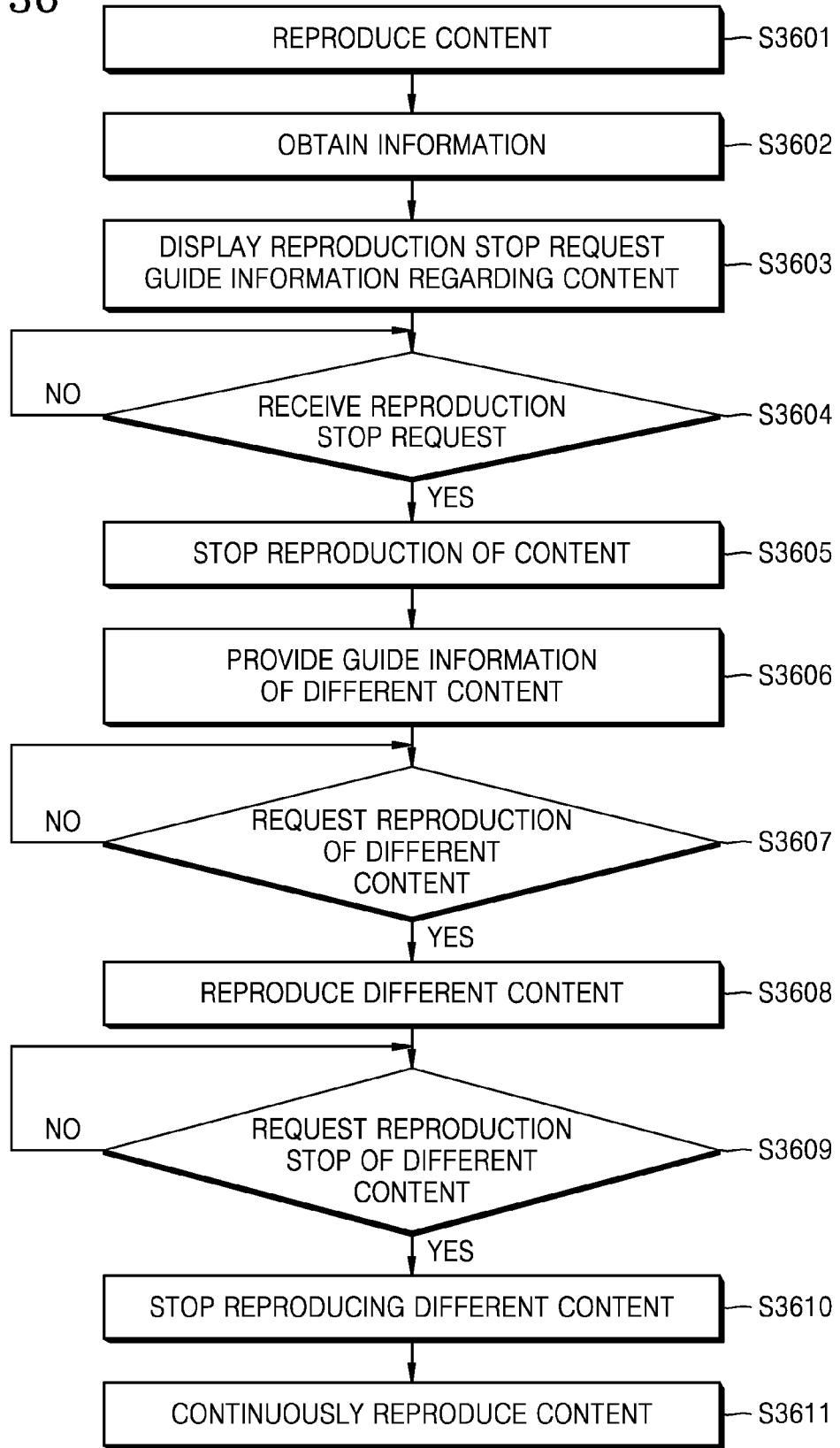
FIG. 36 is a flowchart for explaining a method of operating a wearable device according to another exemplary embodiment.

FIG. 36 is a flowchart of a method of operating the wearable device 100 further including an operation of stopping reproducing different content according to a reproduction stop request for different content during a reproduction of different content and continuously reproducing the content whose reproduction is stopped (at operation S3605) in the operation shown in the flowchart of FIG. 19, according to an exemplary embodiment.

Operations of the wearable device 100 in operations S3601 through S3608 and operation S3611 of FIG. 36 may be similar to operations of the wearable device 100 in operations S1901 through S1908 of FIG. 19.

In operation S3609, if the reproduction stop request for different content is received, the wearable device 100 stops reproducing different content in operation S3610 and resumes, in operation S3611, continuous reproduction of the content whose reproduction was previously stopped. A continuous reproduction of the content by the wearable device 100 may be performed in the same or similar manner as operation S3510 of FIG. 35.

The reproduction stop request for different content received in operation S3609 may include at least one of an input (for example, an eye blink, a pupil motion, etc.) based on eyes of the wearer 101, a voice signal of the wearer 101 received through the microphone 214, gesture information (for example, finger based gesture information) of the wearer 101 obtained by the camera 206, and an input based on the user input unit 207, but is not limited thereto in one or more other exemplary embodiments.

Figure 37:
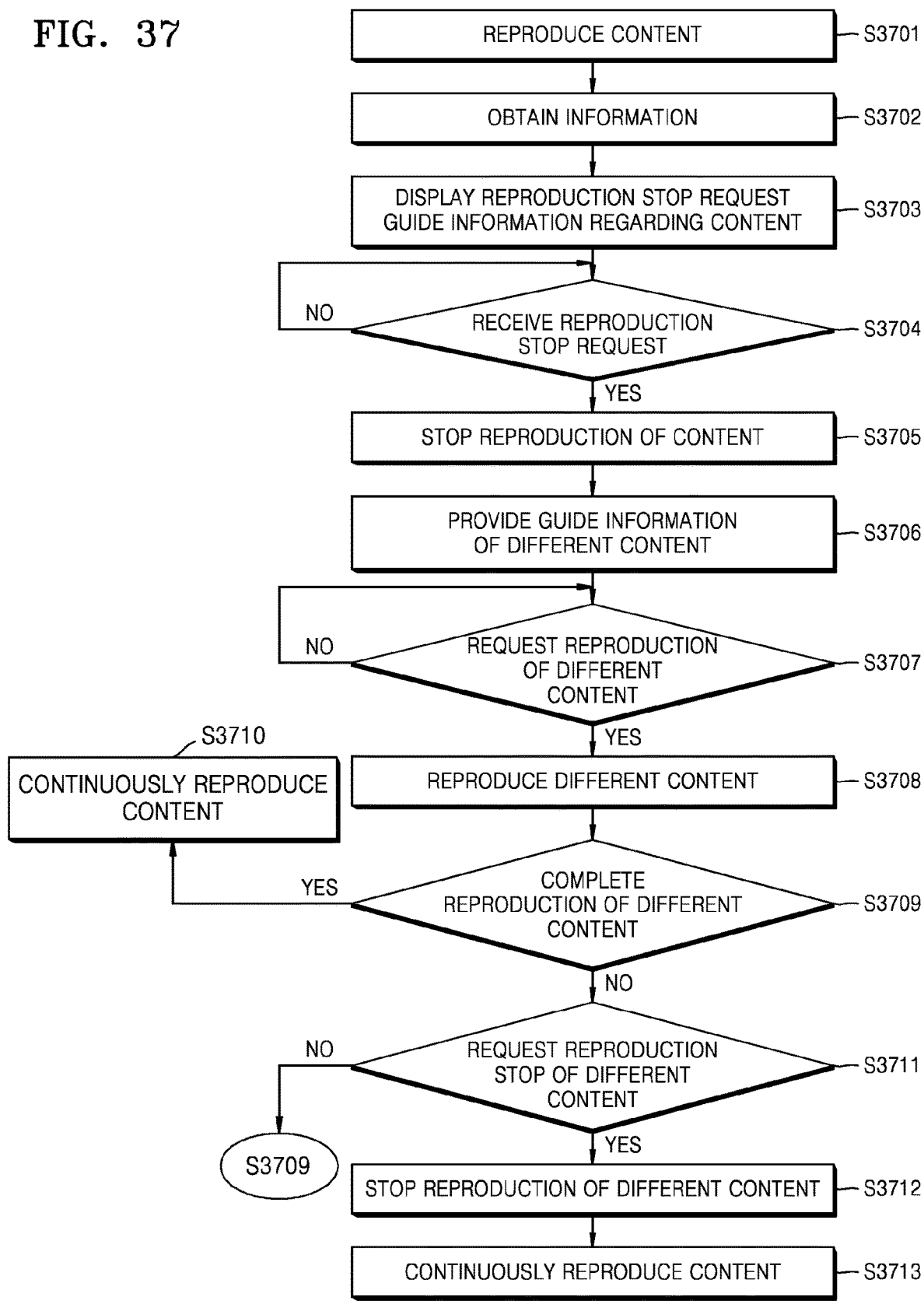
FIG. 37 is a flowchart for explaining a method of operating a wearable device according to another exemplary embodiment.

FIG. 37 is a flowchart of a method of operating the wearable device 100 further including an operation of continuously reproducing content whose reproduction is stopped after completely reproducing different content and an operation of stopping reproducing different content according to a reproduction stop request for different content and continuously reproducing the content whose reproduction is stopped in the operation shown in the flowchart of FIG. 19, according to an exemplary embodiment.

Operations of the wearable device 100 in operations S3701 through S3710 of FIG. 37 may be similar to operations of the wearable device 100 in operations S3501 through S3510 of FIG. 35.

Operations of the wearable device 100 in operations S3711 through S3713 of FIG. 37 may be similar to operations of the wearable device 100 in operations S3609 through S3611 of FIG. 36.

Figure 38:
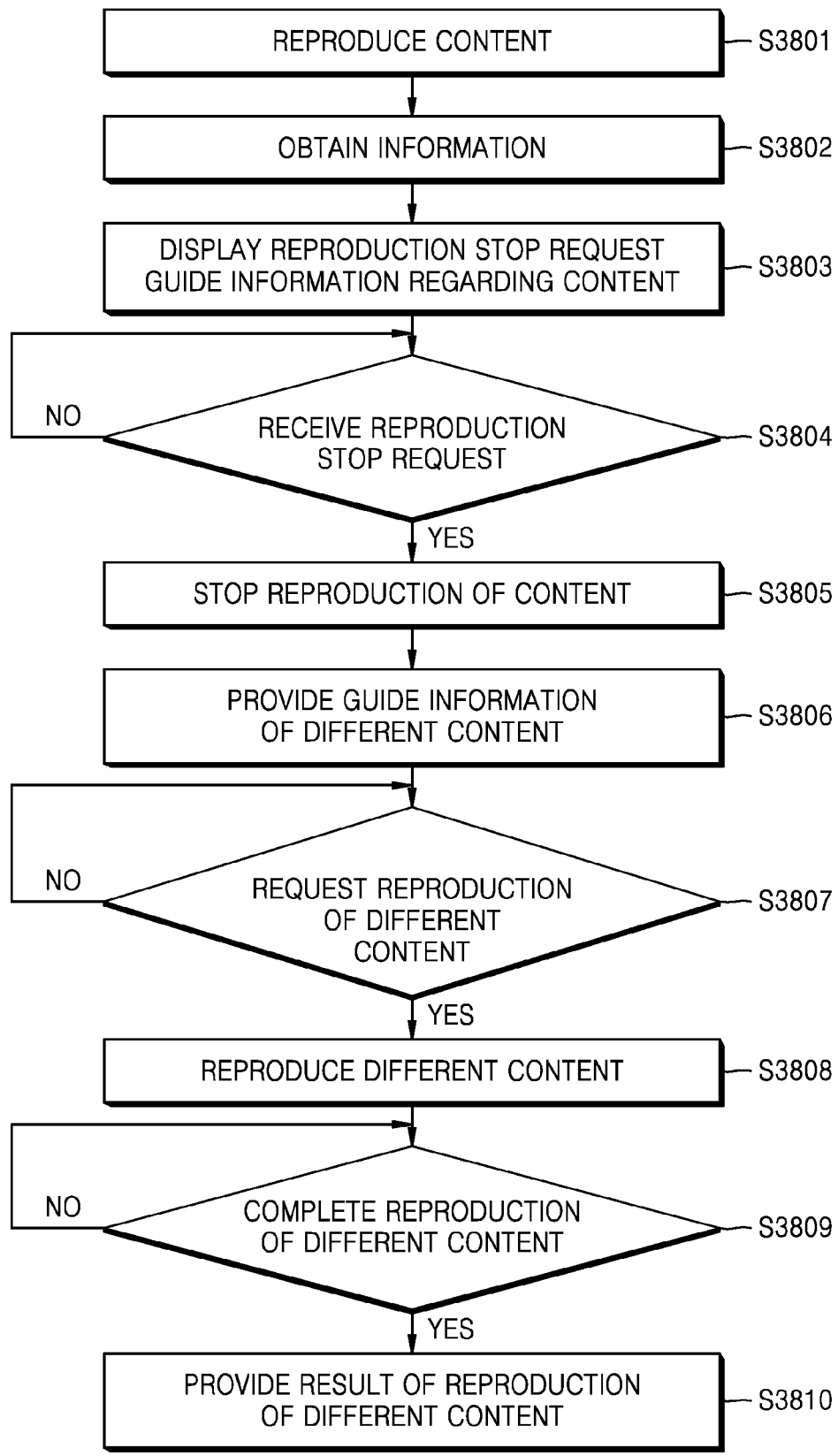
FIG. 38 is a flowchart for explaining a method of operating a wearable device according to another exemplary embodiment.

FIG. 38 is a flowchart of a method of operating the wearable device 100 further including an operation of providing a result of reproducing different content after completely reproducing different content in the operation shown in the flowchart of FIG. 19, according to an exemplary embodiment.

Operations of the wearable device 100 in operations S3801 through S3809 of FIG. 38 may be similar to operations of the wearable device 100 in operations S3501 through S3509 of FIG. 35.

In operation S3809, if it is determined that different content has been completely reproduced, the wearable device 100 provides the result of reproducing different content. The result of reproducing different content may be provided based on bio information of eyes of the wearer 101.

For example, the wearable device 100 detects, via the bio information obtaining camera 208, the bio information based on the eyes. A method of detecting the bio information based on the eyes may be performed as described above with reference to FIGS. 1C-1 and 1C-2. The wearable device 100 may compare the detected bio information based on the eyes and a reproduction stop request reference described above with reference to FIGS. 1C-1 and 1C-2, and provide a result of the comparison as a result of reproducing different content.

The result of reproducing different content may include information informing the wearer 101 of how much the fatigue of the wearer 101 is reduced when different content is provided. The wearable device 100 may provide the result of reproducing different content in the form of at least one of an image, text, audio, and an icon, but is not limited thereto in one or more other exemplary embodiments. For example, the wearable device 100 may provide an image that may be used to compare an eye image before different content is reproduced and an eye image after different content is reproduced as the result of reproducing different content.

Figure 39:
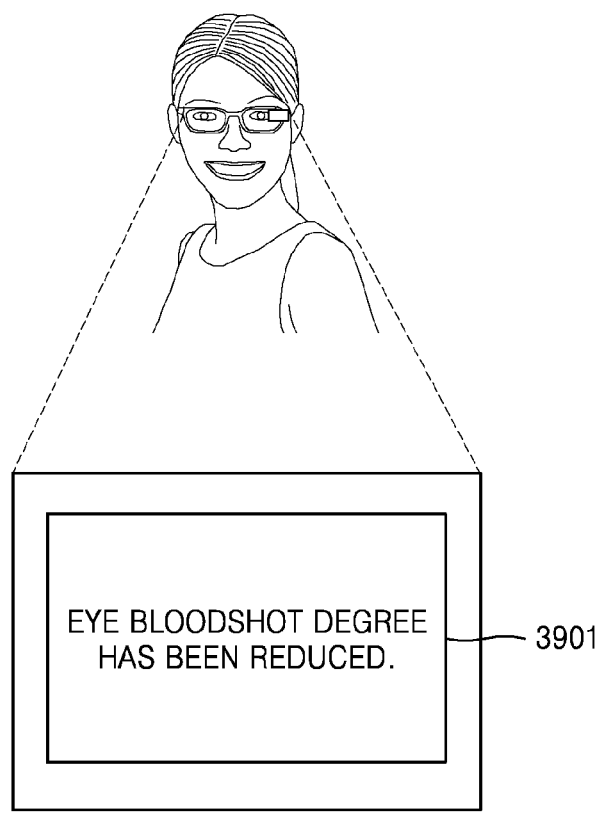
FIG. 39 is a diagram of an example of a screen regarding a result of providing different content, according to an exemplary embodiment.

FIG. 39 is a diagram of an example of a result of providing different content provided by the wearable device 100, according to an exemplary embodiment. Referring to FIG. 39, the wearable device 100 may provide a screen 3901 including the result (for example, an eye bloodshot degree has been reduced) of providing different content, but is not limited thereto in one or more other exemplary embodiments.

Figure 40:
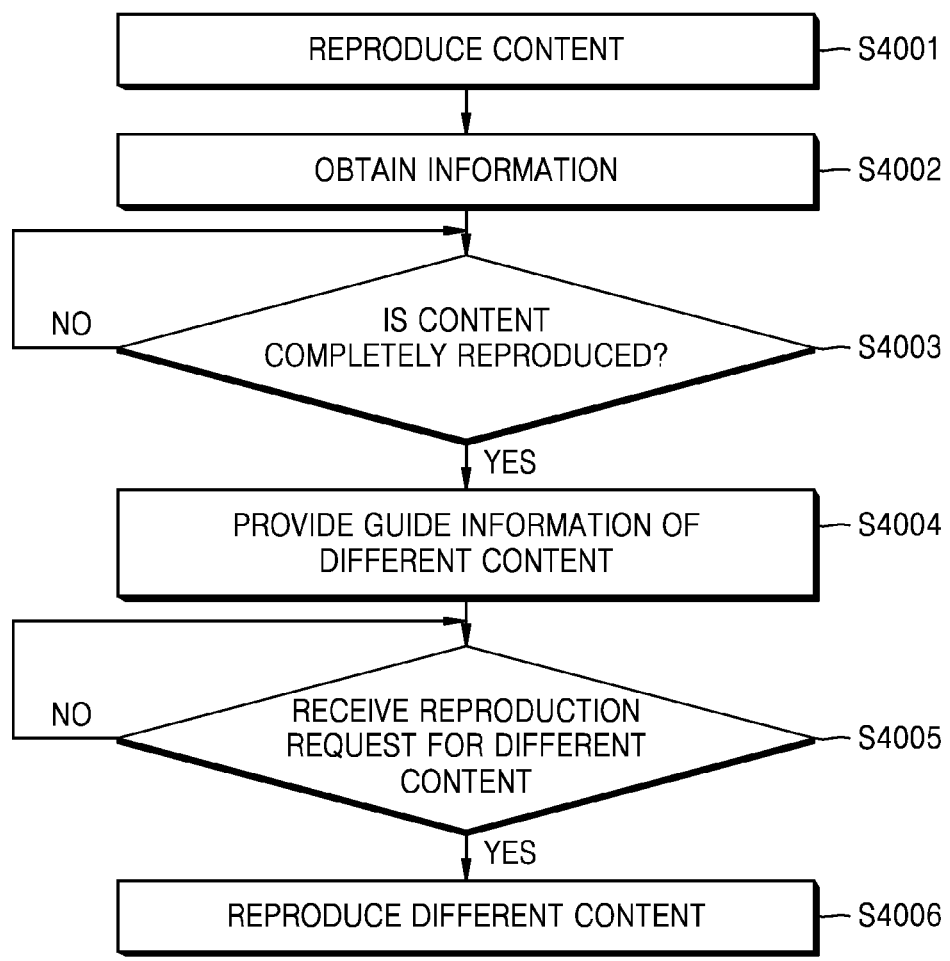
FIG. 40 is a flowchart for explaining a method of operating a wearable device according to another exemplary embodiment.

FIG. 40 is a flowchart for explaining a method of operating the wearable device 100 according to another exemplary embodiment. FIG. 40 is an example of providing guide information regarding different content and reproducing different content after completely reproducing content by the wearable device 100.

Operations of the wearable device 100 in operations S4001 and S4002 are similar to operations of the wearable device 100 in operations S601 and S602 of FIG. 6. Operations of the wearable device 100 in operations S4004 through S4006 are similar to operations of the wearable device 100 in operations S1906 through S1908 of FIG. 19.

In operation S4003, if content is completely reproduced, the wearable device 100 displays guide information of different content on the display 212. A complete reproduction of content may include a complete reproduction of content by arriving at a content end point irrespective of a command of the wearer 101 or a complete reproduction of content according to the command of the wearer 101.

Figure 41:
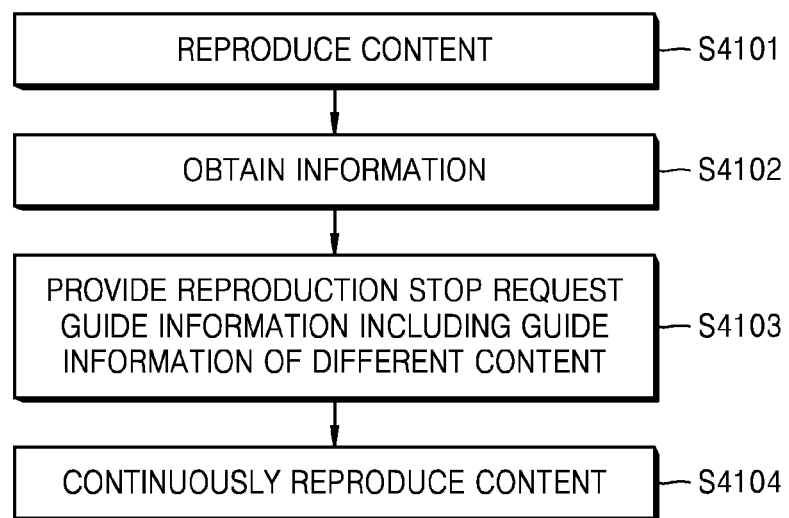
FIG. 41 is a flowchart for explaining a method of operating a wearable device according to another exemplary embodiment.

FIG. 41 is a flowchart for explaining a method of operating the wearable device 100 according to another exemplary embodiment. FIG. 41 is an example of providing guide information of different content while reproducing content and continuously reproducing the content.

Operations of the wearable device 100 in operations S4101 and S4102 are similar to operations of the wearable device 100 in operations S601 and S602 of FIG. 6.

In operation S4103, as a result of comparing information obtained in operation S4102 and reference information as in operation S603 of FIG. 6 described above, if it is determined to reproduce different content, the wearable device 100 provides reproduction stop request guide information including guide information of different content. In operation S4103, the wearable device 100 may temporarily stop reproducing content and provide the reproduction stop request guide information including guide information of different content.

Figure 42:
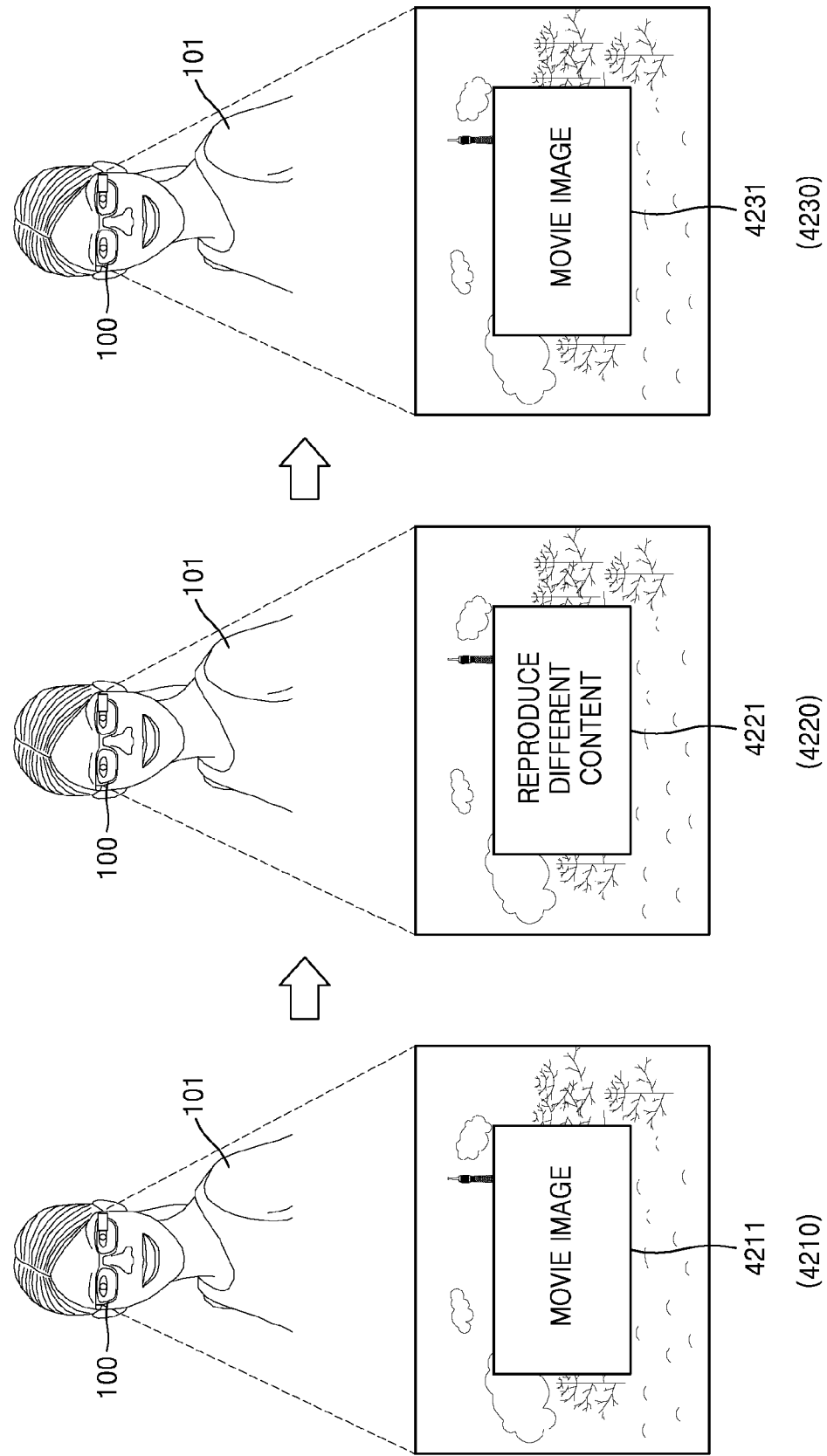
FIG. 42 is a diagram of an example of temporarily stopping reproducing content and providing guide information of different content, according to an exemplary embodiment.

FIG. 42 is a diagram of an example of temporarily stopping reproducing of the content and providing guide information (e.g., "please execute different content") of different content, according to an exemplary embodiment. In a situation in which different content is to be reproduced when the wearable device 100 reproduces a movie image 4211 as shown in the screen 4210 of FIG. 42, the wearable device 100 displays reproduction stop request guide information 4221 including guide information "please reproduce different content" as shown on the screen 4220 instead of the movie image 4211.

The reproduction stop request guide information 4221 may be displayed for more than a certain (e.g., predetermined) period of time. The certain period of time may be set as 1 second, but is not limited thereto in one or more other exemplary embodiments. The situation in which different content is to be reproduced is, for example, a situation in which fatigue of the wearer 101 is to be relieved and may be detected by comparing the information obtained in operation S4102 and reference information (described above with reference to FIGS. 1B through 1H).

In operation S4103, the reproduction stop request guide information 4221 including the guide information regarding a reproduction of different content is displayed. Thereafter, in operation S4104, the wearable device 100 continuously reproduces a movie image 4231 (see a screen 4230 of FIG. 42).

The movie image 4211 and the movie image 4231 of FIG. 42 may be connected images or same images. For example, the movie image 4211 and the movie image 4231 may be frame images of a point at which reproduction of content is stopped before the reproduction stop request guide information 4221 including the guide information of different content is displayed. According to another exemplary embodiment, the movie image 4211 may be the frame image of the point at which reproduction of content is stopped before the reproduction stop request guide information 4221 including the guide information of different content is displayed, and the movie image 4231 may be an image based on a next frame of the frame of the point at which reproduction of content is stopped before the reproduction stop request guide information 4221 including the guide information of different content is displayed, as described with reference to FIG. 8A above. However, a relationship between the movie image 4211 and the movie image 4231 is not limited as described above. For example, the movie image 4231 may be a frame image previous to a certain section described in operation S3510 of FIG. 35.

The reproduction stop request guide information 4221 displayed in operation S4203 may be displayed as shown in FIG. 8B or 8C described above.

Figure 43:
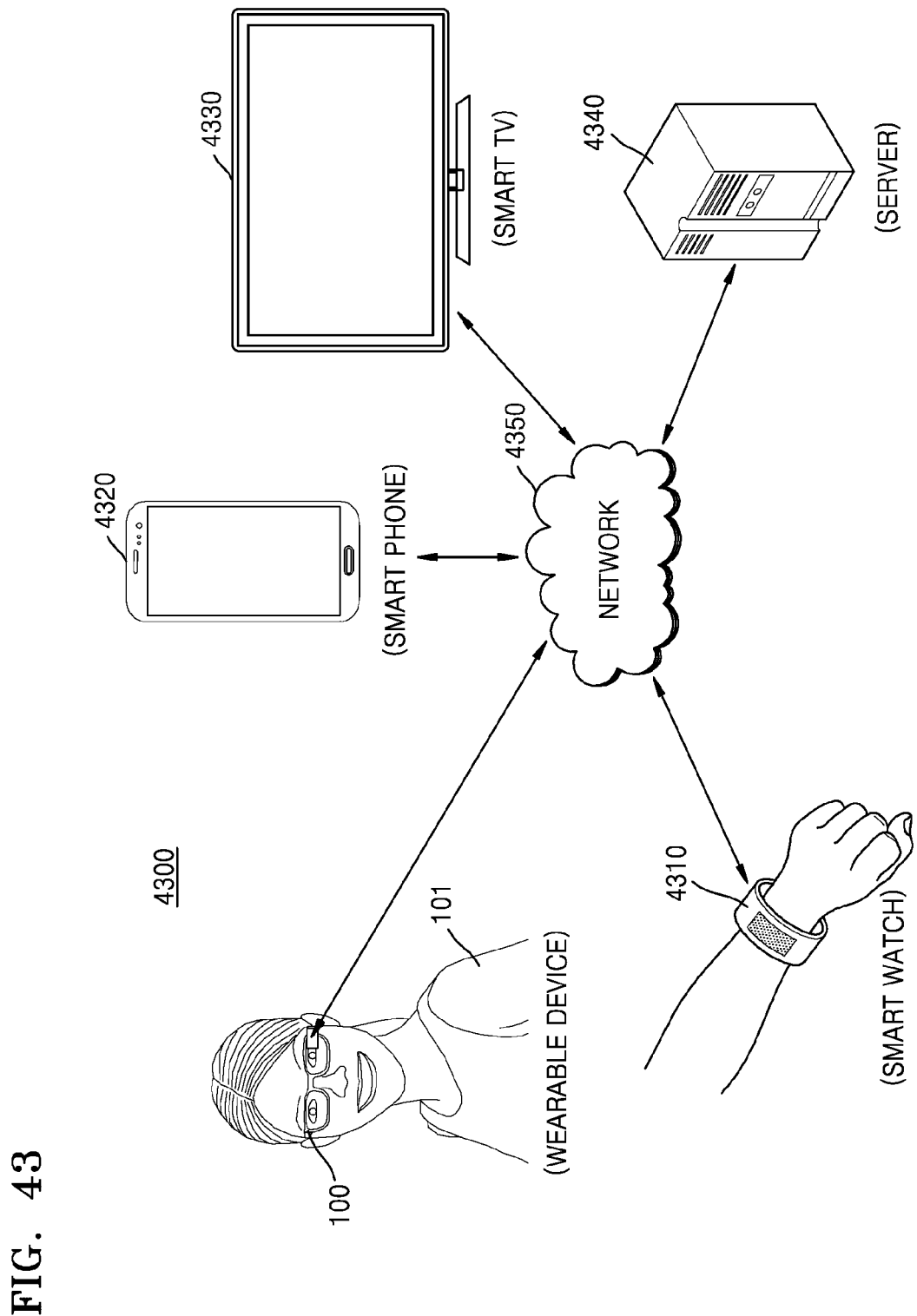
FIG. 43 is a diagram for explaining an operating system of a wearable device.

FIG. 43 is a diagram for explaining an operating system or environment 4300 of the wearable device 100, according to an exemplary embodiment. FIG. 43 may be referred to as a device relationship diagram or a network configuration diagram for explaining a method of operating the wearable device 100 according to an exemplary embodiment, but is not limited thereto.

The system 4300 of FIG. 43 includes the wearable device 100, a smart watch 4310, a smart phone 4320, a smart TV 4330, a server 4340, a network 4350, and a content reproduction device (for example, a game machine), but is not limited thereto in one or more other exemplary embodiments.

For example, the smart watch 4310, the smart phone 4320, the smart TV 4330, and the server 4340 may be included in at least one external device. The smart watch 4310 may be included in an assist device connected to the wearable device 100. The assist device may correspond to an "appcessory." The appcessory is a device connected to a main device (for example, the wearable device 100) and operating as an application.

The server 4340 may include a server providing a different content reproducing service and a cloud server of the wearer 101 of the wearable device 100 according to exemplary embodiments by using the wearable device 100 or the wearable device 100 and an external device of the wearable device 100, but is not limited thereto in one or more other exemplary embodiments. The different content reproducing service refers to a service providing, to the wearer 101, content (for example, for relieving fatigue of the wearer 101) that may influence health of the wearer 101. The system 4300 may further include an external storage device storing PIMS information of the wearer 101 and/or life log information.

The network 4350 may include a wired or wireless based network. The network 4350 may include a network capable of near field communication or direct communication between the wearable device 100 and the smart watch 4310, between the wearable device 100 and the smart phone 4320, and between the wearable device 100 and the smart TV 4330 and a network capable of far field communication between the wearable device 100 and the server 4340, but is not limited thereto in one or more other exemplary embodiments.

Near field communication or direct communication may include, for example, Bluetooth communication, Bluetooth low energy (BLE) communication, near field communication (NFC), WLAN (WiFi) communication, Zigbee communication, infrared data association (IrDA) communication, WiFi Direct (WFD) communication, ultra wideband (UWV) communication, Ant+ communication, etc., but is not limited thereto.

Far field communication may include, for example, communication (for example, direct communication between terminals (device to device (D2D)), communication based on a base station, Internet of things (IoT), machine to machine (M2M), etc.) based on a mobile communication network, wired or wireless Internet, artificial satellite based communication, broadcasting communication, etc., but is not limited thereto.

The smart watch 4310 may be used to input a user's command for executing different content, but is not limited thereto. For example, the smart watch 4310 may be used to display reproduction stop request guide information including reproduction guide information of different content.

The smart phone 4320 may be used to input a user's command for reproducing different content, display the reproduction stop request guide information including the reproduction guide information of different content, or reproduce different content, but is not limited thereto in one or more other exemplary embodiments. For example, the smart phone 4320 may provide content such as a game image or a movie image to the wearable device 100. The smart phone 4320 may correspond to the mobile device 250 of FIGS. 2D and 2E described above.

The smart TV 4330 may be used to display the reproduction stop request guide information including the reproduction guide information of different content, reproduce different content, or provide, to the wearable device 100, content such as the game image, the movie image, or a broadcasting program.

The server 4340 may be used to provide information for reproducing different content to at least one of the wearable device 100, the smart watch 4310, the smart phone 4320, the smart TV 4330, and a content reproduction device 4360.

Information provided from the appcessory such as the smart watch 4310 may include health information of the wearer 101. For example, the health information may include the health information of the wearer 101 sensed by using a bio sensor mounted in the smart watch 4310 such as a sweating sensor, a blood pressure sensor, a pulse sensor, and a blood sugar sensor and an activity measurement information of the wearer 101. The health information that may be sensed by the smart watch 430 is not limited as described above.

The system 4300 may include an appcessory in addition to the smart watch 4310. The appcessory in addition to the smart watch 4310 may include at least one of, for example, devices used as uses such as various types of smart accessories (for example, a smart ring, smart earrings, a smart band, a smart necklace, a smart tie, a smart collar, etc.), various types of smart patches, smart office supplies such as a smart clip, various types of smart body guards (for example, smart knee guards and smart elbow guards), smart shoes, smart gloves, smart clothes, smart hats, smart prosthetic foot, smart prosthetic hands, etc., but is not limited thereto. The system 4300 may include at least one of the above-described appcessories instead of the smart watch 4310. The system 4300 may include at least one of the smart watch 4310 and the above-described appcessories.

Information provided from an external device such as the smart phone 4320 or the server 4340 may include personal information of the wearer 101 and/or health information. The personal information may include, for example, personal information such as profile information, life log information of the wearer 101, PIMS information of the wearer 101, an age of the wearer 101, a gender of the wearer 101, schedule information of the wearer 101, etc., and/or medical information of a user such as past medical history information of the wearer 101 and present medical history information of the wearer 101, but is not limited thereto.

The smart phone 4320 and the smart TV 4340 may be replaced with various types of devices, for example, a portable device, a home Internet appliance, a mobile device, etc.

The portable device may include a notebook, a smart board, a tablet, a PC, a handheld device, a handheld computer, a media player, an e-book terminal, a personal digital assistant (PDA), etc., but is not limited thereto.

The home Internet appliance may include a home device performing M2M or IoT such as the smart TV, the PC, a desktop PC, a refrigerator, a washing machine, an illumination device, etc., but is not limited thereto.

The mobile device my include a device such a vehicle performing M2M or IoT, but is not limited thereto.

The content reproduction device 4360 may transmit information regarding reproduced content (for example, the game image) to the wearable device 100 and control a content reproduction operation according to a user input through the wearable device 100, like the content reproduction device 270 of FIG. 2F.

Information that may be provided based on an application installed in the wearable device 100 may include, for example, peripheral environment information (e.g., weather provided by a weather center), but is not limited thereto in one or more other exemplary embodiments. The peripheral environment information provided by the wearable device 100 may be used to detect a situation in which fatigue of the wearer 101 is to be relieved.

Figure 44:
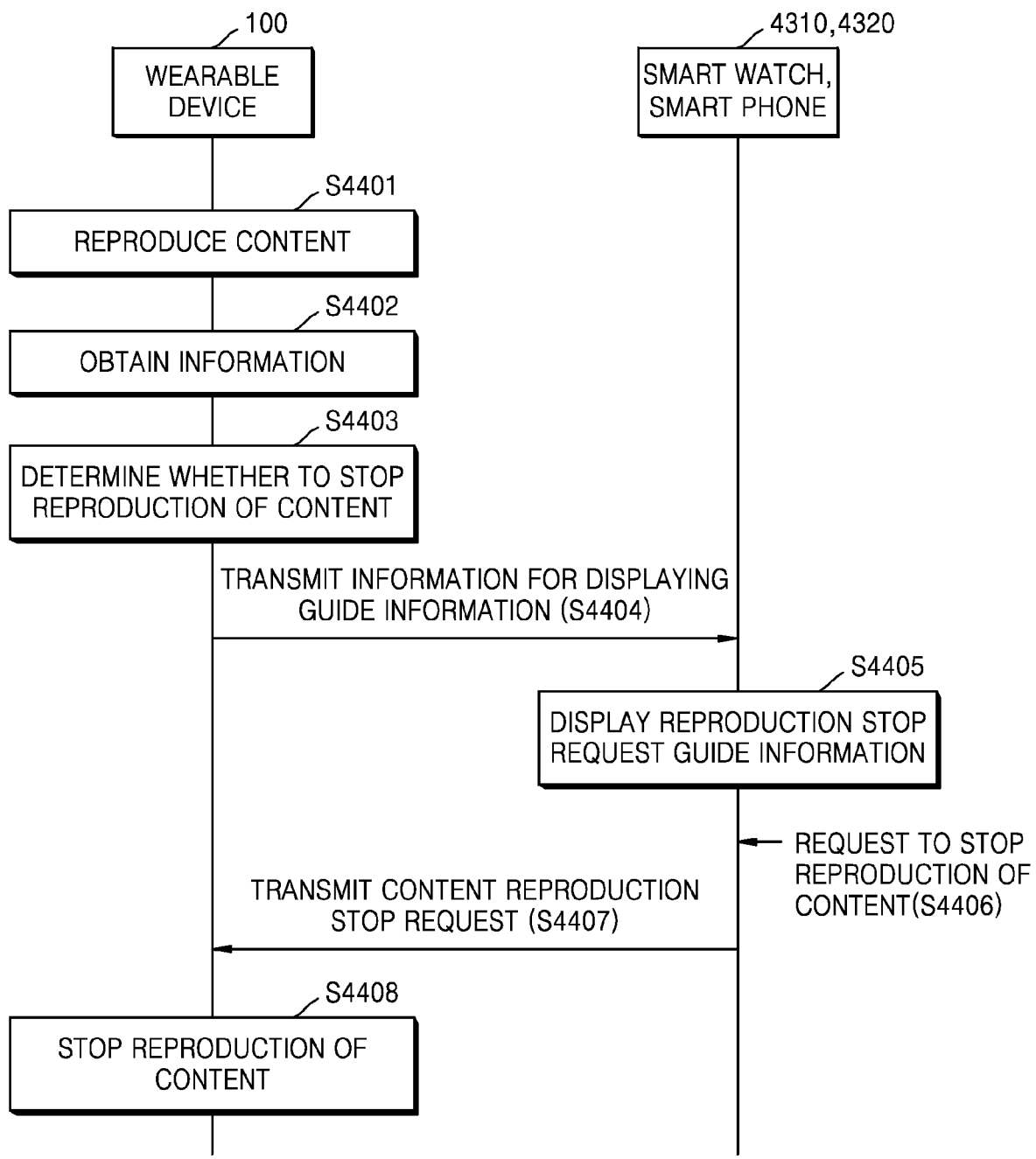
FIG. 44 is a flowchart for explaining a system operating method according to an exemplary embodiment.

FIG. 44 is a flowchart for explaining a method of operating the system 4300 according to an exemplary embodiment. FIG. 44 is an example of determining whether to stop reproducing content by the wearable device 100, displaying the reproduction stop request guide information 702 regarding the content through an external device (for example, the smart watch 4310 and the smart phone 4320), and, if a reproduction stop request for the content is received through the external device, stopping reproducing the content by the wearable device 100.

In FIG. 44, the external device may include at least one of the smart watch 4310 and the smart phone 4320, but is not limited thereto. Hereinafter, the external device will be described as the smart phone 4320, but the following description may also apply to the smart watch 4310.

The smart phone 4320 may be a smart phone of the wearer 101 of the wearable device 100, a smart phone of a parent of the wearer 101, or a smart phone of an acquaintance of the wearer 101 or a person around the wearer 101, but is not limited thereto. A location around the wearer 101 may be a closed space (for example, a room or home) or an open space (or a region) within a certain (e.g., predetermined) range (for example, 5 m) with respect to the wearer 101, but is not limited thereto. When the smart phone 4320 is the smart phone of the parent of the wearer 101, the wearable device 100 may control a content reproduction stop function by a smart phone 3220 of the parent.

A connection between the wearable device 100 and the smart phone 4320 of FIG. 44 may be performed when content is reproduced by the wearable device 100, but may be performed when information for displaying reproduction stop request guide information regarding content is transmitted in operation S4404. The connection may be based on near field wireless communication, far field wireless communication, or wired communication, but is not limited thereto.

In operation S4401, the wearable device 100 reproduces content. The wearable device 100 may reproduce content by executing an application installed in the wearable device 100 as described above with reference to FIG. 1A, but is not limited thereto.

For example, in operation S4401, the wearable device 100 may receive and display, on the display 212, information regarding content reproduced by the smart phone 4320, the smart TV 4330, or the content reproduction device 4360. In the case of the wearable device 100 illustrated in FIG. 5B, in operation S4401, the wearable device 100 may view content displayed on the display 251 of the smart phone 4320 (the mobile device 250 of FIG. 5B) through the lenses 532 and 533.

In operation S4402, the wearable device 100 obtains information. The information may be obtained by the wearable device 100 as described in operation S602 of FIG. 6.

In operation S4403, the wearable device 100 determines whether to stop reproducing content by using the obtained information and reference information. Whether to stop reproducing the content may be determined as described in operation S603 of FIG. 6. As a result of the determination, if a situation in which reproduction of the content is to be stopped is detected, the wearable device 100 transmits the information for displaying the reproduction stop request guide information regarding the content to the smart phone 4320.

The situation in which reproduction of the content is to be stopped is a situation (for example, in which fatigue of the wearer 101 is to be relieved) that influences health of the wearer 101 by viewing the reproduced content by the wearable device 100 as described above with reference to FIG. 6. The information for displaying the reproduction stop request guide information transmitted to the smart phone 4320 may be determined according to a method of displaying the reproduction stop request guide information, but is not limited thereto in one or more other exemplary embodiments. For example, the information for displaying the reproduction stop request guide information may include information as described in the reproduction stop request guide information 702 of FIG. 7.

In operation S4405, the smart phone 4320 displays the reproduction stop request guide information regarding the content based on the received information for displaying the reproduction stop request guide information. The reproduction stop request guide information may be displayed as shown in one of FIGS. 7, 8B, and 8C described above, but is not limited thereto in one or more other exemplary embodiments.

For example, the reproduction stop request guide information may be displayed by using a status bar region or notification region of the smart phone 4320. When the status bar region may be used to display the reproduction stop request guide information, the smart phone 4320 may change the received information for displaying the reproduction stop request guide information in such a manner that the reproduction stop request guide information may be displayed on the status bar region of the smart phone 4320. According to another exemplary embodiment, the wearable device 100 may transmit the information in a form to be displayed on the status bar.

When the reproduction stop request guide information is displayed, the smart phone 4320 may reproduce information regarding content different from the content reproduced by the wearable device 100. The information regarding the different content reproduced by the smart phone may include information regarding content related to the health of the wearer 101 previously stored in the smart phone 4320, but is not limited thereto in one or more other exemplary embodiments. For example, information regarding content selected by a user of the smart phone 4320 may be included.

When the reproduction stop request guide information is displayed as shown in FIG. 8C, the smart phone 4320 may not use another device but may display the reproduction stop request guide information 702 on a display region independent from a region on which currently reproduced content is displayed.

Since the reproduction stop request guide information 702 is displayed, the user of the smart phone 4320 may perceive the situation in which the fatigue of the wearer 101 of the wearable device 100 needs to be relieved.

If a content reproduction stop request is received based on the reproduction stop request guide information displayed on the smart phone 4320 in operation S4406, the smart phone 4320 transmits the received content reproduction stop request signal to the wearable device 100 in operation S4407. The smart phone 4320 may receive the content reproduction stop request based on at least one of a voice input of the user, a gesture input of the user, and a touch input based on the information displayed on the smart phone 4320, but is not limited thereto in one or more other exemplary embodiments.

In operation S4408, the wearable device 100 stops reproducing the content.

FIG. 44 may be modified to further include operations S1906 through S1908 of FIG. 19 after operation S4408, may be modified to further include operations S3206 through S3208 of FIG. 32 after operation S4408, may be modified to further include operations S3506 through S3510 of FIG. 35 after operation S4408, may be modified to further include operations S3606 through S3611 of FIG. 36 after operation S4408, may be modified to further include operations S3706 through S3713 of FIG. 37 after operation S4408, and/or may be modified to further include operations S3806 through S3810 of FIG. 38 after operation S4408.

When a function related to different content is applied to the flowchart of FIG. 44, the different content may be reproduced by the smart phone 4320 or the smart TV 4330. When the different content is reproduced by the smart phone 4320 or the smart TV 4330, the wearable device 100 may view the different content through a display of the smart phone 4320 or the smart TV 4330 positioned in a real world that may be viewed through the wearable device 100, but is not limited thereto. For example, the smart phone 4320 or the smart TV 4330 may be connected to the wearable device 100 by wire or wirelessly to transmit information regarding reproduced different content to the wearable device 100. Accordingly, the wearable device 100 may display different content based on the received information regarding the different content.

When the function related to the different content is applied to the flowchart of FIG. 44, information regarding the different content may be transmitted to the wearable device 100 from one of the smart phone 4320, the smart TV 4330, and the server 4340, and the wearable device 100 may reproduce the different content based on the received information regarding the different content to relieve the fatigue of the wearer 101. Reproduction of the different content may be understood as an operation to perform a function of relieving the fatigue of the wearer 101, as described above with reference to FIGS. 19 through 32.

Figure 45:
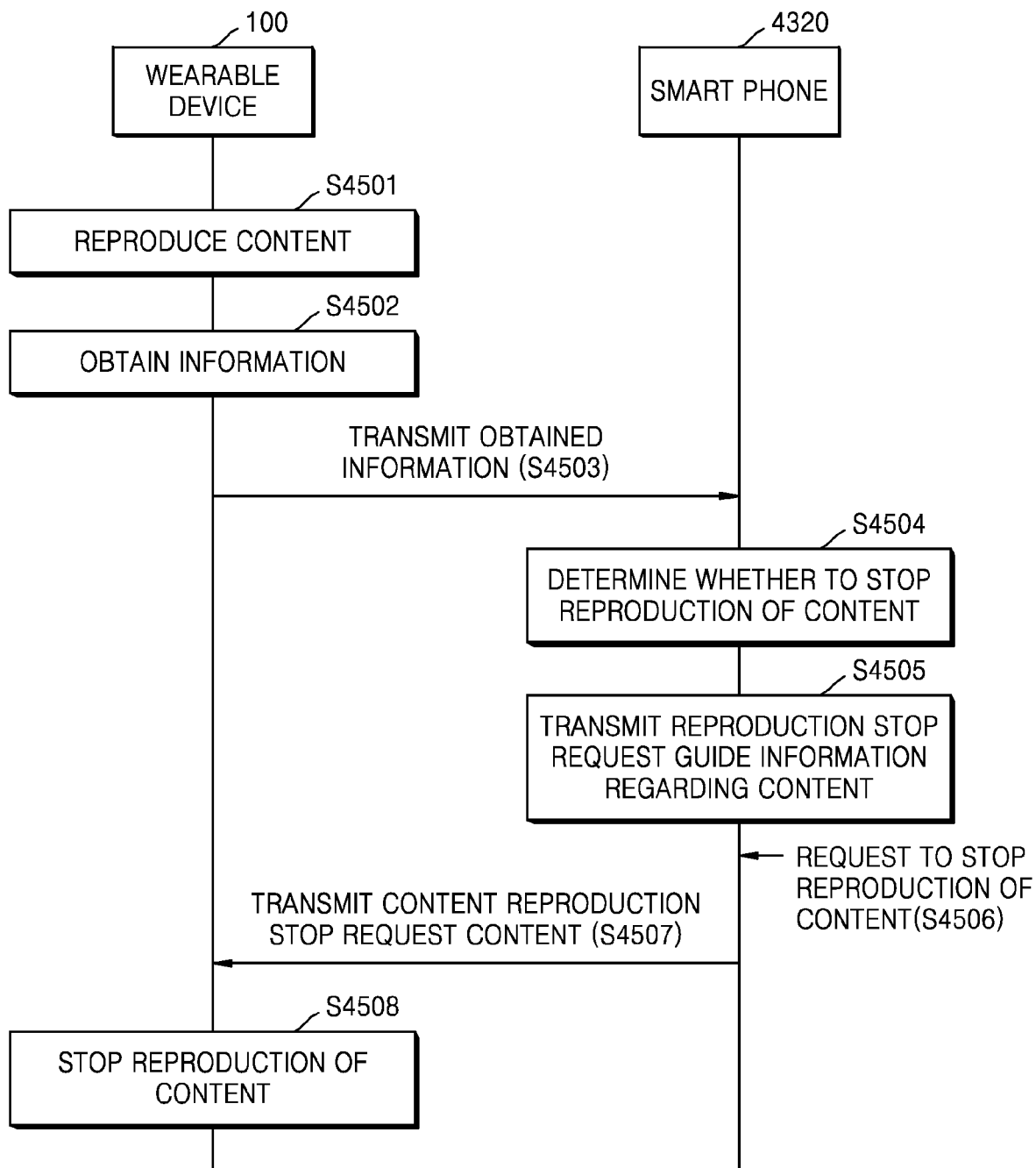
FIG. 45 is a flowchart for explaining a system operating method according to another exemplary embodiment.

FIG. 45 is a flowchart for explaining a method of operating the system 4300 according to another exemplary embodiment. FIG. 45 is an example of determining whether to stop reproducing content by the smart phone 4320 based on information obtained by the wearable device 100 and controlling a content reproduction operation of the wearable device 100 based on a result of the determination. FIG. 45 may be applied between the wearable device 100 and the smart phone TV 4330 and between the wearable device 100 and the server 4340.

Operations S4501, S4502, and S4505 through S4508 of FIG. 45 may be performed similarly to operations S4401, S4402, and S4405 through S4408 of FIG. 44 described above.

In operation S4503, the wearable device 100 transmits information obtained in operation S4502 to the smart phone 4320. The smart phone 4320 compares the information received from the wearable device 100 and reference information described above with reference to FIGS. 1B through 1G and determines whether to stop reproducing the content.

As a result of the determination, if a situation in which reproduction of the content is to be stopped is detected, in operation S4504, the smart phone 4320 displays content reproduction stop request guide information.

FIG. 45 may be modified to further include operations S1906 through S1908 of FIG. 19 after operation S4508, may be modified to further include operations S3206 through S3208 of FIG. 32 after operation S4508, may be modified to further include operations S3506 through S3510 of FIG. 35 after operation S4508, may be modified to further include operations S3606 through S3611 of FIG. 36 after operation S4508, may be modified to further include operations S3706 through S3713 of FIG. 37 after operation S4508, and/or may be modified to further include operations S3806 through S3810 of FIG. 38 after operation S4508. A function related to reproduction of different content may be applied to the flowchart of FIG. 45 as described above with reference to FIG. 44.

Figure 46:
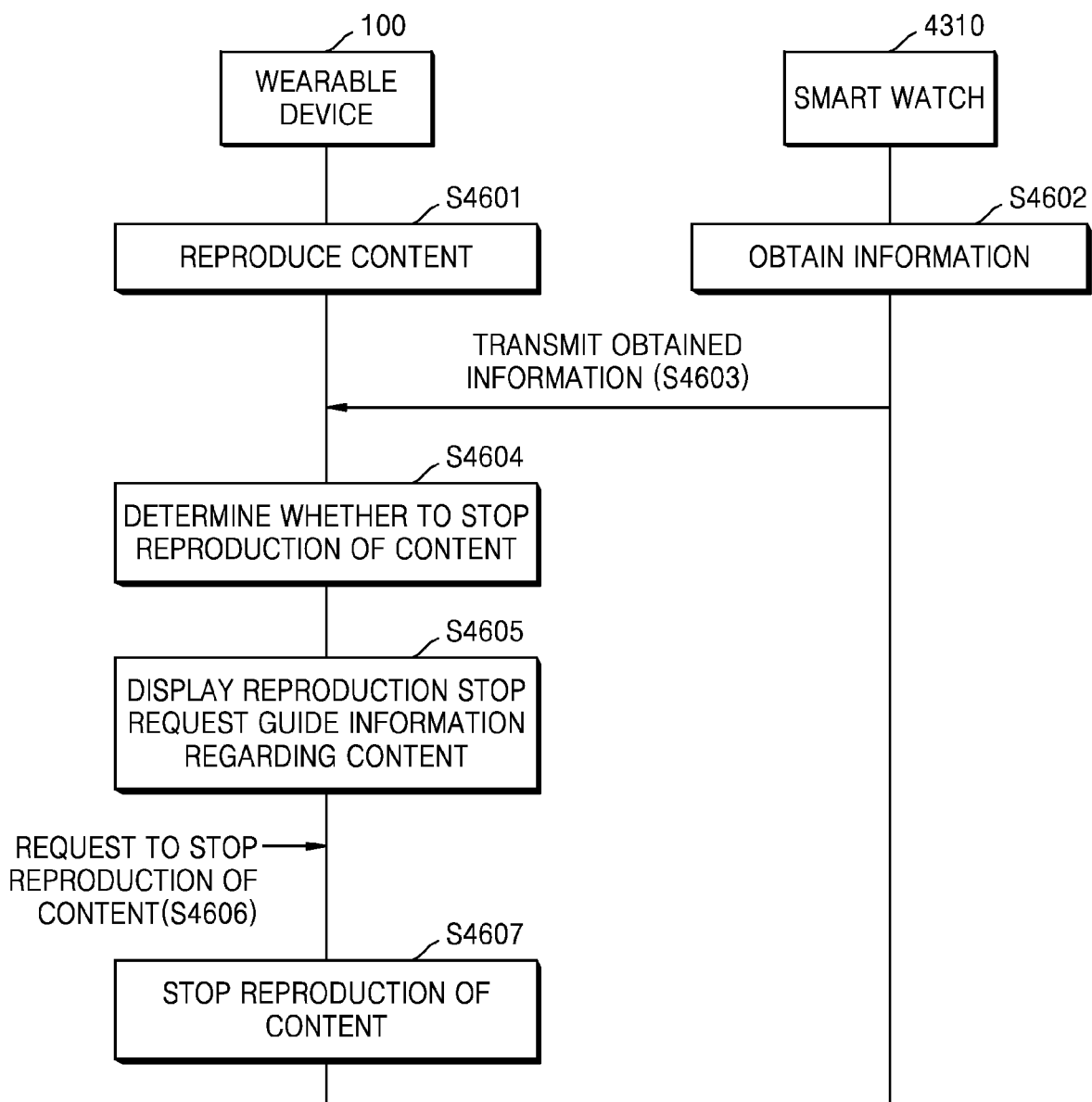
FIG. 46 is a flowchart for explaining a system operating method according to another exemplary embodiment.

FIG. 46 is a flowchart for explaining a method of operating the system 4300 according to another exemplary embodiment. FIG. 46 is an example in which the wearable device 100 displays content reproduction stop request guide information based on information provided by the smart watch 4310.

Operations S4601, S4604, and S4607 of FIG. 46 may be performed similarly to operations S4401, S4403, and S4408 of FIG. 44 described above.

In operation S4602, the smart watch 4310 may obtain health information such as a sweating amount of the wearer 101, a blood pressure, a pulse, a blood sugar, etc., by using a bio sensor mounted in the smart watch 4310 or may obtain information regarding an activity of the wearer 101 by using an activity measurement function as described with reference to FIG. 43.

In operation S4603, the smart watch 4310 transmits the obtained information to the wearable device 100. Accordingly, in operation S4604, the wearable device 100 determines whether to stop reproducing content. Whether to stop reproducing the content may be determined by comparing reproduction stop request guide information described above with reference to the health information of FIG. 1C-2 and the information received from the smart watch 4310.

As a result of the determination, if a situation in which reproduction of the content is to be stopped is detected, in operation S4605, the wearable device 100 displays content reproduction stop request guide information. The content reproduction stop request guide information may be displayed as shown in one of FIGS. 7, 8B, and 8C, but is not limited thereto.

In operation S4606, if a content reproduction stop request is received based on the displayed content reproduction stop request guide information, the wearable device 100 stops reproducing the content.

FIG. 46 may be applied between the wearable device 100 and the smart phone 4320. When FIG. 46 is applied between the wearable device 100 and the smart phone 4320, the information obtained in operation S4602 may include at least one of medical information of the wearer 101 described above with reference to FIG. 1C-2, peripheral environment information described above with reference to FIG. 1F, and personal information of the wearer 101 described above with reference to FIG. 1G, but is not limited thereto.

FIG. 46 may be applied between the wearable device 100 and the server 4340. When FIG. 46 is applied between the wearable device 100 and the server 4340, the information obtained in operation S4602 may include at least one of the medical information of the wearer 101 described above with reference to FIG. 1C-2, the peripheral environment information described above with reference to FIG. 1F, and the personal information of the wearer 101 described above with reference to FIG. 1G, but is not limited thereto.

Operation S4603 of FIG. 46 may be modified such that the information obtained by the smart watch 4310 is transmitted when a transmission of information is requested by the wearable device 100.

FIG. 46 may be modified to further include operations S1906 through S1908 of FIG. 19 after operation S4607, may be modified to further include operations S3206 through S3208 of FIG. 32 after operation S4607, may be modified to further include operations S3506 through S3510 of FIG. 35 after operation S4607, may be modified to further include operations S3606 through S3611 of FIG. 36 after operation S4607, may be modified to further include operations S3706 through S3713 of FIG. 37 after operation S4607, and/or may be modified to further include operations S3806 through S3810 of FIG. 38 after operation S4607. A function related to reproduction of different content may be applied to the flowchart of FIG. 46 as described above with reference to FIG. 44.

Figure 47:
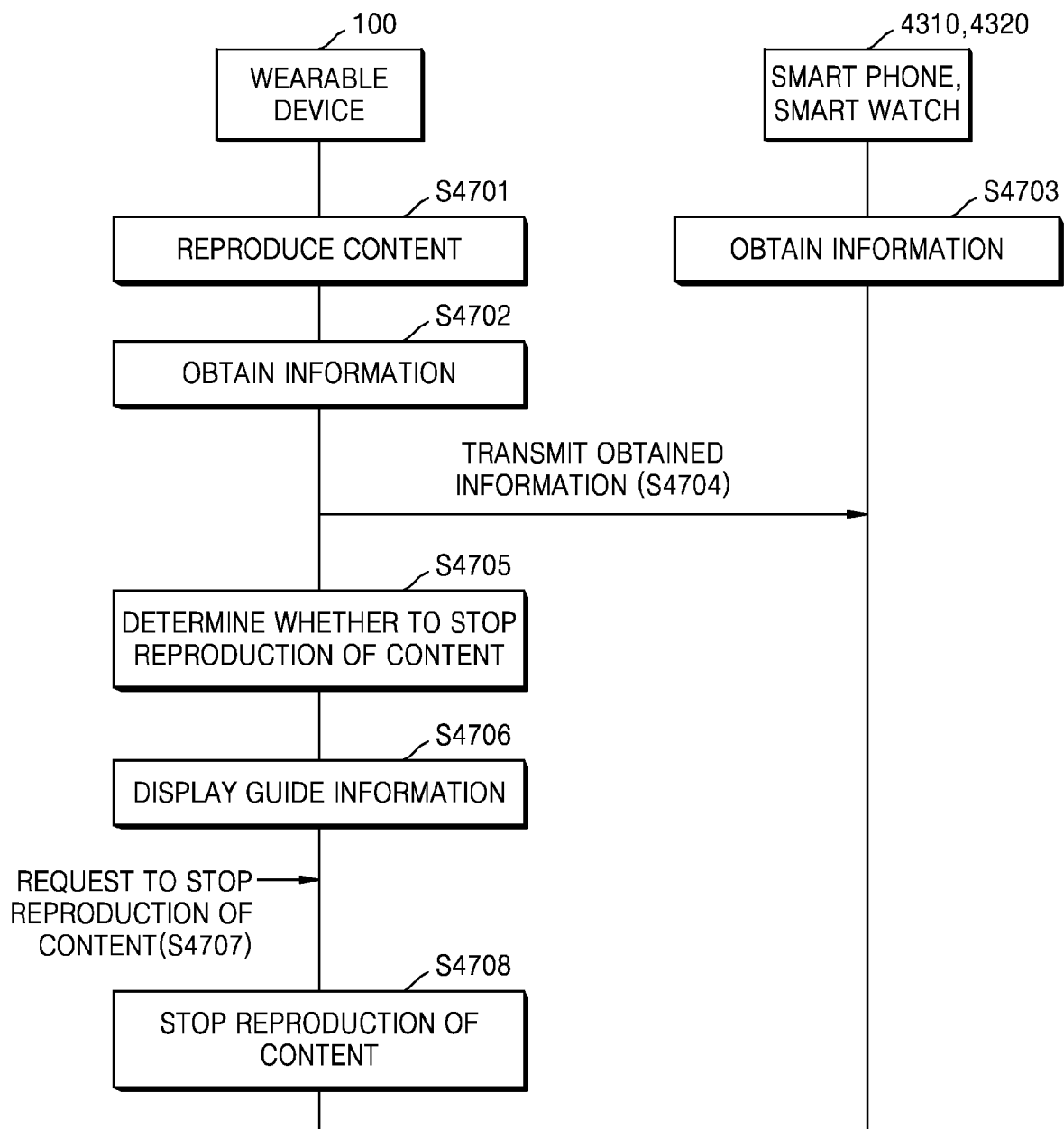
FIG. 47 is a flowchart for explaining a system operating method according to another exemplary embodiment.

FIG. 47 is a flowchart for explaining a method of operating the system 4300 according to another exemplary embodiment. FIG. 47 is an example of displaying content reproduction stop request guide information by using information obtained by the wearable device 100 and information obtained by an external device (for example, the smart watch 4310 and the smart phone 4320).

Operations S4701 and S4702 of FIG. 47 may be performed similarly to operations S4401 and S4402 of FIG. 44 described above. Operations S4703 and S4704 of FIG. 47 may be performed similarly to operations S4602 and S4603 of FIG. 46 described above. Operations S4706 through S4708 of FIG. 47 may be performed similarly to operations S4605 through S4607 of FIG. 46 described above.

In operation S4705, the wearable device 100 may compare the information obtained by the wearable device 100 and information transmitted from the smart watch 4310 or the smart phone 4320 and reference information for a reproduction stop request described above with reference to FIGS. 1B through 1H to determine whether to stop reproducing content reproduced by the wearable device 100.

For example, the information obtained in operation S4702 may be one of content reproduction related information of the wearable device 100 described above with reference to FIG. 1B, bio information based on eyes described above with reference to FIG. 1C-1, and peripheral environment information described above with reference to FIG. 1F, and the information transmitted in operation S4704 may be one of health information described above with reference to FIG. 1C-2, the peripheral environment information described above with reference to FIG. 1F, and personal information described above with reference to FIG. 1G but are not limited thereto.

In operation S4705, the wearable device 100 may determine whether to stop reproducing the content in the same or similar manner as determining whether to display the reproduction stop request guide information by using a plurality of pieces of information as described above with reference to FIG. 16.

FIG. 47 may be applied between the wearable device 100 and the server 4340. When FIG. 47 is applied between the wearable device 100 and the server 4340, the server 4340 may provide, to the wearable device 100, at least one of medical information described above with reference to FIG. 1C-2, the peripheral environment information described above with reference to FIG. 1F, and the personal information described above with reference to FIG. 1G, but the provided information is not limited thereto in one or more other exemplary embodiments.

FIG. 47 may be modified to further include operations S1906 through S1908 of FIG. 19 after operation S4708, may be modified to further include operations S3206 through S3208 of FIG. 32 after operation S4708, may be modified to further include operations S3506 through S3510 of FIG. 35 after operation S4708, may be modified to further include operations S3606 through S3611 of FIG. 36 after operation S4708, may be modified to further include operations S3706 through S3713 of FIG. 37 after operation S4708, and/or may be modified to further include operations S3806 through S3810 of FIG. 38 after operation S4708. A function related to reproduction of different content may be applied to the flowchart of FIG. 47 as described with reference to FIG. 44.

Figure 48:
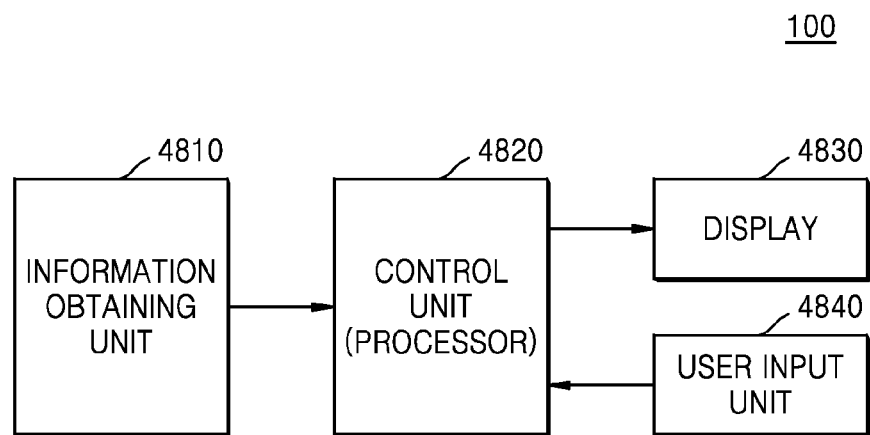
FIGS. 48 and 49 are block diagrams of devices according to one or more exemplary embodiments.

FIG. 48 is a block diagram of the wearable device 100 according to an exemplary embodiment. Referring to FIG. 48, the wearable device 100 may include an information obtaining unit 4810 (e.g., information obtainer), a control unit 4820 (e.g., controller), a display 4830, and a user input unit 4840 (e.g., user input device or user inputter). However, it is understood that the wearable device 100 may be implemented with more elements or fewer elements than the above-described elements.

Figure 49:
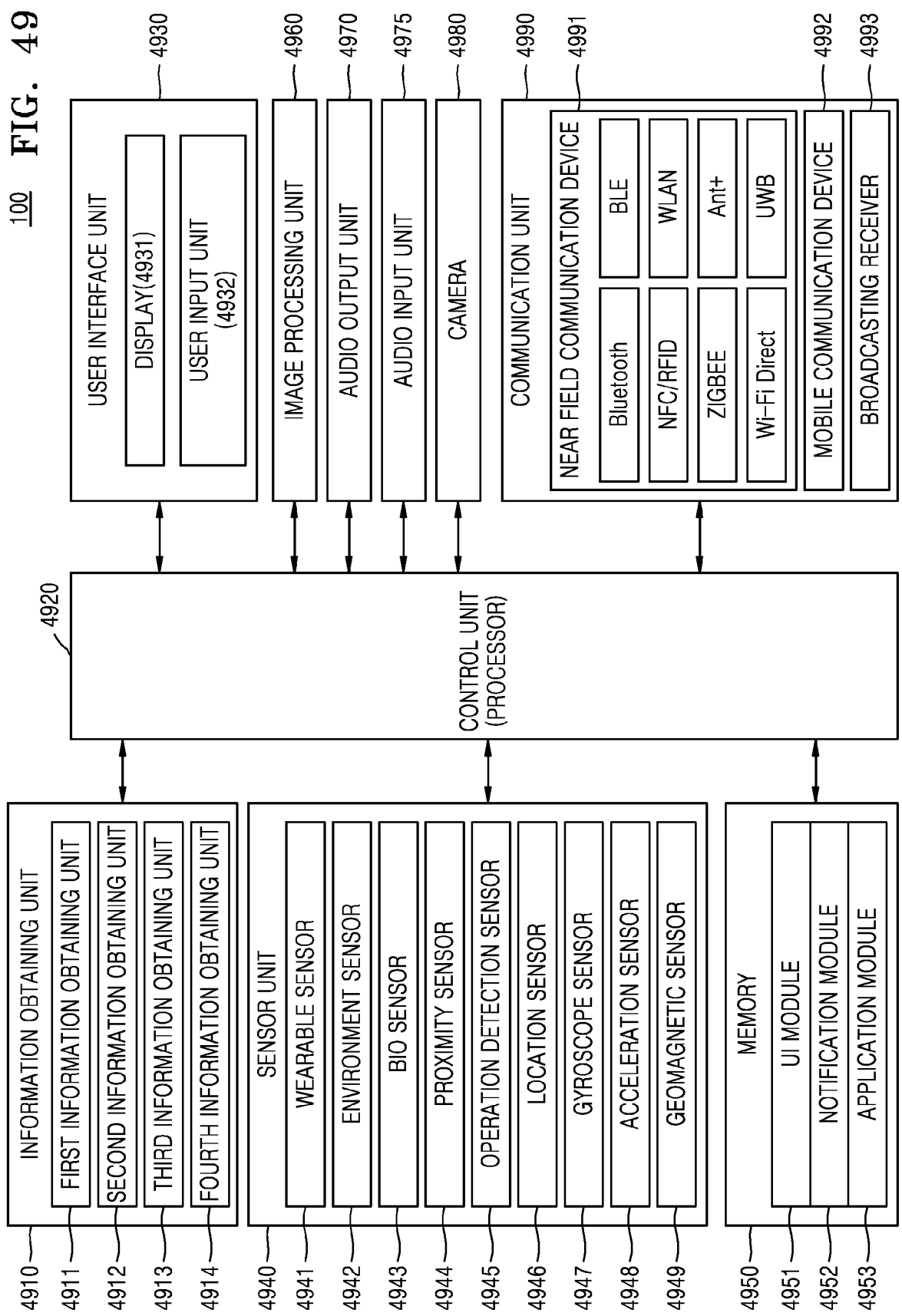

For example, the wearable device 100 according to an exemplary embodiment may include an information obtaining unit 4910 (e.g., information obtainer), a control unit 4920 (e.g., controller), a user interface unit 4930 (e.g., user interface device or user interface), a sensor unit 4940 (e.g., sensor), a memory 4950, an image processing unit 4960 (e.g., image processor), an audio output unit 4970 (e.g., audio output device or audio outputter), an audio input unit 4975 (e.g., audio input device or audio inputter), a camera 4980, and a communication unit 4990 (e.g., communicator, communication device, or communication module) as shown in FIG. 49, but is not limited thereto in one or more other exemplary embodiments. For example, the wearable device 100 may further include a battery. The wearable device 100 of FIG. 48 may not include the information obtaining unit 4810, but may include the communication unit 4990. The wearable device 100 of FIG. 48 may not include the display 4830.

The information obtaining unit 4810, the control unit 4820, the display 4830, and the user input unit 4840 of FIG. 48 may be configured to be identical or similar to the information obtaining unit 4910, the control unit 4920, a display 4931 and a user input unit 4932 that are included in the user interface unit 4930.

The information obtaining unit 4910 may obtain information generated from the content reproduced by the wearable device 100. The information may be obtained by using a method as described above with reference to FIGS. 1A through 1H.

The information obtaining unit 4910 includes a first information obtaining unit 4911 (e.g., first information obtainer), a second information obtaining unit 4912 (e.g., second information obtainer), a third information obtaining unit 4913 (e.g., third information obtainer), and a fourth information obtaining unit 4913 (e.g., fourth information obtainer), but is not limited thereto in one or more other exemplary embodiments.

The first information obtaining unit 4911 may obtain content reproduction related information of the wearable device 100 according to a method described above with reference to FIG. 1B. The second information obtaining unit 4912 may obtain bio information of the wearer 101 according to a method described above with reference to FIGS. 1C-1 and 1C-2. The third information obtaining unit 4913 may obtain peripheral environment information of the wearable device 100 according to a method described above with reference to FIG. 1F. The fourth information obtaining unit 4914 may obtain personal information of the wearer 101 according to a method described above with reference to FIG. 1G.

The elements may be different according to the information obtained by the first through fourth information obtaining units 4911 through 4914.

For example, when information regarding a content reproduction time is obtained by the first information obtaining unit 4911, the first information obtaining unit 4911 may be configured as a timer connected to a wearable sensor 4941 and a control unit 4920 or a timer connected to the control unit 4920. When the first information obtaining unit 4911 includes the timer connected to a wearable sensor 4941 and a control unit 4920, if the first information obtaining unit 4911 receives a signal sensed by the wearable sensor 4941 and a signal informing the content reproduction time from the control unit 4920, the first information obtaining unit 4911 may measure time, obtain content reproduction time information, and provide the obtained content reproduction time information to the control unit 4920.

When information regarding a battery consumption amount is obtained by the first information obtaining unit 4911, the first information obtaining unit 4911 may include an element for detecting battery remains (i.e., remaining battery life) based on a battery discharge voltage or discharge current. When the first information obtaining unit 4911 includes the element for detecting battery remains, the first information obtaining unit 4911 may provide the detected battery remains to the control unit 4920.

When information regarding a heating temperature is obtained by the first information obtaining unit 4911, the first information obtaining unit 4911 may be configured as a temperature sensor or the temperature sensor or the timer. When the first information obtaining unit 4911 is configured as the temperature sensor or the timer, the first information obtaining unit 4911 may obtain information regarding a time during which a temperature detected by the temperature sensor remains at a specific temperature (for example, 49 degrees) and may provide the obtained information to the control unit 4920.

The first information obtaining unit 4911 may be configured to obtain one piece of information among information of the wearable device 100 of FIG. 1B, at least two or more pieces of information, or all pieces of information.

When the bio information based on eyes of the wearer 101 of FIG. 10-1 is obtained by the second information obtaining unit 4912, the second information obtaining unit 4912 may be configured as the bio information obtaining camera 208. When the health information of the wearer 101 of FIG. 1C-2 is obtained by the second information obtaining unit 4912, the second information obtaining unit 4912 may be configured as an element connected to the communication unit 4990 and receiving the health information of the wearer 101 from an external device and transmitting the health information to the control unit 4920, or may be configured as an element receiving a sensing value of the bio sensor 4943 and transmitting the sensing value to the control unit 4920.

The second information obtaining unit 4912 may be configured to obtain one piece of information among the information of FIG. 1C-1 and 1C-2, or may be configured to obtain at least two or more pieces of information or all pieces of information. The information obtained by the second information obtaining unit 4912 is provided to the control unit 4920.

When the peripheral environment information of FIG. 1F is obtained by the third information obtaining unit 4913, the third information obtaining unit 4913 may be configured as an element connected to an environment sensor 4942 and transmitting a sensing value of the environment sensor 4942 to the control unit 4920. The third information obtaining unit 4913 may be configured to obtain one piece of information among the peripheral environment information of FIG. 1F, or may be configured to obtain at least two or more pieces of information or all pieces of information. The information obtained by the third information obtaining unit 4913 is provided to the control unit 4920.

When the personal information of FIG. 1G is obtained by the fourth information obtaining unit 4914, the fourth information obtaining unit 4914 may be configured as an element reading personal information from the memory 4950 and transmitting the personal information to the control unit 4920, an element receiving personal information input through the user input unit 4932 and transmitting the personal information to the control unit 4920, and/or an element transmitting personal information received from an external device through the communication unit 4990 to the control unit 4920.

The fourth information obtaining unit 4914 may be configured to obtain one piece of information among the personal information of FIG. 1G, or may be configured to obtain at least two or more pieces of information or all pieces of information. The information obtained by the fourth information obtaining unit 4914 is provided to the control unit 4920.

The control unit 4920 may compare the information obtained by the information obtaining unit 4910 and reproduction stop request guide information described above with reference to FIGS. 1B through 1H to determine whether to stop reproducing content reproduced by the wearable device 100. As a result of the determination, if a situation in which reproduction of the content is to be stopped is detected, the control unit 4920 displays, on the display 4931, reproduction stop request guide information regarding content. The reproduction stop request guide information may be displayed as shown in any of FIGS. 7, 8B, and 8C. The situation may be a situation in which fatigue of the wearer 101 is to be relieved as described in the above-described exemplary embodiments.

If a reproduction stop request for the content is received through the user input unit 4932 based on the reproduction stop request guide information displayed on the display 4931, the control unit 4920 stops reproducing the content by the wearable device 100.

The control unit 4920 controls a general operation of the wearable device 100. The control unit 4920 may be referred to as a processor controlling an operation of the wearable device 100. The control unit 4920 may control the elements 4910 and 4930 through 4990 of FIG. 49 by executing a program stored in the memory 4950.

The control unit 4920 may operate based on at least one of the flowcharts of FIGS. 6, 9, 10, 16, 17, 19, 32, 35 through 38, 40, 41, and 44 through 47 and a flowchart of FIG. 50 that will be described below.

The user interface unit 4930 includes the display 4931 and the user input unit 4932.

The display 4931 may be configured as one of the displays 212, 311, 413, 414, 502, and 503 described above with reference to FIGS. 2A, 2B, 2D through 2F, 3, 4, and 5A. The display 4931 may be configured as at least one of a liquid crystal display (LCD), a thin film transistor LCD (TFT-LCD), an organic light emitting diode (OLED), a 3D display, an electrophoretic display (EPD), or may be configured as an optical waveguide (for example, a prism) as described above with reference to FIGS. 2A through 4, but is not limited thereto in one or more other exemplary embodiments.

The user input unit 4932 may be configured as one of the user input units 207, 306, 408, 504, and 535 described above with reference to FIGS. 2A, 2B, 2D through 2F, 3, 4, 5A, and 5B. Input information of a user that may be input through the user input unit 4932 may include at least one of touch based input information, movement based input information, and vision based input information, but is not limited thereto in one or more other exemplary embodiments.

The sensor unit 4940 includes the wearable sensor 4941, the environment sensor 4942, the bio sensor 4943, a proximity sensor 4944, an operation detection sensor 4945, a location sensor 4946, a gyroscope sensor 4947, an acceleration sensor 4948, and a geomagnetic sensor 4949, but is not limited thereto in one or more other exemplary embodiments.

The wearable sensor 4941 may include the sensor 210 of FIG. 2A. The environment sensor 4942 may include the sensor 209 of FIG. 2A. The environment sensor 4942 may include a sensor capable of sensing peripheral environment information. The bio sensor 4943 may include sensors capable of sensing the health information of the wearer 101 mentioned in FIG. 1C-2.

The proximity sensor 4944 may sense whether a part of body such as a hand of the wearer 101 approaches the wearable device 100. The operation detection sensor 4945 may sense an activity of the wearer 101. The location sensor 4946 may detect a location of the wearable device 100. For example, the location sensor 4945 may be configured as a global positioning system (GPS) receiver. The gyroscope sensor 4947 may measure an azimuth of the wearable device 100. The acceleration sensor 4948 may measure an inclination and acceleration of the wearable device 100 with respect to a ground surface. The geomagnetic sensor 4949 may detect azimuth orientations of cardinal points with respect to the wearable device 100.

The sensor unit 4940 may further include a pressure sensor (for example, a touch sensor, a piezoelectric sensor, a physical button, etc.), a status sensor (for example, an earphone terminal, a digital multimedia broadcasting (DMB) antenna, a standard terminal (for example, a terminal capable of recognizing whether charging is performed, a terminal capable of recognizing whether to connect to an external device, and a terminal capable of recognizing whether to connect to a dock), a time sensor, a stress sensor, an emotion sensor, etc.

The memory 4950 may include a user interface (UI) module 4951, a notification module 4952, and an application module 4953. The notification module 4952 may include a guide module providing content reproduction stop request guide information described above with reference to the above-described exemplary embodiments, guide information regarding different content, etc.

The memory 4950 may store a program for processing and controlling the control unit 4920. The program stored in the memory 4950 may include a content reproduction stop application influencing health of the wearer 101 according to an exemplary embodiment, an application reproducing different content, and an application providing a different function. The memory 4950 may store information for executing the above-described applications. For example, the memory 4950 may store reproduction stop request reference information mentioned in FIGS. 1B through 1H.

The memory 4950 may include at least one storage medium from among a flash memory-type storage medium, a hard disk-type storage medium, a multimedia card micro-type storage medium, card-type memories (e.g., an SD card, an XD memory, etc.), Random Access Memory (RAM), Static Random Access Memory (SRAM), Read-Only Memory (ROM), Electrically Erasable Programmable Read-Only Memory (EEPROM), Programmable Read-Only Memory (PROM), a magnetic memory, a magnetic disc, and an optical disc.

The wearable device 100 may be configured to use a web storage performing a storage function of the memory 4950 on the Internet or the server 4340.

The programs stored in the memory 4950 may classify a plurality of modules according to functions thereof. For example, the programs stored in the memory 4950 may be classified as the UI module 4951, the notification module 4952, the application module 4953, etc., but are not limited thereto.

The UI module 4951 may provide, to the control unit 4920, the content reproduction stop request guide information described above with reference to the above-described exemplary embodiments, guide information regarding different content, guide information regarding a different function, etc. The UI module 4951 may provide, to the control unit 4920, a UI, a GUI, etc., specialized for the applications installed in the wearable device 100.

The notification module 4952 may generate a signal for notifying providing of the UI for the content reproduction stop request guide information described above with reference to the above-described exemplary embodiments or the guide information or notifying receiving of information from external devices (at least one of 4310 through 4340), but is not limited thereto.

The notification module 4952 may output a notification signal in the form of a video signal through the display 4931 and in the form of an audio signal through the audio output unit 4970, but is not limited thereto in one or more other exemplary embodiments.

The application module 4953 may include applications described above with reference to FIG. 1A set in the wearable device 100 and the above-described applications, but is not limited thereto in one or more other exemplary embodiments.

The image processing unit 4960 may process an image that is to be displayed on the display 4931. The image processing unit 4960 may include a function of restoring a compressed image. The image processing unit 4960 may be controlled by the control unit 4920 to include a function of editing a content frame and a reproduction stop request guide information frame described above with reference to FIG. 8A.

The audio output unit 4970 may be configured as any of the sound output units 215, 216, 314, 416, 417, and 505 described above with reference to FIGS. 2A, 2B, 2D, 2F, 3, 4, and 5A, and 5B, but is not limited thereto.

The audio output unit 4970 may output audio data received from the communication unit 4990 or stored in the memory 4950. The audio output unit 4970 may output a sound signal related to a function (for example, notification sound) performed by the wearable device 100. A speaker, a buzzer, etc., may be included in the audio output unit 4970, but are not limited thereto.

The audio input unit 4975 receives an audio signal input from the outside of the wearable device 100, converts the received audio signal into an electric audio signal, and transmits the electric audio signal to the control unit 4920. The audio input unit 4975 may be configured as a microphone.

The audio signal input from the outside may receive a voice signal of the wearer 101 of the external devices (at least one of 4310 through 4340) of the wearable device 100 or the wearable device 100 or a peripheral sound signal of the wearable device 100. The audio input unit 4975 may use various noise removal algorithms for removing noise generated during a process of receiving an external sound signal.

The camera 4980 may obtain an image frame such as a still image or a moving image in a conference call mode or a capture mode. The camera 4980 may capture an image of a finger gesture of the wearer 101 or an image of a real world that may be viewed by the wearer 101 and transmit the image to the control unit 4920. The image captured by the camera 4980 may be transmitted to and processed by the control unit 4920 or the image processing unit 4960. The image frame captured by the camera 4980 may be stored in the memory 4950 or may be transmitted to the outside through the communication unit 4990.

The communication unit 4990 may include one or more elements for communication between the wearable device 100 and at least one external device (at least one of 4310 through 4340). For example, the communication unit 4990 may include a near field communication device 4991, a mobile communication device 4992, and a broadcasting receiver 4993, but is not limited thereto in one or more other exemplary embodiments.

The near field communication device 4991 may include a Bluetooth communication unit, a Bluetooth low energy (BLE) communication unit, a near field communication (NFC), a WLAN (WiFi) communication unit, a Zigbee communication unit, an infrared data association (IrDA) communication unit, a WiFi Direct (WFD) communication unit, an ultra wideband (UWB) communication unit, an Ant+ communication unit, etc., but is not limited thereto.

The mobile communication device 4992 transmits and receives a wireless signal to and from at least one of a base station, an external device, and a server on a mobile communication network. In this regard, the wireless signal may include a voice call signal, a video call signal, or data of various forms according to transmission and reception of text/multimedia messages. The mobile communication device 4992 may include communication (for example, device to device (D2D), communication based on the base station, IoT communication, M2M, etc.) based on a mobile communication network, wired or wireless Internet, artificial satellite based communication, broadcasting communication, etc., described above with reference to FIG. 43, but is not limited thereto.

The broadcasting receiver 4993 receives a broadcasting signal and/or information related to broadcasting from the outside through a broadcasting channel. The broadcasting channel may include at least one of a satellite channel, a terrestrial channel, and a radio channel, but is not limited thereto.

The wearable device 100 shown in FIGS. 2B, 2D through 2F, 3, 4, 5A, and 5B may be configured as shown in FIG. 48 or 49, but is not limited thereto.

Figure 50:
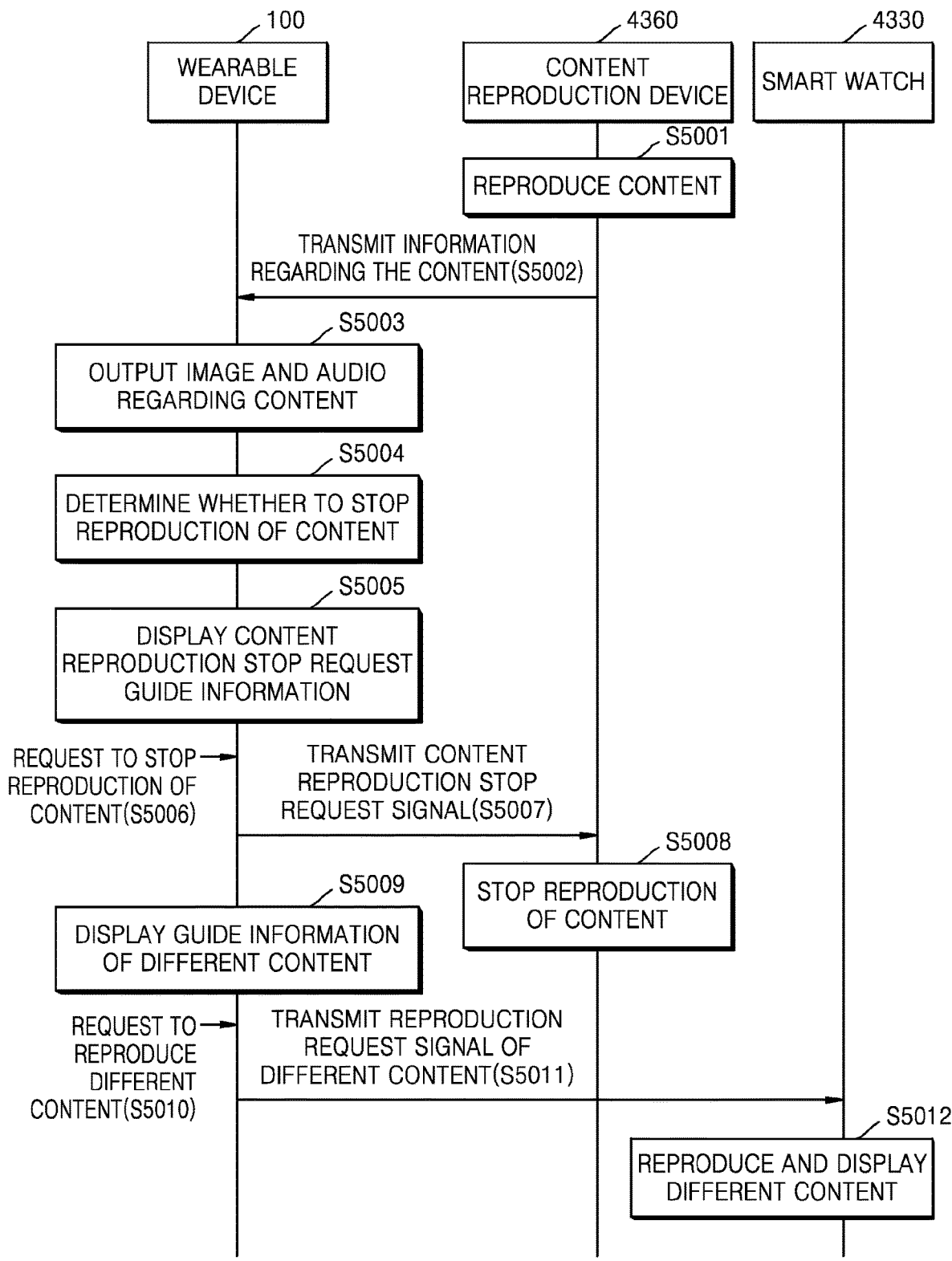
FIG. 50 is a flowchart for explaining a system operating method according to another exemplary embodiment.

FIG. 50 is a flowchart for explaining a method of operating the system 4300 according to another exemplary embodiment. FIG. 50 is an example in which content is reproduced by the content reproduction device 4360, the reproduced content is displayed by the wearable device 100, and different content is reproduced by the smart TV 4330.

In operation S5001, the content is reproduced by the content reproduction device 4360. The content reproduction device 4360 may reproduce the content according to a user input through an exclusive user input unit (for example, the user input unit 271 of FIG. 2G), but is not limited thereto in one or more other exemplary embodiments. For example, the content reproduction device 4360 may reproduce the content according to a user input through the user input unit 207, a user input through the smart phone 4320, and a user input through the smart TV 4330.

In operation S5002, the content reproduction device 4360 may transmit information regarding the reproduced content to the wearable device 100. The information regarding the content may include an image and audio constituting the content, but is not limited thereto. For example, the information regarding the content may include reproduction format information of the image and the audio constituting the content.

In operation S5003, the wearable device 100 outputs the received image and the audio regarding the content. The image may be output through the display 212. The audio may be output through the audio output units 215 and 216, but is not limited thereto in one or more other exemplary embodiments. For example, when the wearable device 100 is configured as shown in FIG. 2E, the audio may be output through the wearable earphone 260.

In operation S5004, the wearable device 100 determines whether to stop reproducing the content while outputting the image and the audio regarding the content. Operation S5004 may be performed like operation S4403 of FIG. 44.

As a result of the determination in operation S5004, if reproduction of the content is stopped, in operation S5005, the wearable device 100 displays content reproduction stop request guide information. Operation S5005 may be performed like operation S4605 of FIG. 46.

In operation S5006, if a content reproduction stop request is received based on the content reproduction stop request guide information displayed through the display 212 of the wearable device 100, in operation S5007, the wearable device 100 transmits a content reproduction stop request signal to the content reproduction device 4360. Accordingly, in operation S5008, the content reproduction device 4360 stops reproducing the content. Since the reproduction of the content is stopped by the content reproduction device 4360, output of the image and the audio regarding the content is stopped by the wearable device 100. Since the output of the image and the audio regarding the content is stopped, in operation S5009, the wearable device 100 displays guide information regarding different content on the display 212.

In operation S5010, if a reproduction request for different content is received based on guide information of the different content displayed on the display 212, the wearable device 100 transmits, to the smart TV 4330, a reproduction request signal for the different content.

In operation S5011, the different content whose reproduction is requested in operation S5010 may indicate that content is to be reproduced by a smart TV. The wearable device 100 may have information regarding a reproduction device for the different content, to perform operation S5011 according to the reproduction request for the different content received in operation S5010. For example, when plural different content exists, the wearable device 100 may have information regarding a reproduction device regarding the plurality of pieces of different contents. When the reproduction device for the different content whose reproduction is requested in operation S5010 is the smart phone 4320, in operation S5011, the wearable device 100 may transmit the reproduction request signal for the different content to the smart phone 4320. When the reproduction device for the different content whose reproduction is requested in operation S5010 is a PC, in operation S5011, the wearable device 100 may transmit the reproduction request signal for the different content to the PC.

In operation S5012, the smart TV 4330 displays the different content thereon according to the reproduction request for the wearable device 100. Accordingly, the wearer 101 of the wearable device 100 may view the different content through the smart TV 4330 positioned in a real world that may be viewed through the wearable device 100. Operation S5012 may be modified such that information regarding content reproduced by the smart TV 4330 is transmitted to the wearable device 100, and an image and audio regarding the content are output by the wearable device 100.

A service reproducing different content as described in the above-described exemplary embodiments may be a service (for example, a service providing a function of relieving fatigue of the wearer 101) that may influence a health state of the wearer 101.

One or more exemplary embodiments may also be embodied as programmed commands to be executed in various computer means, and then may be recorded to a computer-readable recording medium. The computer-readable recording medium may include one or more of the programmed commands, data files, data structures, or the like. The programmed commands recorded to the computer-readable recording medium may be particularly designed or configured for one or more embodiments of the present disclosure or may be well known to one of ordinary skill in the art. Examples of the computer-readable recording medium include magnetic media including hard disks, magnetic tapes, and floppy disks, optical media including CD-ROMs and DVDs, magneto-optical media including floptical disks, and a hardware apparatus designed to store and execute the programmed commands in ROM, RAM, a flash memory, and the like. Examples of the programmed commands include not only machine codes generated by a compiler but also include great codes to be executed in a computer by using an interpreter. Furthermore, it is understood that one or more of the above-described elements may be implemented as hardware (e.g., circuitry, at least one processor, memory, data lines, etc.), software, or a combination of hardware and software.

It should be understood that exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A wearable device comprising:
a display displaying content;
a sensor;
a user input interface configured to receive a command of a wearer; and
at least one processor configured to:
during reproduction of the content while the wearable device is worn, obtain, via the sensor, first health information of the wearer wearing the wearable device,
compare the obtained first health information with reproduction stop request reference information, based on a result of the comparison,
control the display to output information informing the wearer that stopping reproduction of the content is requestable,
receive, through the user input interface in response to outputting the information, a reproduction stop request for the content,
control the wearable device to stop the reproduction of the content in response to receiving the reproduction stop request for the content, and
in response to stopping the reproduction of the content, provide, via the display, information related to other content capable of protecting health of the wearer.

2. The wearable device of claim 1, wherein the first health information of the wearer comprises bio information of the wearer related to the reproduction of the content and the reproduction stop request reference information comprises reference information related to the bio information of the wearer.

3. The wearable device of claim 1, wherein the information related to the other content comprises guide information based on the obtained first health information of the wearer.

4. The wearable device of claim 1, wherein the processor is further configured to, based on the provided information related to the other content, receive a reproduction request for the other content via the user input interface; and
in response to receiving the reproduction request, control the wearable device to reproduce the other content.

5. The wearable device of claim 4, wherein the processor is further configured to identify whether the other content has been completely reproduced; and
in response to identifying that the other content has been completely reproduced, control the wearable device to resume continuous reproduction of the content.

6. The wearable device of claim 4, wherein the processor is further configured to provide, via the display, a result of reproducing the other content.

7. The wearable device of claim 4, wherein the processor is further configured to, via the sensor, obtain second health information of the wearer during reproducing of the other content;
compare the obtained second health information with the reproduction stop request reference information; and
provide, via the display, a result of the comparison as a result of reproducing the other content,
wherein the first health information and the second health information are the same type of health information of the wearer.

8. The wearable device of claim 1, wherein the other content comprises at least one of a still image file, a moving picture file, or a music file.

9. A method of operating a wearable device, the method comprising:
reproducing content through a display of the wearable device;
obtaining, via a sensor included in the wearable device, first health information of a wearer wearing the wearable device;
comparing, by a processor of the wearable device, the obtained first health information of the wearer and reproduction stop request reference information;
based on a result of the comparing, controlling the display to output information informing the wearer that stopping reproduction of the content is requestable;
receiving, through a user input interface of the wearable device in response to outputting the information, a reproduction stop request for the content;
controlling the wearable device to stop the reproduction of the content in response to receiving the reproduction stop request for the content; and
in response to stopping the reproduction of the content, providing, via the display, information related to other content capable of protecting health of the wearer.

10. The method of claim 9, wherein the first health information of the wearer comprises bio information of the wearer related to the reproduction of the content and the reproduction stop request reference information comprises reference information related to the bio information of the wearer.

11. The method of claim 9, wherein the information related to the other content comprises guide information based on the obtained first health information of the wearer.

12. The method of claim 9, further comprising:
based on the provided information related to the other content, receiving a reproduction request for the other content via the user input interface; and
in response to receiving the reproduction request, controlling the wearable device to reproduce the other content.

13. The method of claim 12, further comprising:
identifying, by the processor, whether the other content has been completely reproduced; and
in response to identifying that the other content has been completely reproduced, controlling the wearable device to resume continuous reproduction of the content.

14. The method of claim 12, further comprising providing, via the display, a result of reproducing the other content.

15. The method of claim 12, further comprising:
obtaining, via the sensor, second health information of the wearer during reproducing of the other content;
comparing the obtained second health information with the reproduction stop request reference information; and
providing, via the display, a result of the comparison as a result of reproducing the other content,
wherein the first health information and the second health information are the same type of health information of the wearer.

16. The method of claim 12, wherein the other content comprises at least one of a still image file, a moving picture file, or a music file.

17. A non-transitory computer-readable recording medium having recorded thereon a program executable by a computer for performing the method of claim 9.

* * * * *